(12) United States Patent
Yao et al.

(10) Patent No.: US 7,454,045 B2
(45) Date of Patent: Nov. 18, 2008

(54) DETERMINATION OF FEATURE BOUNDARIES IN A DIGITAL REPRESENTATION OF AN ANATOMICAL STRUCTURE

(75) Inventors: Jianhua Yao, Laurel, MD (US); Ronald M. Summers, Potomac, MD (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 654 days.

(21) Appl. No.: 10/779,210

(22) Filed: Feb. 13, 2004

(65) Prior Publication Data

US 2005/0078858 A1    Apr. 14, 2005

Related U.S. Application Data

(60) Provisional application No. 60/510,640, filed on Oct. 10, 2003.

(51) Int. Cl.
G06K 9/00    (2006.01)
(52) U.S. Cl. .................. 382/128; 382/130; 382/131; 382/132; 382/154; 382/224
(58) Field of Classification Search .................. 382/128, 382/130, 131, 132, 154, 199, 224
See application file for complete search history.

(56) References Cited

U.S. PATENT DOCUMENTS

| 6,246,784 | B1 | 6/2001 | Summers et al. | |
| 6,331,116 | B1 | 12/2001 | Kaufman et al. | |
| 6,343,936 | B1 | 2/2002 | Kaufman et al. | |
| 6,345,112 | B1 * | 2/2002 | Summers et al. | ............ 382/128 |
| 6,556,696 | B1 | 4/2003 | Summers et al. | |
| 7,043,064 | B2 * | 5/2006 | Paik et al. | ................... 382/128 |
| 7,260,250 | B2 | 8/2007 | Summers et al. | |
| 2002/0097320 | A1 * | 7/2002 | Zalis | ........................... 348/65 |
| 2004/0064029 | A1 | 4/2004 | Summers et al. | |
| 2004/0101182 | A1 * | 5/2004 | Miller et al. | ................. 382/131 |
| 2005/0105788 | A1 * | 5/2005 | Turek et al. | ................. 382/131 |
| 2008/0008367 | A1 | 1/2008 | Franaszek et al. | |
| 2008/0015419 | A1 | 1/2008 | Summers et al. | |

OTHER PUBLICATIONS

Näppi et al., "Computer-aided detection of polyps in CT colonography: effect of feature-guided polyp segmentation method," *Radiology* 225(P), Nov. 2002.

(Continued)

*Primary Examiner*—Bhavesh Mehta
*Assistant Examiner*—John B Strege
(74) *Attorney, Agent, or Firm*—Klarquist Sparkman, LLP

(57) ABSTRACT

A virtual anatomical structure can be analyzed to determine enclosing three-dimensional boundaries of features therein. Various techniques can be used to determine tissue types in the virtual anatomical structure. For example, tissue types can be determined via an iso-boundary between lumen and air in the virtual anatomical structure and a fuzzy clustering approach. Based on the tissue type determination, a deformable model approach can be used to determine an enclosing three-dimensional boundary of a feature in the virtual anatomical structure. The enclosing three-dimensional boundary can be used to determine characteristics of the feature and classify it as of interest or not of interest.

46 Claims, 54 Drawing Sheets
(5 of 54 Drawing Sheet(s) Filed in Color)

OTHER PUBLICATIONS

Näppi et al., "Computerized detection of colorectal masses in CT colonography based on fuzzy merging and wall-thickening analysis," *Med. Phys.* 31(4):860-872, Apr. 2004.

Wang et al., "Skeleton based 3D computer aided detection of colonic polyps," *Medical Imaging 2003: Image Processing*, Milan Sonka, J. Michael Fitzpatrick, eds., *Proceedings of SPIE*, 5032:843-853, 2003.

Na et al., "Automated detection of polyps from multi-slice CT images using 3D morphologic matching algorithm: phantom study," *Medical Imaging 2003: Image Processing*, Milan Sonka, J. Michael Fitzpatrick, eds., *Proceedings of SPIE*, 5032:877-881, 2003.

Yao and Summers, "3D colonic polyp segmentation using dynamic deformable surfaces," *Medical Imaging 2004: Physiology, Function, and Structure from Medical Images*, edited by Amir A. Amini, Armando Manduca, *Proceedings of SPIE* 5369:280-289, 2004.

"Attenuation Number," http://www.amershamhealth.com/medcyclopaedia/medical/Query.asp?CiResultsSize=on&CiResultsSize=on&advancedsearch=true&SearchString=Attenuation+Number&searchimage.x=39&searchimage.y=15, 1 page, website visited on Dec. 12, 2003.

"FAQ: Fuzzy Logic and Fuzzy Expert Systems 1/1" http://www.faqs.org/fazs/fuzzy-logic/part1/, 38 pages, website visited on Feb. 9, 2004.

"Hounsfield Unit," http://www.amershamhealth.com/medcyclopaedia/medical/Query.asp?CiResultsSize=on&CiResultsSize=on&advancedsearch=true&SearchString=Hounsfield+unit, 1 page, website visited on Dec. 12, 2003.

"Iso-Surface Rendering," available at http://www.cs.sunysb.edu/~meuller/teaching/cse564/isosurface.pdf, 13 pages, website visited on Feb. 2, 2004.

Cohen, "Note On Active Contour Models and Balloons," *Computer Vision, Graphics, and Image Processing (CVGIP): Image Understand*, vol. 53, No. 2, pp. 211-218, Mar. 1991.

Fishman et al., "3D Imaging: Principles and Techniques," Inside InSpace, http://www.insideinspace.com/article3.html, 17 pages, website visited on Feb. 2, 2004.

Jerebko et al., "Radon Transform Based Polyp Segmentation Method for CT Colonography Computer Aided Diagnosis," Radiological Society of North America, Abstract No. 100, pp. 257-258, 2002.

Jerebko et al., "3D Automatic Colonic Polyp Segmentation Method for CT Colonography," Radiological Society of North America, Scientific Assembly and Annual Meeting Program, Abstract No. 691, Cover and 1 page, Dec. 2, 2003.

Jerebko et al., "Polyp Segmentation Method for CT Colonography Computer Aided Detection," *Medical Imaging 2003: Physiology and Function: Methods, Systems, and Applications, in Proceedings of the SPIE*, vol. 5031, pp. 359-369, May 2003.

Jerebko et al., "Computer-aided Polyp Detection in CT Colonography Using an Ensemble of Support Vector Machines," *International Congress Series 1256*, pp. 1019-1024, Jun. 27, 2003.

Iordanescu et al., "Rectal Tube Detection in CTCCAD," Radiological Society of North America, Scientific Assembly and Annual Meeting Program, Abstract No. 692, Cover and 1 page, Dec. 2, 2003.

Kass et al., "Snakes: Active Contour Models," *International Journal of Computer Vision*, pp. 321-331, 1988.

Näppi et al., "Automated Detection of Polyps with CT Colonography: Evaluation of Volumetric Features for Reduction of False-Positive Findings," *Academic Radiology*, vol. 9, No. 4, pp. 386-397, 2002.

Näppi et al., "Optimization of the Ranking of Computer-Detected Polyp Candidates in CT Colonography," Radiological Society of North America, Scientific Assembly and Annual Meeting Program, Abstract No. 690, Cover and 1 page, Dec. 2, 2003.

Pham et al., "An Adaptive Fuzzy C-Means Algorithm for Image Segmentation in the Presence of Intensity Inhomogeneities," *Pattern Recognition Letters*, vol. 20, 15 pages, 1998.

Pickhardt, et al., "Computed Tomographic Virtual Colonoscopy to Screen for Colorectal Neoplasia in Asymptomatic Adults," *The New England Journal of Medicine*, vol. 349, No. 23, pp. 2191-2200, Dec. 1, 2003.

Saff et al., "Distributing Many Points on a Sphere," *The Mathematical Intelligencer*, vol. 19, No. 1, pp. 5-11, 1997.

Serlie et al., "A Probabilistic Method for Virtual Colonoscopy Cleansing," *Medical Imaging 2003: Physiology and Function: Methods, Systems, and Applications, in Proceedings of the SPIE*, vol. 5031, pp. 405-412, Feb. 2003.

Summers, "Current Concepts and Future Directions in Computer-aided Diagnosis for CT Colonography," *CARS*, 6 pages, 2002.

Summers, "Challenges for Computer-aided Diagnosis for CT Colonography," *Abdominal Imaging*, vol. 27, pp. 268-274, 2002.

Summers et al., "Colonic Polyps: Complementary Role of Computer-aided Detection on CT Colonography," *Radiology*, Radiological Society of North America, vol. 225, pp. 391-399, 2002.

Summers et al., "Automated Polyp Detection at CT Colonography: Feasibility Assessment in a Human Population," *Radiology*, vol. 219, No. 1, pp. 51-59, 2001.

Thirion et al., "Computing the Differential Characteristics of Isointensity Surfaces," *Computer Vision and Image Understanding*, vol. 61, No. 2, pp. 190-202, Mar. 1995.

Xu et al., "Finding the Brain Cortex Using Fuzzy Segmentation, Isosurfaces, and Deformable Surface Models," in *The XVth Int. Conf. on Info. Proc. in Med. Img (IPMI)*, pp. 399-404, Jun. 2002.

Xu et al., "Chapter 3: Image Segmentation Using Deformable Models," in *Handbook of Medical Imaging, vol. 2, Medical Image Processing and Analysis*, M. Sonka and J.M. Fitzpatrick, Editors, SPIE, pp. 129-174, 2000.

Yao et al., "Automatic Segmentation of Colonic Polyps in CT Colonography Based on Knowledge-Guided Deformable Models," *Medical Imaging 2003: Physiology and Function: Methods, Systems, and Applications, in Proceedings of the SPIE*, vol. 5031, pp. 370-380, Feb. 2003.

Yoshida et al., "Computerized Detection of Colonic Polyps on the Basis of Volumetric Features: Pilot Study," *Radiology*, vol. 222, No. 2, pp. 327-336, 2002.

Yoshida et al., "Computer-Aided Diagnosis Scheme for Detection of Polyps at CT Colonography," *RadioGraphics*, vol. 22, No. 4, pp. 963-979, Jul.-Aug. 2002.

U.S. Appl. No. 10/961,681, filed Oct. 8, 2004, Summers et al.

U.S. Appl. No. 11/685,127, filed Mar. 12, 2007, Summers et al.

U.S. Appl. No. 11/810,704, filed Jun. 5, 2007, Van Uitert et al.

Yoshida et al., "Three-Dimensional Computer-Aided Diagnosis Scheme for Detection of Colonic Polyps," *IEEE Transactions on Medical Imaging*, vol. 20, No. 12, Dec. 2001, pp. 1261-1274, 14 pages.

\* cited by examiner

2112

2122

2132

2142

FIG. 26A
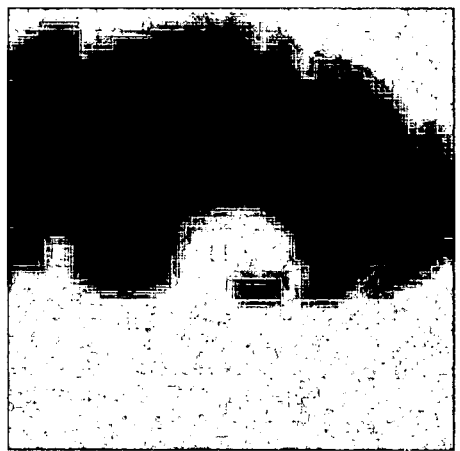
2610
FIG. 26B
2620
FIG. 26C 2630
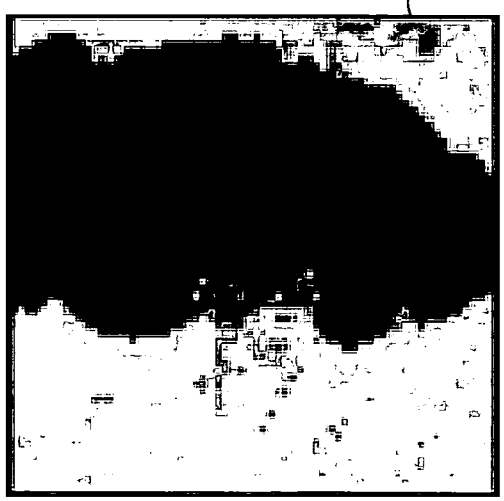
2640 FIG. 26D

2710

2720

2730

2740

2750

FIG. 28A
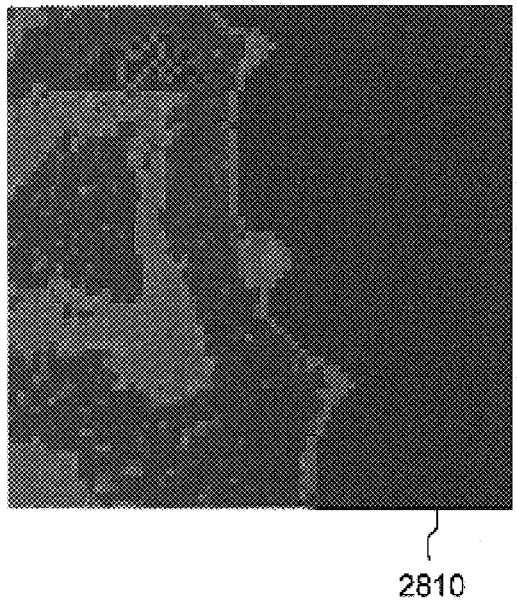
2810
FIG. 28B
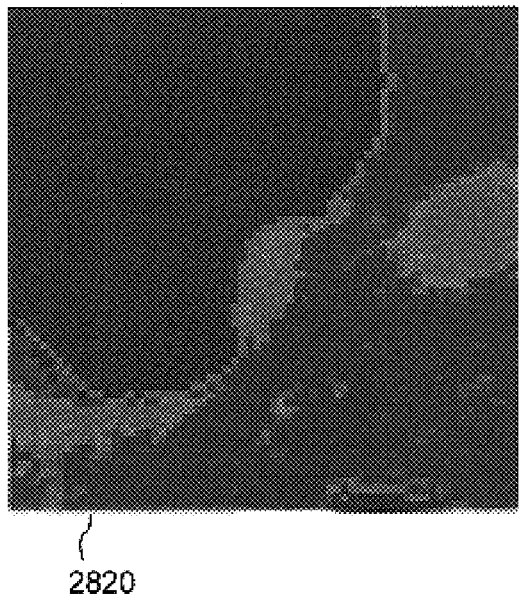
2820
FIG. 28C 2830
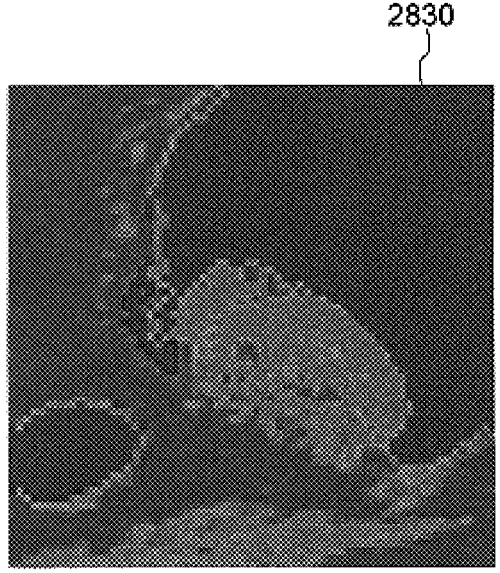
2840 FIG. 28D
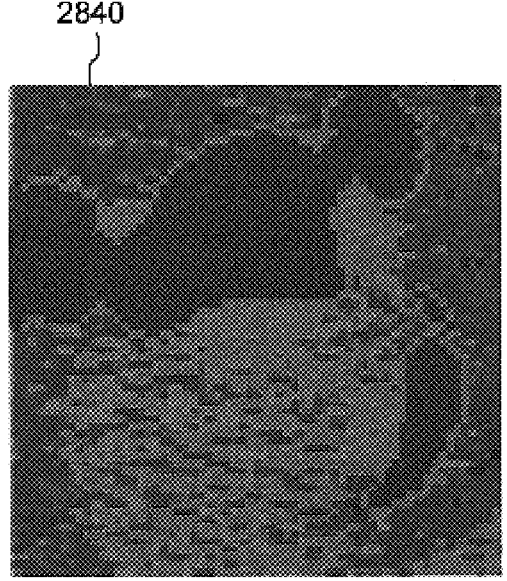

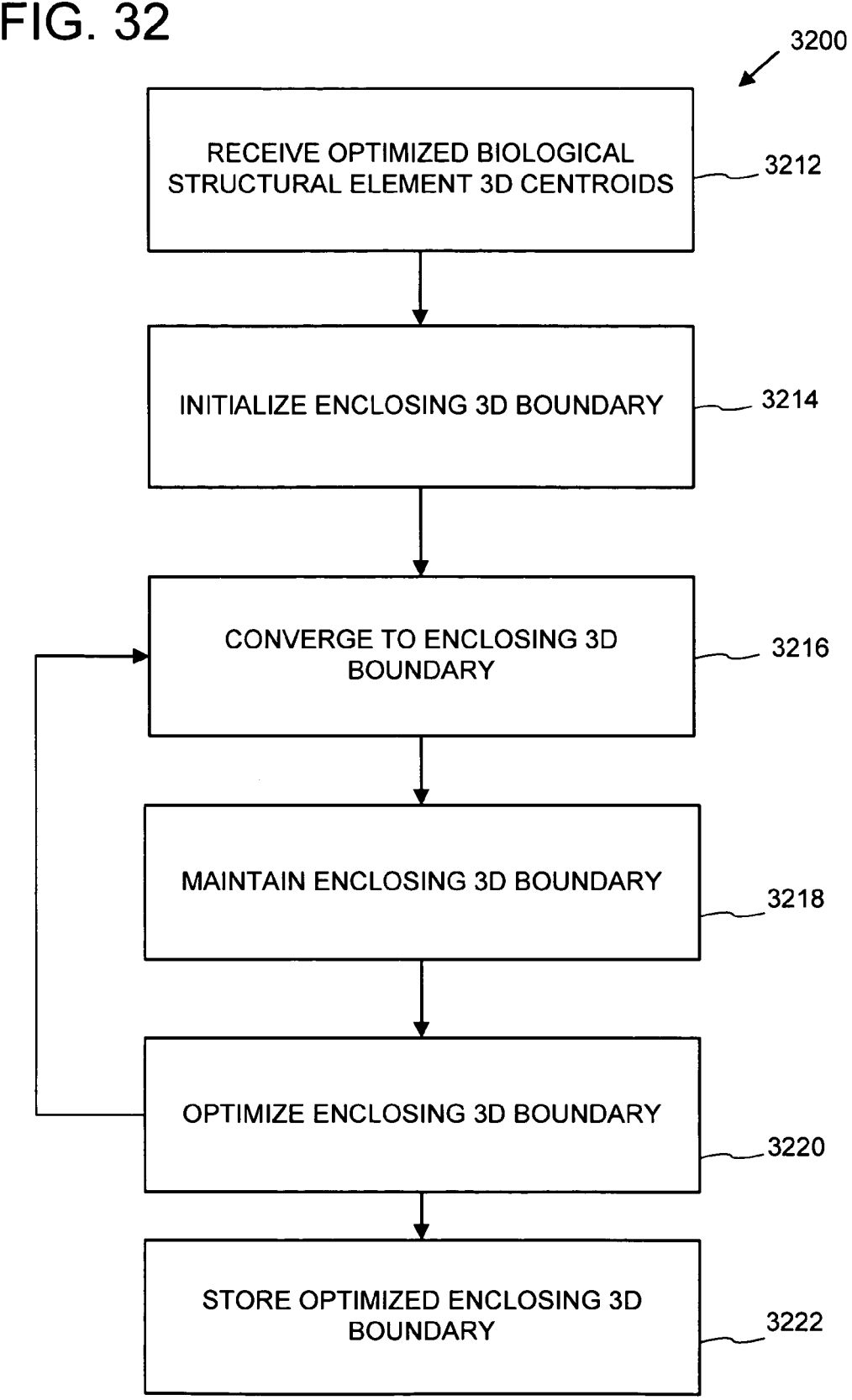

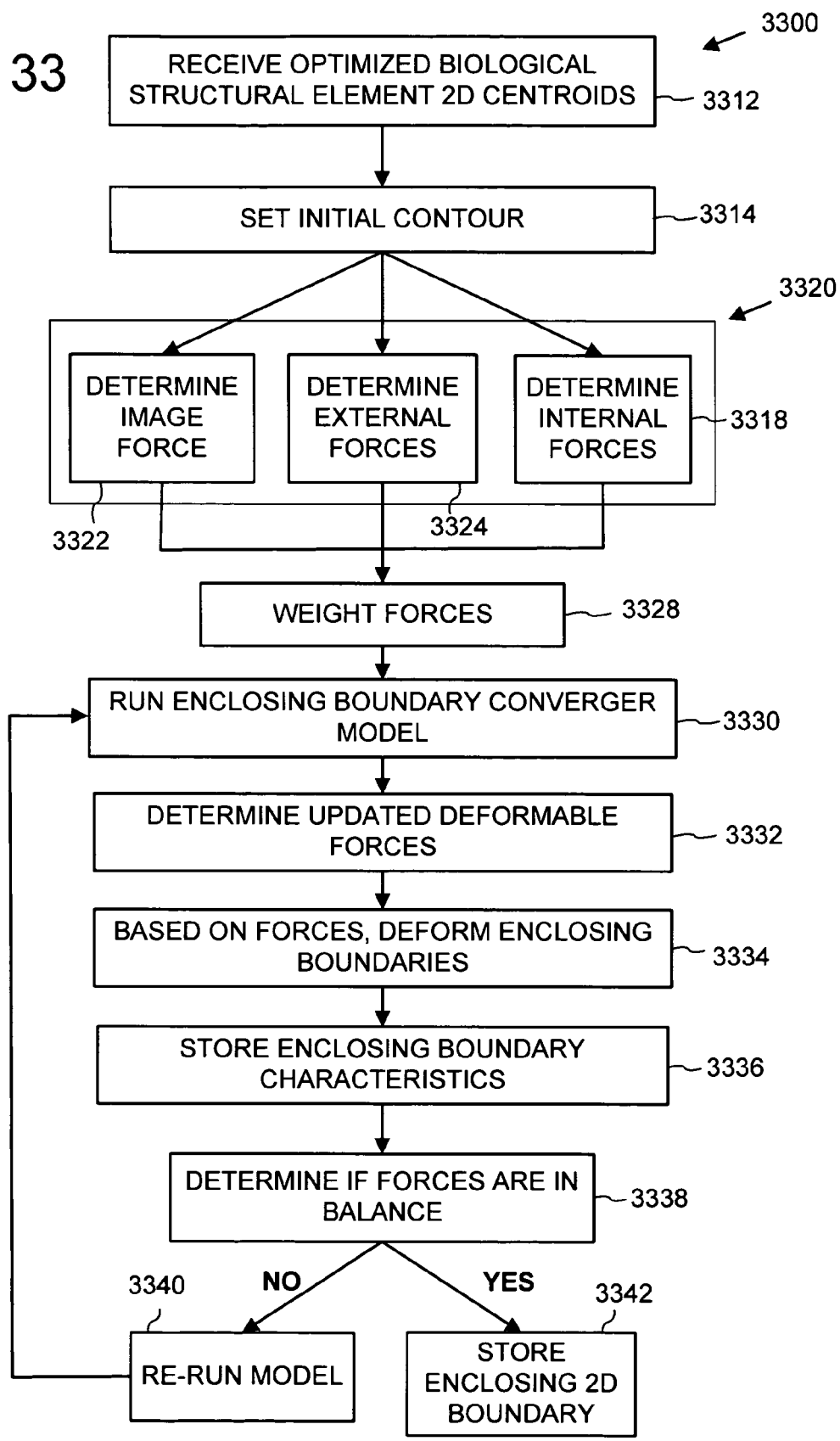

FIG. 34A
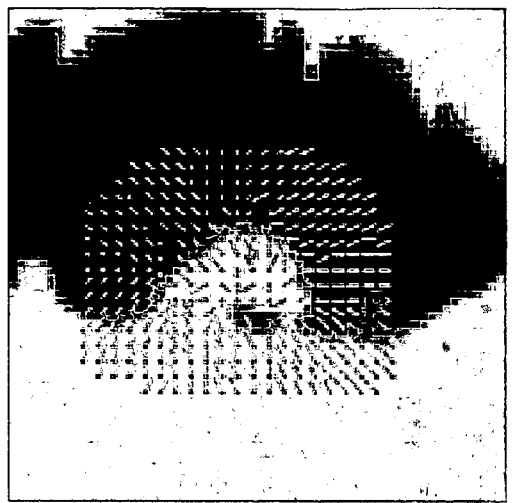
3410
FIG. 34B
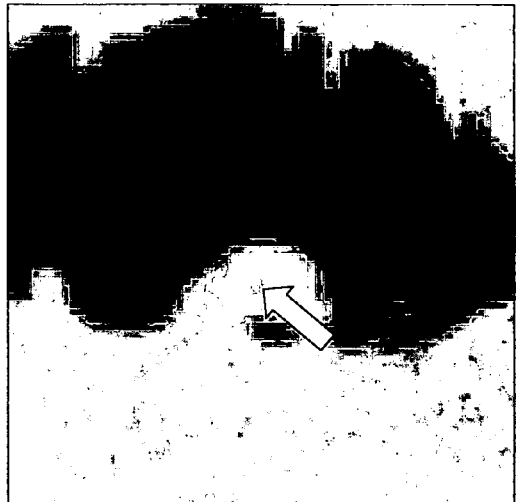
3420
FIG. 34C  3430
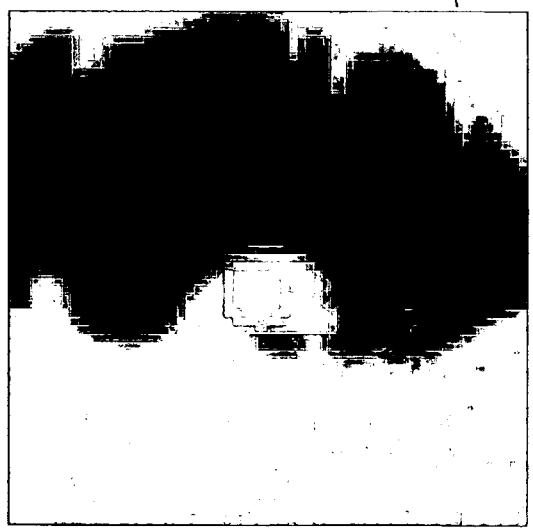
3440  FIG. 34D

3510

3520

3530

3540

3610

3620

3630

3640

3910

3920

3930

3940

4710

4720

4730

4740

4750

FIG. 49A
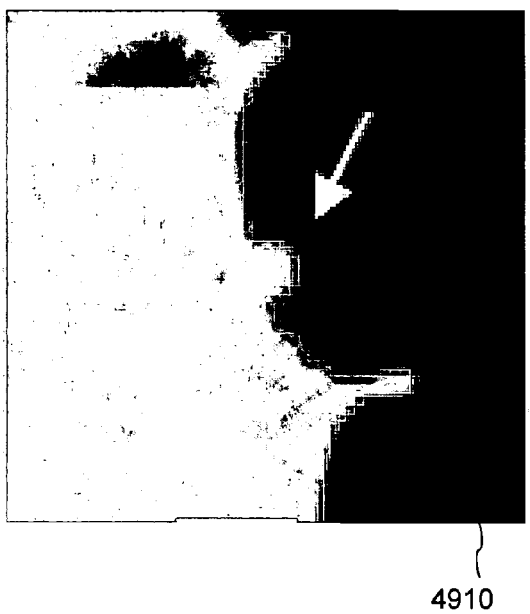
FIG. 49B
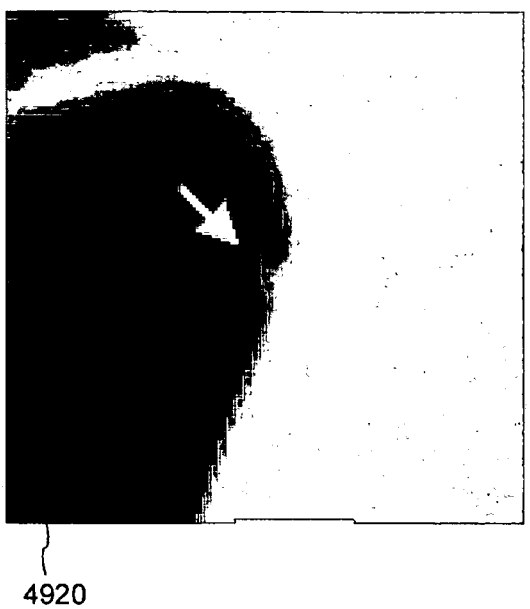
4910    4920
FIG. 49C    4930    4940    FIG. 49D
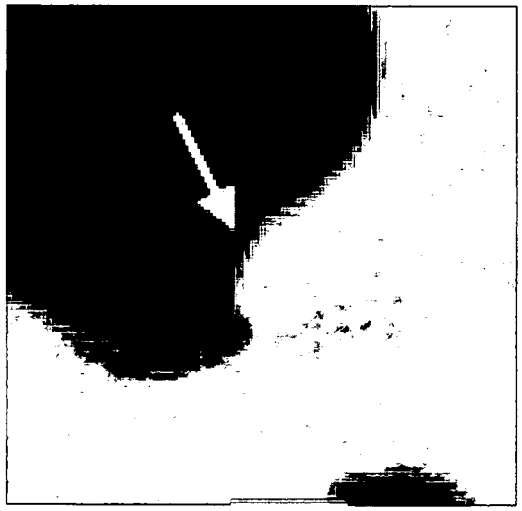    

FIG. 50A
FIG. 50B
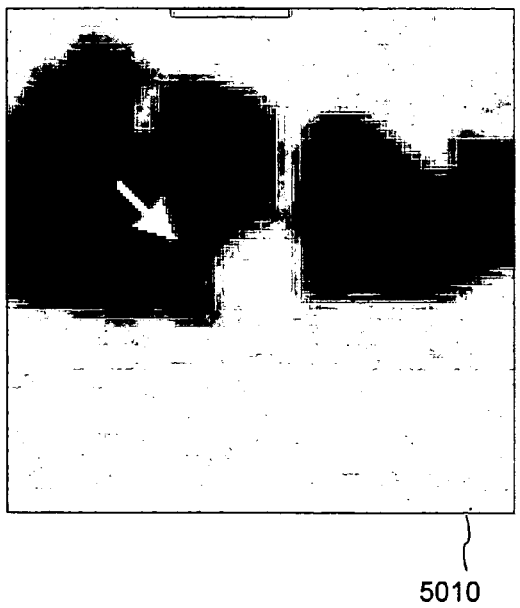
5010   5020
FIG. 50C   5030   5040   FIG. 50D
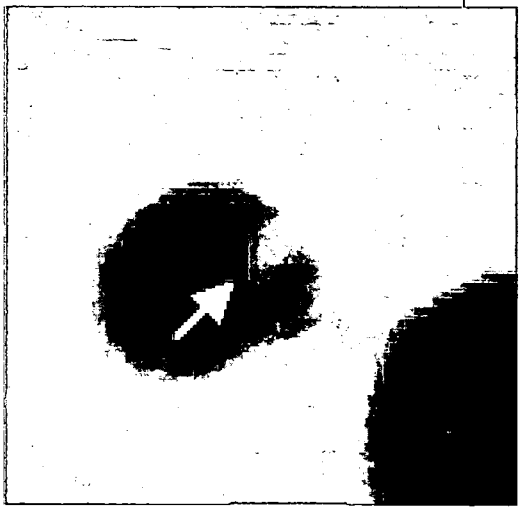

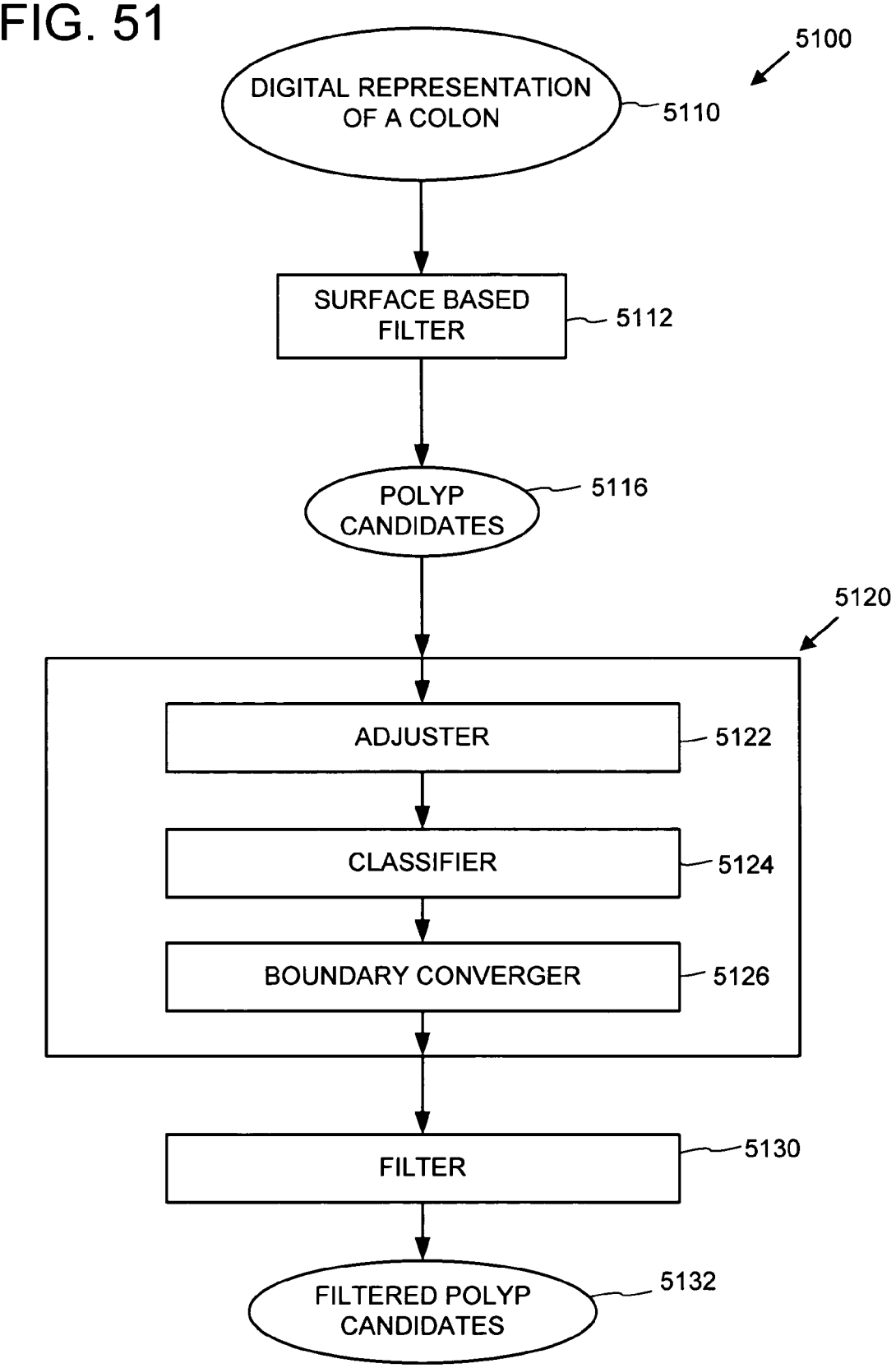

5210

5220

5230

5240

FIG. 53A
FIG. 53B
5310  5320
FIG. 53C
5330  5340
FIG. 53D
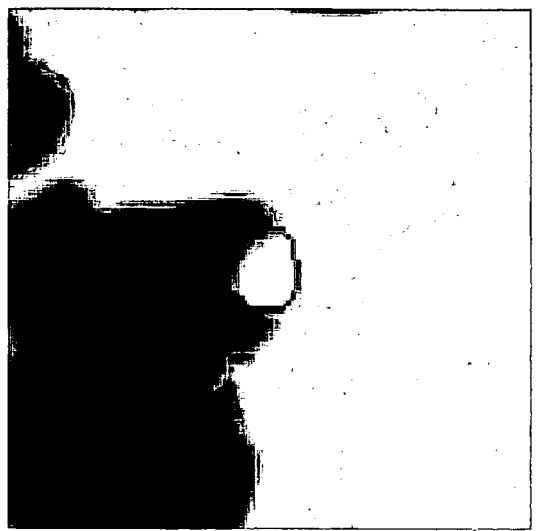
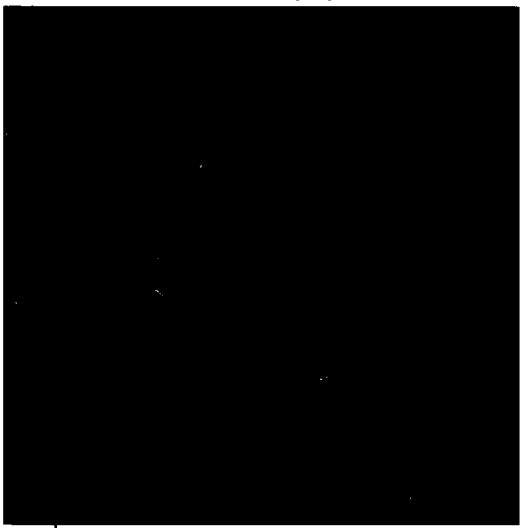
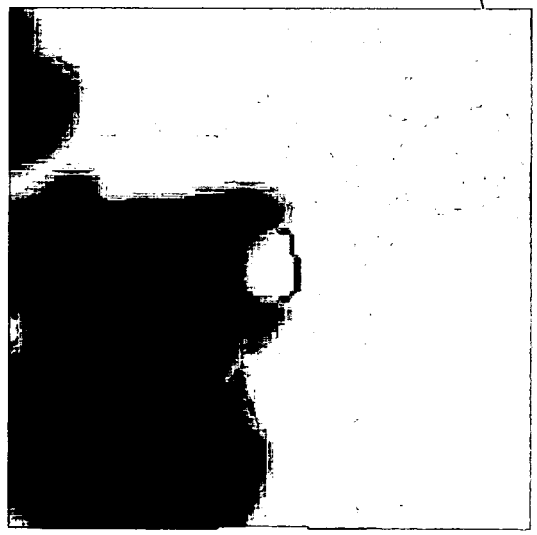
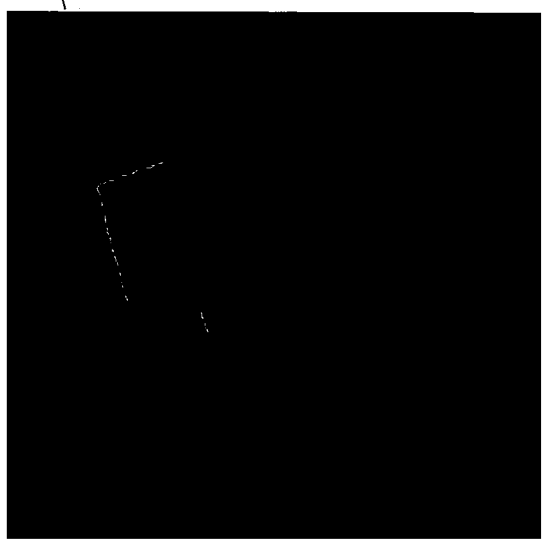

DETERMINATION OF FEATURE BOUNDARIES IN A DIGITAL REPRESENTATION OF AN ANATOMICAL STRUCTURE

CROSS-REFERENCE TO RELATED APPLICATIONS

This application claims the benefit of Summers et al., U.S. Provisional Patent Application No. 60/510,640, entitled, "AUTOMATED IDENTIFICATION OF ILEOCECAL VALVE," filed Oct. 10, 2003, which is hereby incorporated by reference herein.

TECHNICAL FIELD

The field relates to software analysis of images.

BACKGROUND

Technology for non-invasive observation of soft tissues of the body has provided significant advances in the field of medicine. For example, a number of techniques now make it possible to routinely image anatomical structures such as the heart, colon, bronchus, and esophagus within the body.

The widespread availability of skilled technicians and reduction in cost of the necessary equipment has encouraged the use of non-invasive imaging as a part of routine preventive care. Non-invasive imaging reduces the risk of observation-related injury or complication and reduces discomfort and inconvenience for the observed patient. These advantages encourage patients to undergo more frequent screening and permits earlier detection of potentially life-threatening conditions. For example, malignant or premalignant conditions can be identified and diagnosed at an early stage, when treatment is more likely to be successful.

In one commonly used imaging technique called Computed Tomography Imaging ("CT Scan"), multiple two-dimensional radiographic image cross-sections are taken of a particular region of the patient's body. A physician can then analyze the sectioned images to detect any features within the observed section and judge which features are of interest, requiring further attention or treatment.

To assure adequate coverage of the section being observed, a large number of cross-sectional slices can be obtained to increase the observation resolution. However, as the number of slices increases, the amount of data presented to the physician becomes more difficult to efficiently analyze. Accordingly, various software techniques have been applied with some success to aid in analyzing the data to identify features.

Although progress has been made in employing software to assist in detection of anatomical features, there are significant limitations to the current automated techniques. For example, one problem consistently plaguing such systems is the overabundance of false positives when detecting features of interest.

Typically, the software approach correctly identifies features of interest (i.e., the software exhibits superior sensitivity). However, the software also tends to incorrectly identify too many structures as features of interest (i.e., the software exhibits poor specificity). A feature incorrectly identified as a feature of interest is called a "false positive."

False positives are troublesome because any identified positives must be considered and evaluated by a human classifier (such as the physician or a technician). Even if a feature can be quickly dismissed as a false positive, too many false positives consume an inordinate amount of time and limit the usefulness of the software-based approach.

There thus remains a need for a way to improve the computer-based approaches for identifying features of interest in anatomical structures.

SUMMARY

Digital representations of portions of an anatomical structure can be processed to determine an enclosing three-dimensional boundary of features within the digital representations. For example, polyp boundaries in a virtual colon can be determined by software.

Components of the digital representation can be categorized into tissue types (for example, lumen, polyp tissue, and non-polyp tissue) based on proximity to an iso-boundary between lumen and wall in the digital representation and a curvature type of the iso-boundary. For example, if a component is close to a convex iso-boundary, its intensity can be adjusted to indicate that it is of polyp tissue type. The intensities can then be used in later stages to influence tissue type categorization and determination of an enclosing three-dimensional boundary.

Various other techniques can be employed when determining the boundary. For example, a fuzzy clustering technique can be used when categorizing components into tissue types. After categorizing components into tissue types, a deformable model can be used to converge to the boundary.

The techniques described herein can be applied in a two-dimensional scenario, in which an enclosing two-dimensional boundary is first determined in a two-dimensional digital representation (for example, a slice of a three-dimensional representation) and then propagated to neighboring slices to result in an enclosing three-dimensional boundary of a feature.

The techniques described herein can also be applied in a three-dimensional scenario, in which an enclosing three-dimensional boundary of a feature is determined using three-dimensional techniques for tissue classification and converging via a deformable surface to avoid propagation.

After an enclosing three-dimensional boundary has been determined, a variety of feature characteristics can be computed, which can be used to classify the feature as of interest (for example, a polyp) or not of interest (for example, normal tissue).

Features can be depicted in user interfaces, whether or not an enclosing boundary is determined.

Additional features and advantages of the technologies described herein will be made apparent from the following detailed description of illustrated embodiments, which proceeds with reference to the accompanying drawings.

BRIEF DESCRIPTION OF THE DRAWINGS

The patent or application file contains at least one drawing executing in color. Copies of this patent or patent application publication with color drawing(s) will be provided by the Office upon request and payment of the necessary fee.

FIGS. 26A-D are screen shots of views of a portion of a virtual colon, including screen shots in which the results of an exemplary classifier are depicted using brightness.

FIGS. 28A-D are screen shots of views of a portion of a virtual colon, including screen shots in which the results of an exemplary classifier are depicted using color or shading levels.

FIG. 32 is a flowchart of an exemplary method for converging to the enclosing boundary of a feature in a three-dimensional digital representation of at least a portion of a virtual anatomical structure.

FIG. 33 is a flowchart showing an exemplary method for converging to the enclosing boundary of a feature in a two dimensional digital representation of at least a portion of a virtual anatomical structure.

FIGS. 34A-D are screen shots of views of a portion of a virtual colon, including screen shots in which the results of an exemplary enclosing two-dimensional converger are depicted.

FIGS. 49A-D are screen shots of views of virtual colons, including screen shots of some typical polyp examples in CT colonography.

FIGS. 50A-D are screen shots of views of virtual colons, including screen shots of some typical polyp examples in CT colonography.

FIG. 51 is a flowchart of an exemplary method for determining polyp candidates from a digital representation of a colon.

FIGS. 53A-D are screen shots of views of virtual colons, including screen shots in which the experimental results of boundary determination using an exemplary two-dimensional method are compared to the results using an exemplary three-dimensional method. FIG. 53A is a screen shot of the results of an exemplary three-dimensional segmentation method displayed in a two-dimensional image. FIG. 53B is a screen shot of the three-dimensional results of an exemplary three-dimensional segmentation method for the same portion of a virtual colon displayed in FIG. 53A. FIG. 53C is a screen shot of the results of an exemplary two-dimensional segmentation method on the same portion of a virtual colon displayed in FIG. 53A. FIG. 53D is a screen shot of the results of stacking propagated two-dimensional images to create a three-dimensional image of the portion of a virtual colon displayed in FIG. 53C.

DETAILED DESCRIPTION

Overview of Technologies

Figure 1:
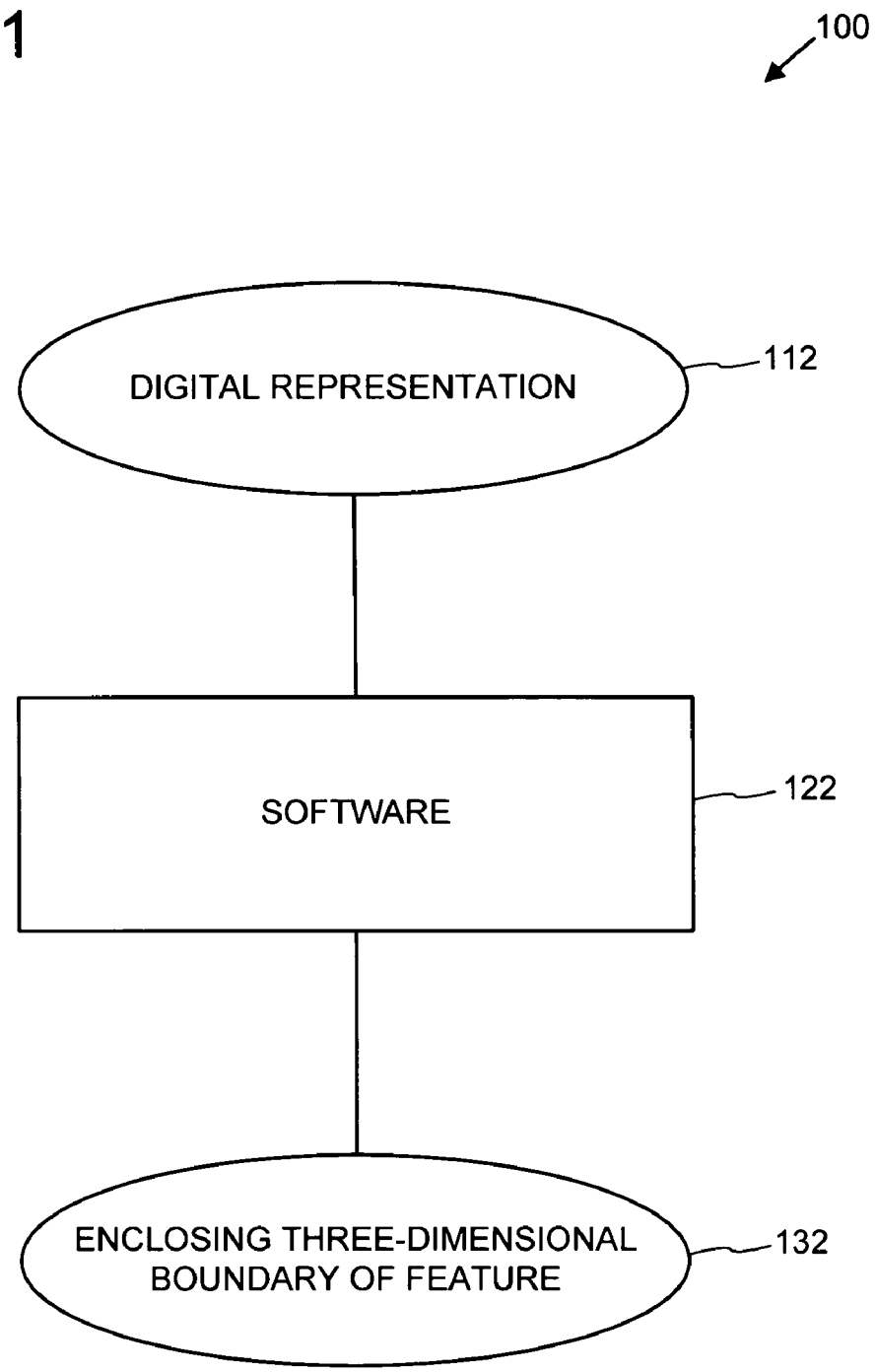
FIG. 1 is a block diagram of an exemplary system for processing a digital representation of at least a portion of an anatomical structure with software to determine an enclosing three-dimensional boundary of a feature represented in the digital representation.

The technologies described herein can be used in any of a variety of scenarios in which identification of features of interest in an anatomical structure is useful. For example, when performing computer-aided detection of polyps in a CT scan of the colon, identifying boundary characteristics of polyps can be useful in that the characteristics can be used to reduce the number of false positives to be reviewed when reviewing the CT scan data (for example, in a graphical depiction of the CT scan data).

A feature includes any structure or portion of a structure occurring in an anatomical structure. Features can include surface anomalies (e.g. wall surface anomalies), as well as normal surface structures (e.g. valves). For example, features include any number of cancerous or pre-cancerous growths, lesions, polyps, valves, or other features.

A feature of interest includes any feature occurring in an anatomical structure that is of interest. In practice, features of interest can include those features that require further review by a human reviewer. For example, features of interest can include cancerous or pre-cancerous growths, lesions, polyps, and the like.

In a fully automated system, the location, image, and characteristics of features of interest can be provided as a result. In a system with user (e.g. health specialist) assistance, a feature can be presented to the user for confirmation or rejection of the feature as being of interest. Those features confirmed as being of interest can then be provided as a result.

A candidate feature of interest includes any feature identified as a possible feature of interest by software. For example, software may preliminarily identify a set of candidate features of interest (for example, polyp candidates), some of which can include false positives. Software can then identify the features of interest within the candidates (for example, by determining a three-dimensional enclosing boundary of the candidate features of interest).

A digital representation includes any digital representation of an anatomical structure (or portion thereof) stored for processing in a digital computer. For example, representations can include two- or three-dimensional representations (for example, one or more images) of portions of an anatomical structure stored via a variety of data structures. Representations can be composed of pixels, voxels, or other elements. A digital representation of an anatomical structure is sometimes called "virtual" (for example, a "virtual colon") because it is a digital representation that can be analyzed to learn about the represented anatomical structure.

A component of a digital representation includes any two- or three-dimensional element that composes a part of a representation of a portion of an anatomical structure stored as an image. For example, pixels and voxels can be components.

A biological structure element includes tissue types (for example, polyp and non-polyp) and lumen. In some cases, it is convenient to refer to biological structure element types as "tissue types."

Enhancing includes the process of altering a digital representation of an anatomical structure (or portion thereof) for purposes of distinguishing between constituent parts. In practice, such enhancing can alter component intensities to better distinguish between features of interest and features not of interest.

Segmenting includes the process of dividing a digital representation of an anatomical structure into constituent parts into which a body, entity, or quantity is divided or marked off by or as if by natural boundaries. For example, in the case of the virtual colon, a feature can be segmented by two- or three-dimensional methods to determine the interior components and/or boundaries of the feature.

Classifying includes classifying curvature types, for example, designating the volumetric curvatures of the iso-boundary between the lumen air and colon wall as convex, flat, and concave.

Classifying also includes designating components as polyp, non-polyp, and lumen air, whether by a hard or fuzzy classification.

Classifying also includes designating an anomaly as of interest or as not of interest (e.g., disqualifying a candidate anomaly as being of interest). For example, in the case of a virtual colon, an anomaly can be classified as a polyp. In the example of the virtual bronchus, an anomaly can be classified as a lesion.

Imaging includes any techniques for obtaining an image of the inside of a body by transmitting electromagnetic or sonic waves through the body. Imaging includes radiographic images (with X-rays, for example CT), sonic energy (such as ultrasound) and magnetic fields (such as MRI).

Proximity includes any measure of distance. For example, distance in physical units, pixels, voxels, or the like can be used. A threshold distance can be used to determine whether a digital representation component is proximate to another item, such as an iso-boundary.

An iso-boundary includes any boundary between digital components having generally different properties, thus grouping digital components having similar properties on either side of the boundary. For example, an iso-value can be used to determine an iso-boundary dividing digital representation components (for example, dividing components representing lumen and wall). Such an iso-value can be intensity, an adjusted (for example, normalized) measurement of intensity, attenuation, an adjusted (for example, normalized) measurement of intensity or some combination thereof. For example, a Hounsfield units iso-value can be used to find a boundary between digital representation components on either side of the iso-value, thus forming an iso-boundary between lumen and wall.

After imaging is performed, automated detection of polyps can result in a list of polyp candidates. Various characteristics of the polyp candidates (for example density, volume, intensity, CT attenuation, aspect ratio, location within the colon, boundary type and curvature, wall thickness, anomaly neck, and the like) can be evaluated (or the mean or standard deviation of such values) to describe a polyp candidate or to determine whether the polyp candidate is of interest or not. If a polyp candidate is identified as not of interest, it can be acted upon accordingly (such as being removed from the list of polyp candidates).

It is important that the polyps be detected because they are often premalignant and are often prophylactically removed to avoid development of gastrointestinal adenocarcinoma. Thus, early detection enables early treatment (such as removal of the polyp) of possibly life-threatening conditions.

EXAMPLE 1

Exemplary System for Determining Boundary of a Feature in a Digital Representation of an Anatomical Structure FIG. 1 shows an exemplary system 100 for determining an enclosing three-dimensional boundary 132 of a feature in a digital representation 112 of at least a portion of an anatomical structure.

The digital representation 112 is processed by the software 122 to determine the enclosing three-dimensional boundary 132 of at least one feature represented in the digital representation 112. The software 122 can employ any combination of the technologies described herein.

In any of the examples described herein, a variety of feature characteristics can be determined via its enclosing boundaries 132 if desired. For example, geometric and volumetric characteristics can be determined via the enclosing boundaries.

Further, the boundaries 132 can be depicted via user interfaces. For example, a graphical depiction of a feature via its enclosing three-dimensional boundary can be displayed to a human classifier, who decides what action, if any, to take. Such user interfaces can allow manipulation of the graphical depiction, such as rotating, zooming, and the like.

EXAMPLE 2

Figure 2:
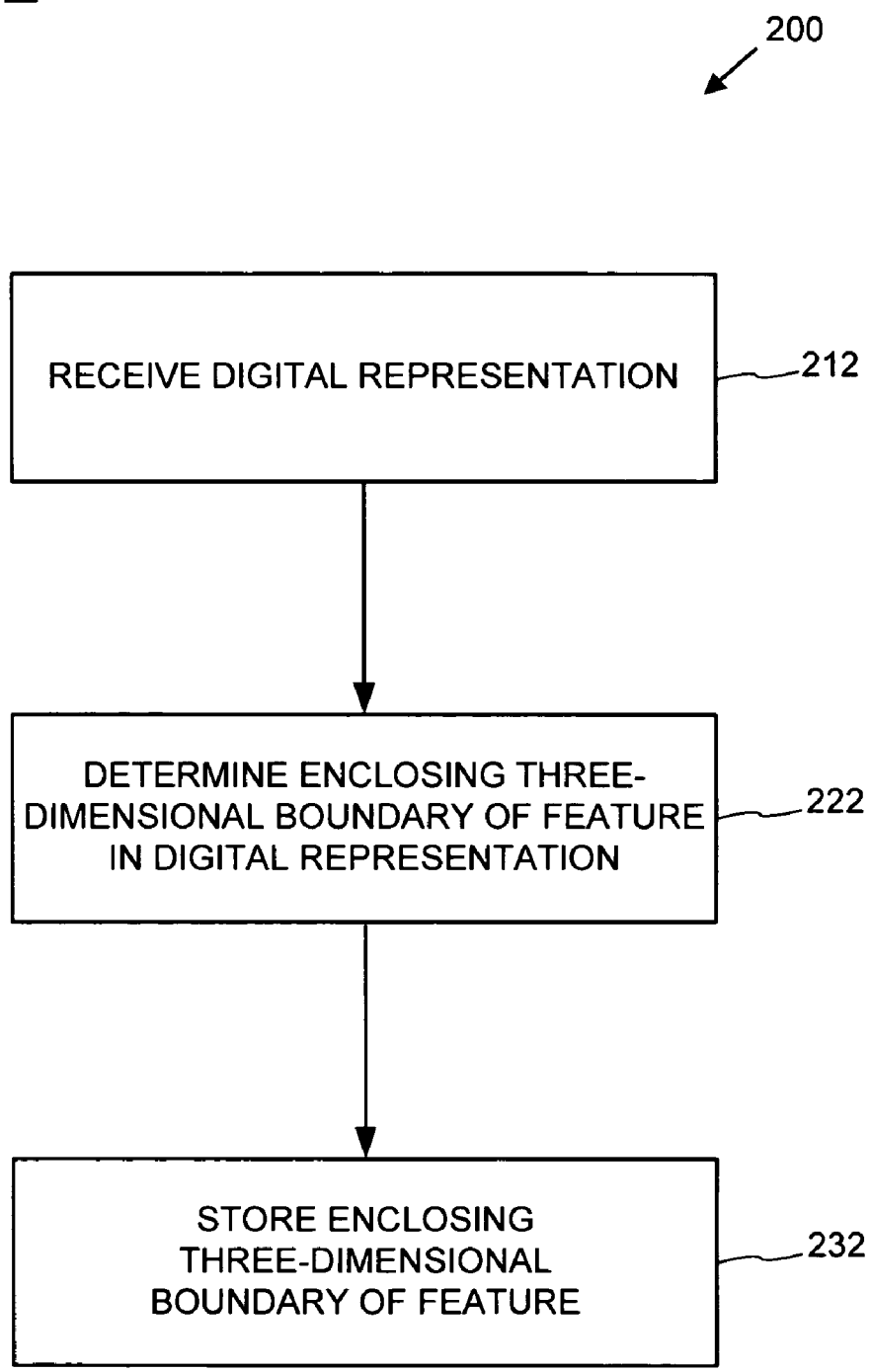
FIG. 2 is a flowchart showing an exemplary method for processing a digital representation to determine an enclosing three-dimensional boundary of a feature represented in the digital representation.

Exemplary Method for Determining Boundary of a Feature in a Digital Representation of an Anatomical Structure FIG. 2 shows an exemplary method 200 for determining an enclosing three-dimensional boundary of a feature represented in the digital representation. The method can be performed, for example, by the system 100 of FIG. 1. The method 200 and any of the other methods described herein can be performed by computer-executable instructions stored on one or more computer-readable media.

At 212, a digital representation (e.g., the digital representation 112 of FIG. 1) representing at least one feature in at least a portion of an anatomical structure is received.

At 222, an enclosing three-dimensional boundary of the feature in the digital representation is determined. As described in the examples, a variety of techniques can be used for determining such a boundary. For example, tissue types can be determined, and a boundary can be based on the tissue types.

At 232, the enclosing three-dimensional boundary of the feature can be stored in one or more computer-readable media.

EXAMPLE 3

Figure 3:
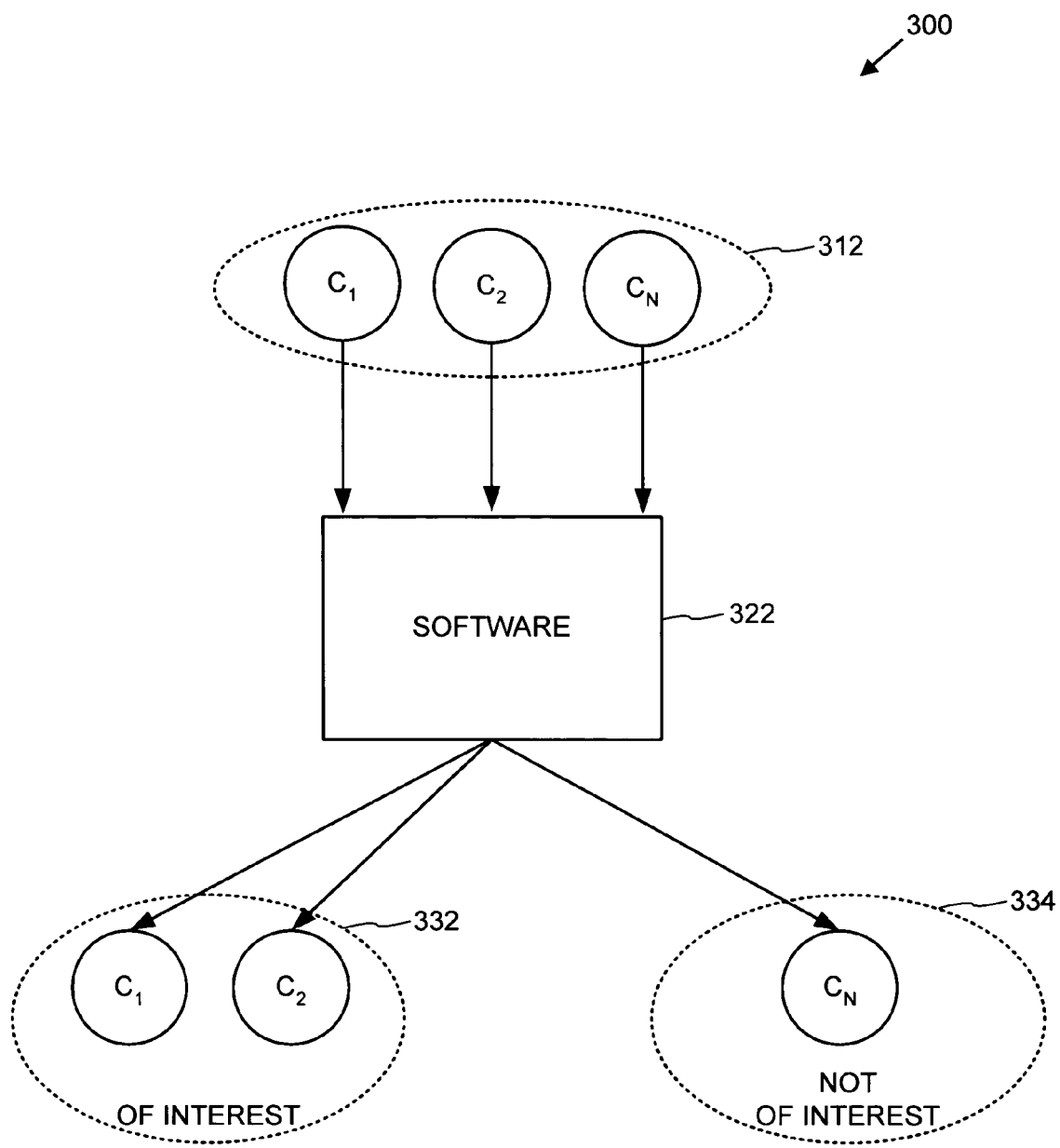
FIG. 3 is a block diagram of an exemplary system for processing a plurality of feature candidates with software to classify the feature candidates.

Exemplary System for Classifying Candidates in a Digital Representation via Boundary FIG. 3 shows an exemplary system 300 for processing a plurality of candidate features of interest with software to classify the candidate features of interest. A plurality of feature candidates 312 are received by the software 322, which indicates the classifications of interest 332 or not of interest 334. For example, in a system for identifying polyps in a virtual colon, a feature can be classified as being of interest (for example, a polyp) or not of interest (for example, not a polyp). Additional classifications are possible (e.g., classifying a candidate feature as being a normal anatomical structure).

The software 322 can employ any combination of the technologies described herein.

The feature candidates 312 can take a variety of forms. For example, other software (not shown) can scan a digital representation of at least a portion of an anatomical structure and detect features as candidate features of interest in the digital representation. Such an approach is described in Summers et al., U.S. patent application Ser. No. 10/671,749, filed Sep. 26, 2003, ("Summers I") which is hereby incorporated herein by reference.

The candidate features of interest 312 can then be presented as regions associated with the detected features. For example, a digital representation of a region including and surrounding the feature, such as an n by n pixel region (for example, 64×64 pixels or some other size) can be submitted. One interior point of such a feature is sometimes called a "seed." In any of the examples described herein, a digital representation of a region including and surrounding such a feature detected by other software as a candidate feature of interest can be used for a digital representation (for example, used for the digital representation 112 of FIG. 1).

The classifications 332 and 334 can be represented in a variety of ways. For example, a candidate can be explicitly labeled as being of interest or not of interest. Or, a list of features of interest can be maintained, and features determined not to be of interest can simply be removed from the list. In some cases, a feature need not be explicitly classified. For example, processing may fail to find an enclosing three-dimensional boundary for a feature because it is not a feature of interest. In such a case, it can simply be omitted from further presentation.

EXAMPLE 4

Figure 4:
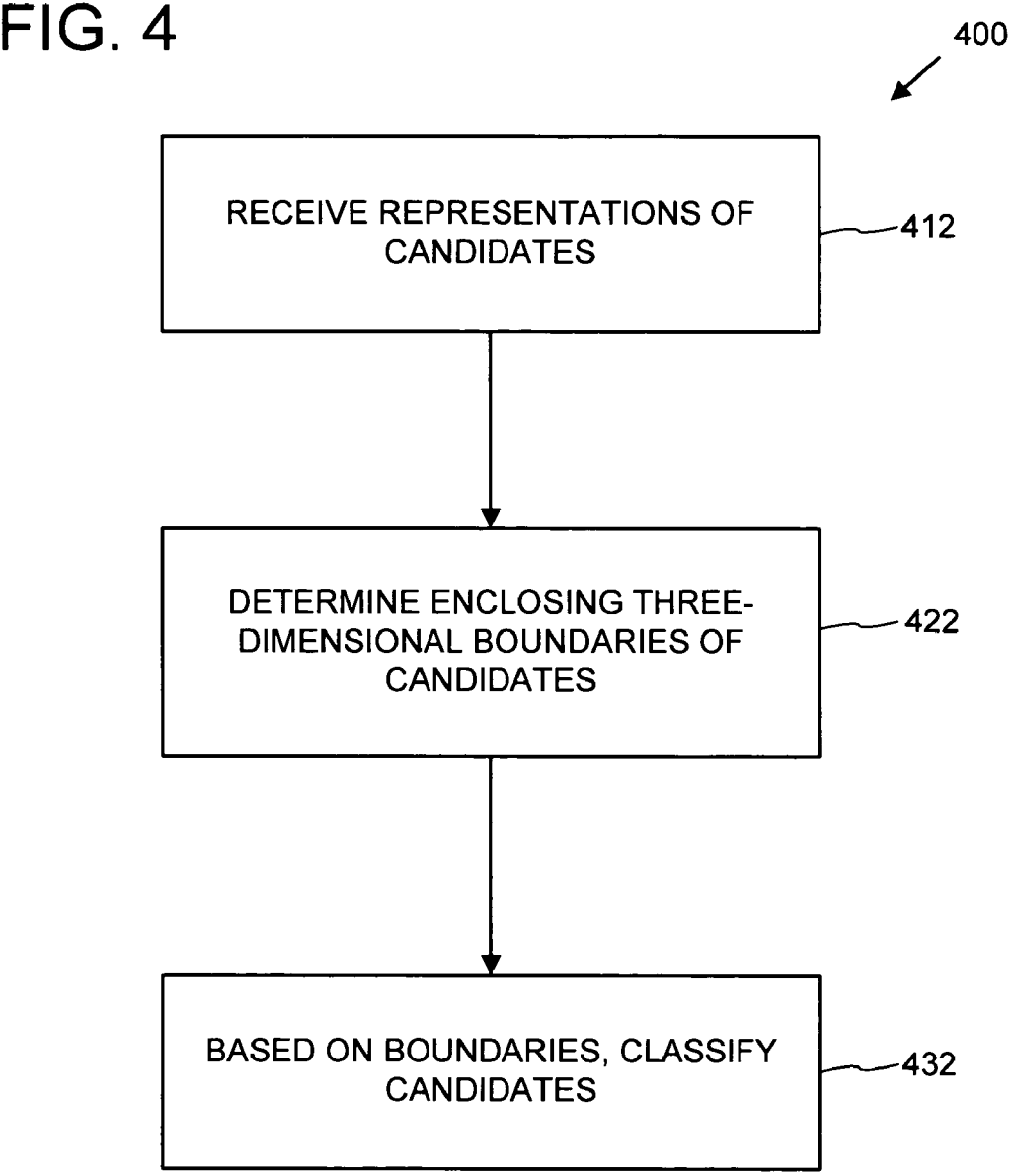
FIG. 4 is a flowchart showing an exemplary method for processing a plurality of feature candidates to classify the feature candidates.

Exemplary Method for Classifying Candidates in a Digital Representation via Boundary FIG. 4 shows an exemplary method 400 for processing a plurality of candidate features of interest to classify the candidate features of interest. The method 400 can be performed, for example, by the system 300 of FIG. 3.

At 412, digital representations of candidate features of interest (for example, the candidate features of interest 312 of FIG. 3) are received. At 422, enclosing three-dimensional boundaries of the candidates are determined via any of the technologies described in the examples herein. Based on the enclosing three-dimensional boundaries of the candidates, the candidates are classified at 432 (for example, into the classifications 332 and 334 of FIG. 3). The action of classification can be added to any of the methods described herein in which an enclosing three-dimensional boundary is determined. Classification can be based on a variety of characteristics, such as geometric and volumetric characteristics as determined via the enclosing three-dimensional boundary.

EXAMPLE 5

Figure 5:
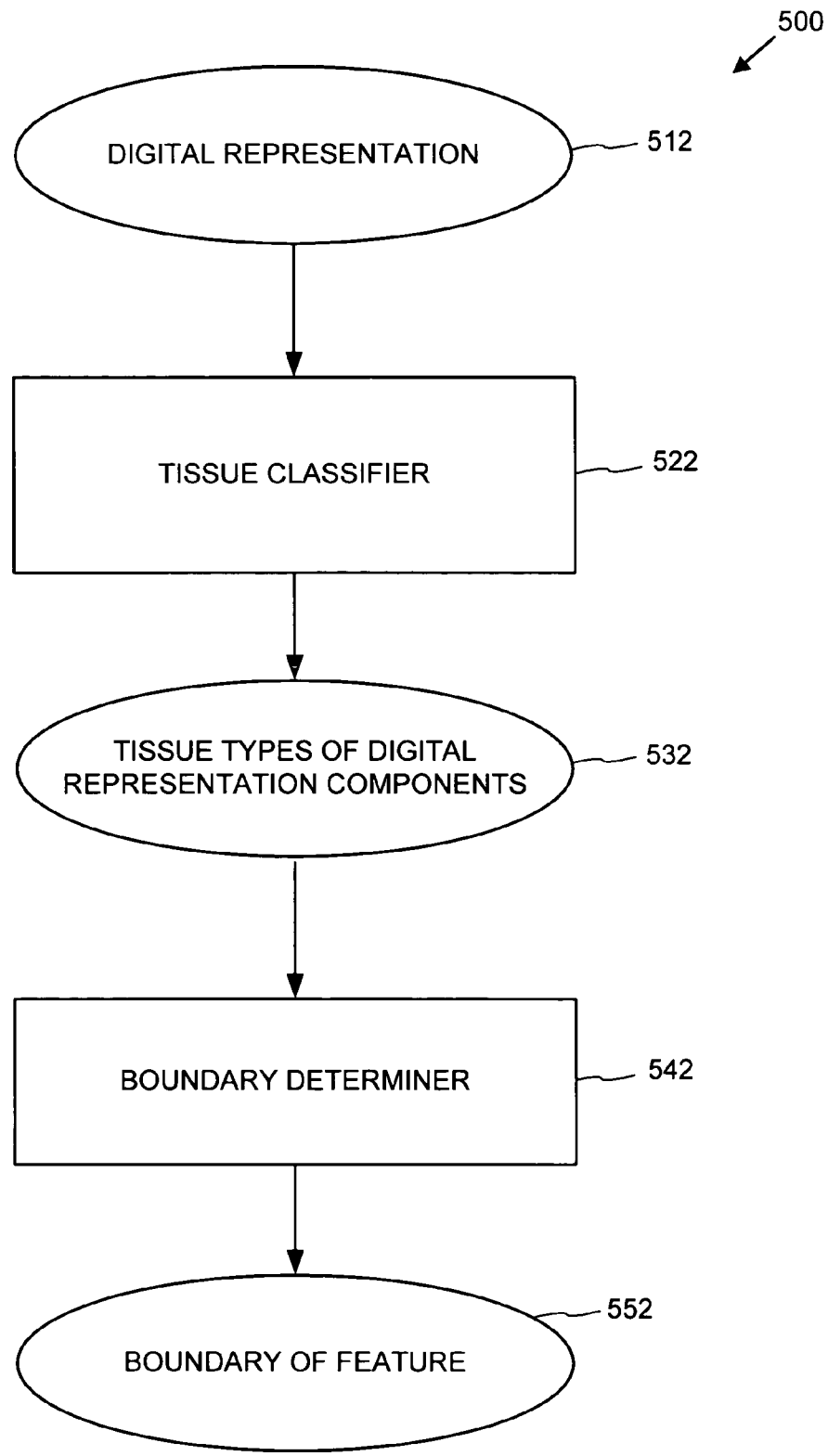
FIG. 5 is a block diagram of an exemplary system for determining an enclosing three-dimensional boundary of a feature via tissue types.

Exemplary System for Determining an Enclosing Three-Dimensional Boundary via Tissue Types FIG. 5 shows an exemplary system 500 for determining an enclosing three-dimensional boundary via tissue types. A tissue classifier 522 can receive a digital representation 512 (for example, the digital representation 112 of FIG. 1) and determine indications of tissue types 532 for respective components of the digital representation. As described herein, the indications of tissue types can indicate a tissue type membership value indicative of a probability of tissue type membership for a component of the digital representation.

A boundary determiner 542 can then receive the indications of tissue types 532 and determine an enclosing three-dimensional boundary 552 of a feature in the digital representation 512.

EXAMPLE 6

Figure 6:
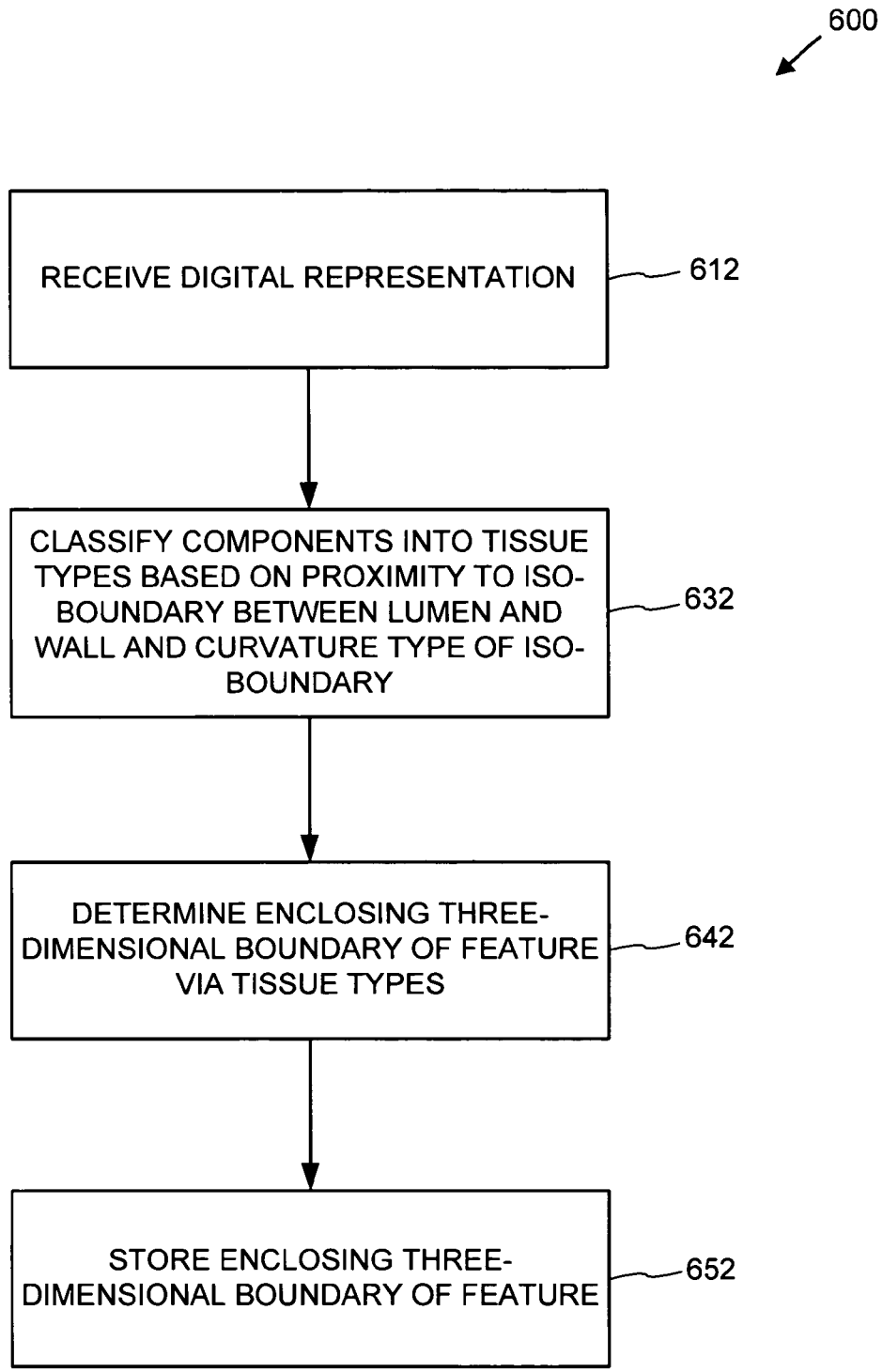
FIG. 6 is a flowchart showing an exemplary method for determining an enclosing boundary of a feature via tissue types.

Exemplary Method for Determining an Enclosing Three-Dimensional Boundary via Tissue Types FIG. 6 shows an exemplary method 600 for determining an enclosing three-dimensional boundary via tissue types. The method 600 can be performed, for example, by the system 500 of FIG. 5.

At 612, a digital representation (for example, the digital representation 112 of FIG. 1) representing at least one feature is received. At 632, components of the digital representation are classified based at least on proximity of a component to an iso-boundary between lumen and wall in the digital representation and curvature type of the iso-boundary. For example, for a particular digital representation component that is close to an iso-boundary of a convex curvature type, a tissue type indicative of a polyp can be assigned.

At 642, based on the tissue types, an enclosing three-dimensional boundary of the feature is determined. For example, boundaries between the tissue types can be detected and used for determining an enclosing three-dimensional boundary. At 652, the boundary is stored.

EXAMPLE 7

Figure 7:
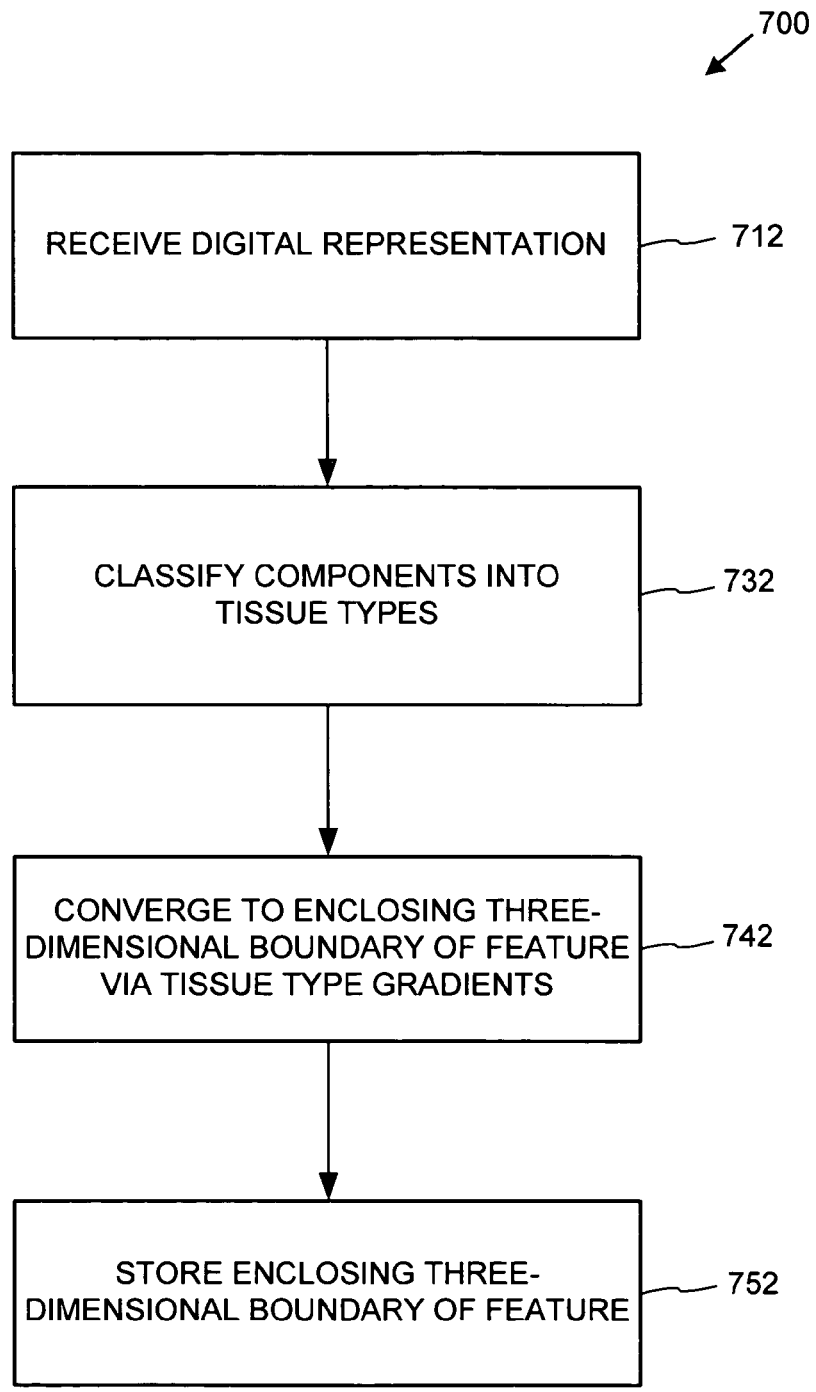
FIG. 7 is a flowchart showing exemplary method for determining an enclosing three-dimensional boundary via converging via tissue type gradients.

Exemplary Method for Determining an Enclosing Three-dimensional Boundary via Tissue Types FIG. 7 shows an exemplary method for determining an enclosing three-dimensional boundary via converging via tissue type gradients. The method 700 can be performed, for example, by the system 500 of FIG. 5.

At 712, a digital representation (for example, the digital representation 112 of FIG. 1) representing at least one feature is received. At 732, components of the digital representation are classified into tissue types. At 742, the enclosing three-dimensional boundary of the feature is converged to via tissue type gradients.

At 752, the three-dimensional enclosing boundary of the feature is stored.

EXAMPLE 8

Figure 8:
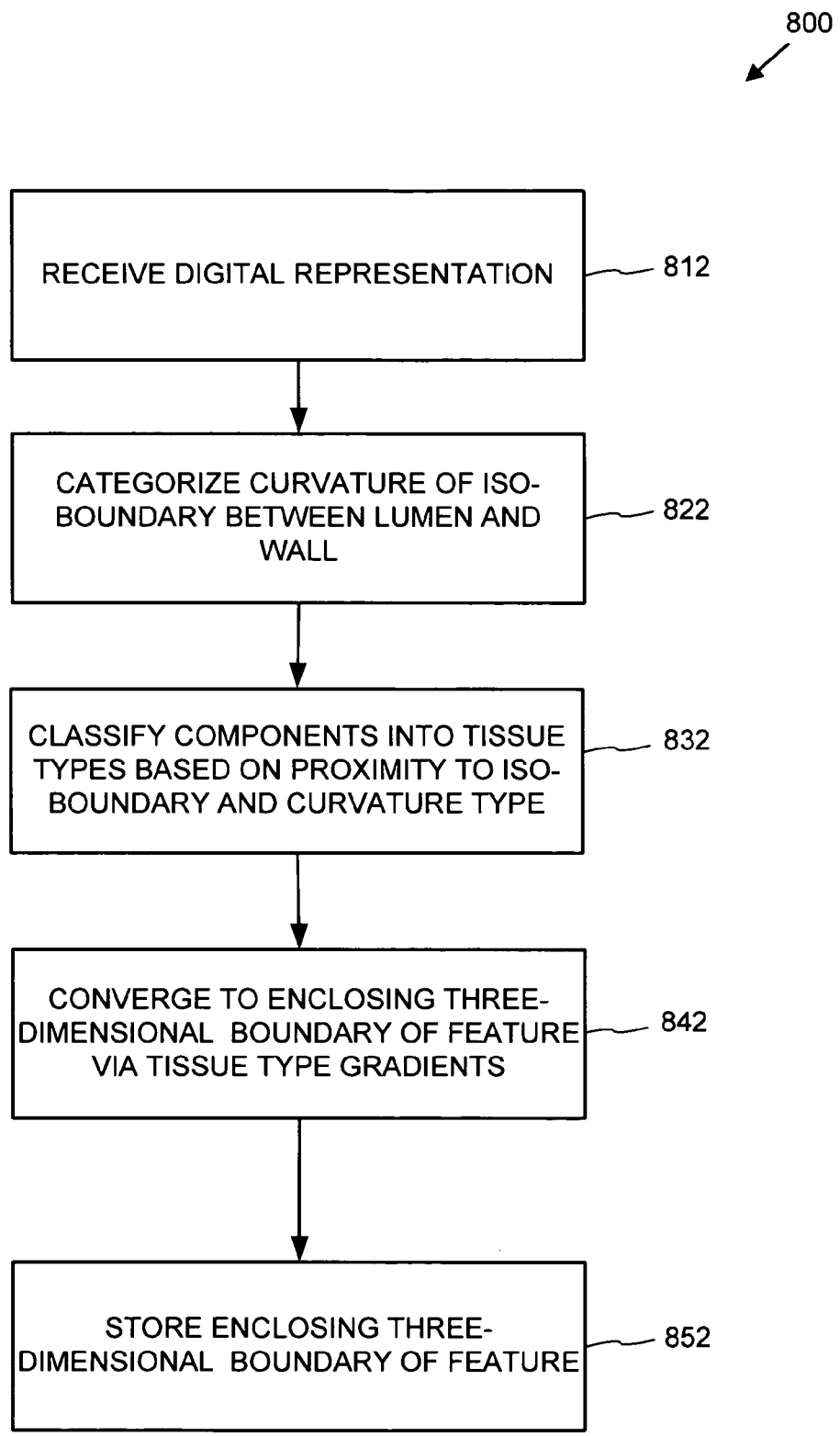
FIG. 8 is a flowchart showing exemplary method for determining an enclosing boundary via categorizing curvature of an iso-boundary between lumen and wall, classifying components into tissue type based on the iso-boundary, and converging to an enclosing three-dimensional boundary via tissue type gradients.

Exemplary Method for Determining an Enclosing
Three-Dimensional Boundary via Tissue Types FIG. 8 shows an exemplary method for determining an enclosing three-dimensional boundary via converging via tissue type gradients. The method 800 can be performed, for example, by the system 500 of FIG. 5.

At 812, a digital representation (for example, the digital representation 112 of FIG. 1) representing at least one feature is received. At 822, curvature of an iso-boundary between lumen and wall of the digital representation is categorized into a curvature type.

At 832, components of the digital representation are classified based at least on proximity of a component to an iso-boundary between lumen and wall in the digital representation and curvature type of the iso-boundary.

At 842, the enclosing three-dimensional boundary of the feature is converged to via tissue type gradients. At 852, the enclosing three-dimensional boundary of the feature is stored.

EXAMPLE 9

Exemplary Characteristics Based on Boundary

In any of the examples herein, after an enclosing three-dimensional boundary of a feature has been determined, a variety of characteristics can be computed based on the boundary. For example characteristics within the boundary, along the boundary, or both can be computed. The boundary itself can be included when determining characteristics within a boundary.

Such characteristics can include density, volume, intensity, attenuation (for example, CT attenuation), location within the colon, boundary type, boundary curvature, wall thickness, feature aspect ratio, location within the anatomical structure, neck characteristics, and the like. Means (for example, mean attenuation) or standard deviations of such values can also be used as characteristics of a feature.

The characteristics can be used when software describes the feature or when classifying a feature (for example, as of interest or not of interest).

EXAMPLE 10

Exemplary Classification of Features Based on Boundary

The characteristics computed for a feature can be compared with paradigmatic characteristics of digital representations of known polyp, lesion, or non-polyp structure characteristics. Based on determining that the digital representation has the characteristics of a polyp, lesion, or non-polyp structure, a feature can be classified accordingly.

To achieve classification, characteristics can be used as input to a classifier, such as a rule-based system, a neural network, or a support vector machine. The classifier can draw upon the various characteristics to provide a classification of the candidate feature of interest.

For example, the digital representation can be removed from a list of polyp candidates or depicted distinctively in a visual depiction.

EXAMPLE 11

Exemplary Anatomical Structures

The technologies described herein can be applied to a variety of anatomical structures. For example, the technologies can be applied to the colon, bronchus, esophagus, blood vessels, bladder, urinary tract, billiary tract, cerebrospinal spinal fluid containing spaces of the brain, paranasal sinuses, chambers of the heart, or the like.

EXAMPLE 12

Exemplary Enclosing Boundary

An enclosing boundary can include any boundary that encloses a feature. The boundary can be a surface or at the surface of the feature. In some cases, the boundary may not be exact, so it may be somewhat outside or inside the feature itself.

EXAMPLE 13

Figure 9:
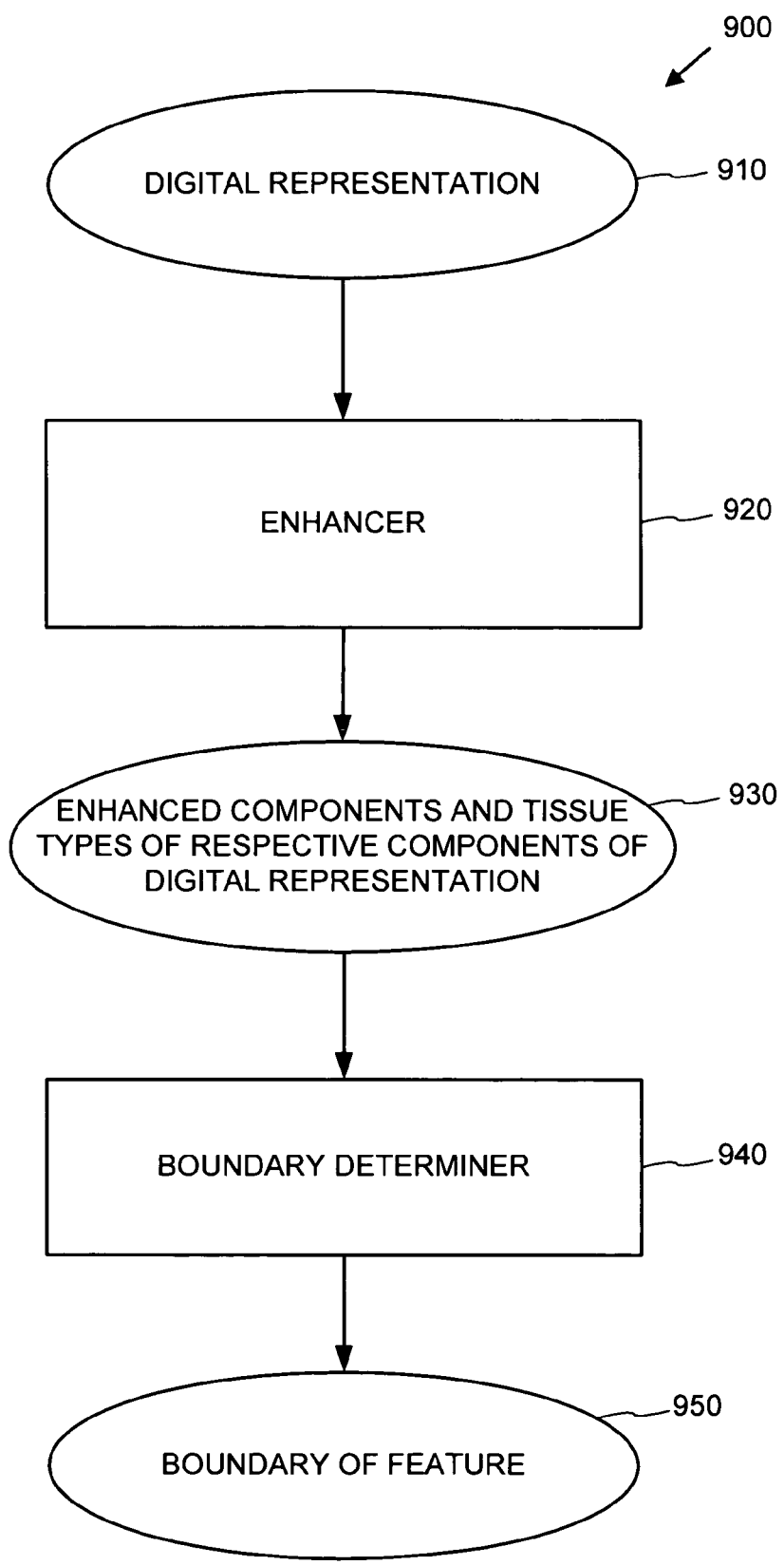
FIG. 9 is a block diagram of an exemplary system for determining an enclosing three-dimensional boundary in a digital representation of at least a portion of an anatomical structure.

Exemplary System for Determining Enclosing
Three-Dimensional Boundary of a Feature FIG. 9 shows an exemplary system 900 for determining an enclosing three-dimensional boundary of a feature. A component and biological structural element type enhancer 920 can receive a digital representation 910 (for example, the digital representation 112 of FIG. 1) and enhance (for example, alter) the intensities of respective components and biological structural element types for respective components 930 of the digital representation. A boundary determiner 940 (for example, the boundary determiner 542 of FIG. 5) can then receive the enhanced components and biological structural element types for respective components and determine an enclosing three-dimensional boundary 950 (for example, the enclosing three-dimensional boundary 552 of a feature of FIG. 5).

EXAMPLE 14

Figure 10:
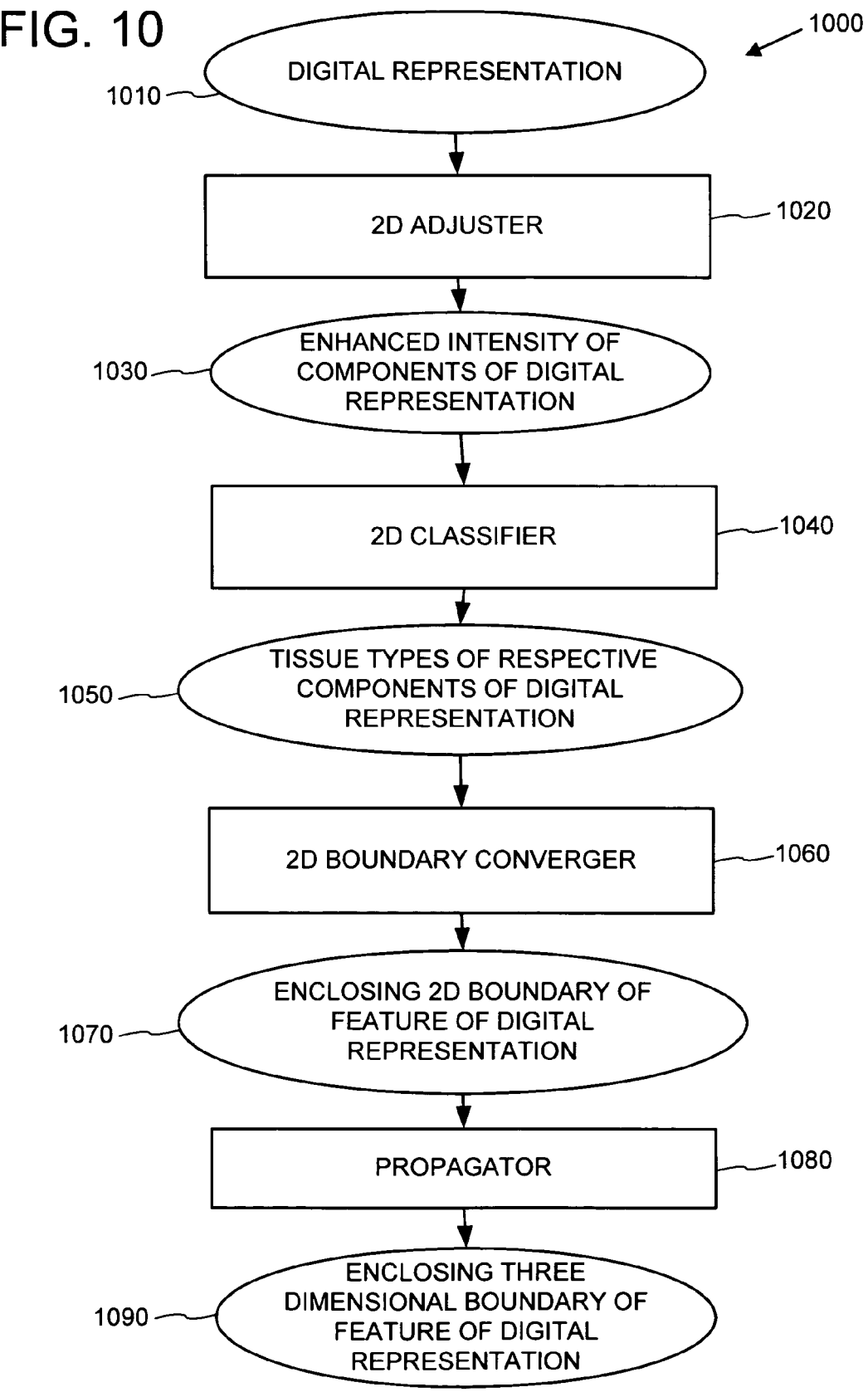
FIG. 10 is a block diagram of an exemplary system for determining an enclosing three-dimensional boundary in a digital representation of at least a portion of an anatomical structure, via two-dimensional analysis of the digital representation.

Exemplary System for Determining Enclosing
Three-Dimensional Boundary of a Feature via
Two-Dimensional Analysis FIG. 10 shows an exemplary system 1000 for determining an enclosing three-dimensional boundary of a feature in a two-dimensional digital representation scenario. A two-dimensional component adjuster 1020 can receive a two-dimensional slice of a digital representation 1010 (for example, the digital representation 112 of FIG. 1) and enhance the intensities of respective components 1030 of the digital representation. A two-dimensional classifier 1040 (for example, the biological structural element classifier 522 of FIG. 5) can receive the enhanced components and determine biological structural element types of respective components of the digital representation 1050. A two-dimensional boundary converger 1060 can then receive the biological structure element types in a two-dimensional slice of the digital representation and determine an enclosing two-dimensional boundary of the feature 1070 via biological structural element type gradients. A propagator 1080 can receive an enclosing two-dimensional boundary of the feature and propagate the two-dimensional converger 1060 to adjacent two-dimensional slices of the digital representations of the feature. A propagator 1080 then combines multiple adjacent slices of two-dimensional boundaries of the feature to form an enclosing three-dimensional boundary of the feature 1090.

EXAMPLE 15

Exemplary System for Determining Enclosing Three-Dimensional

Figure 11:
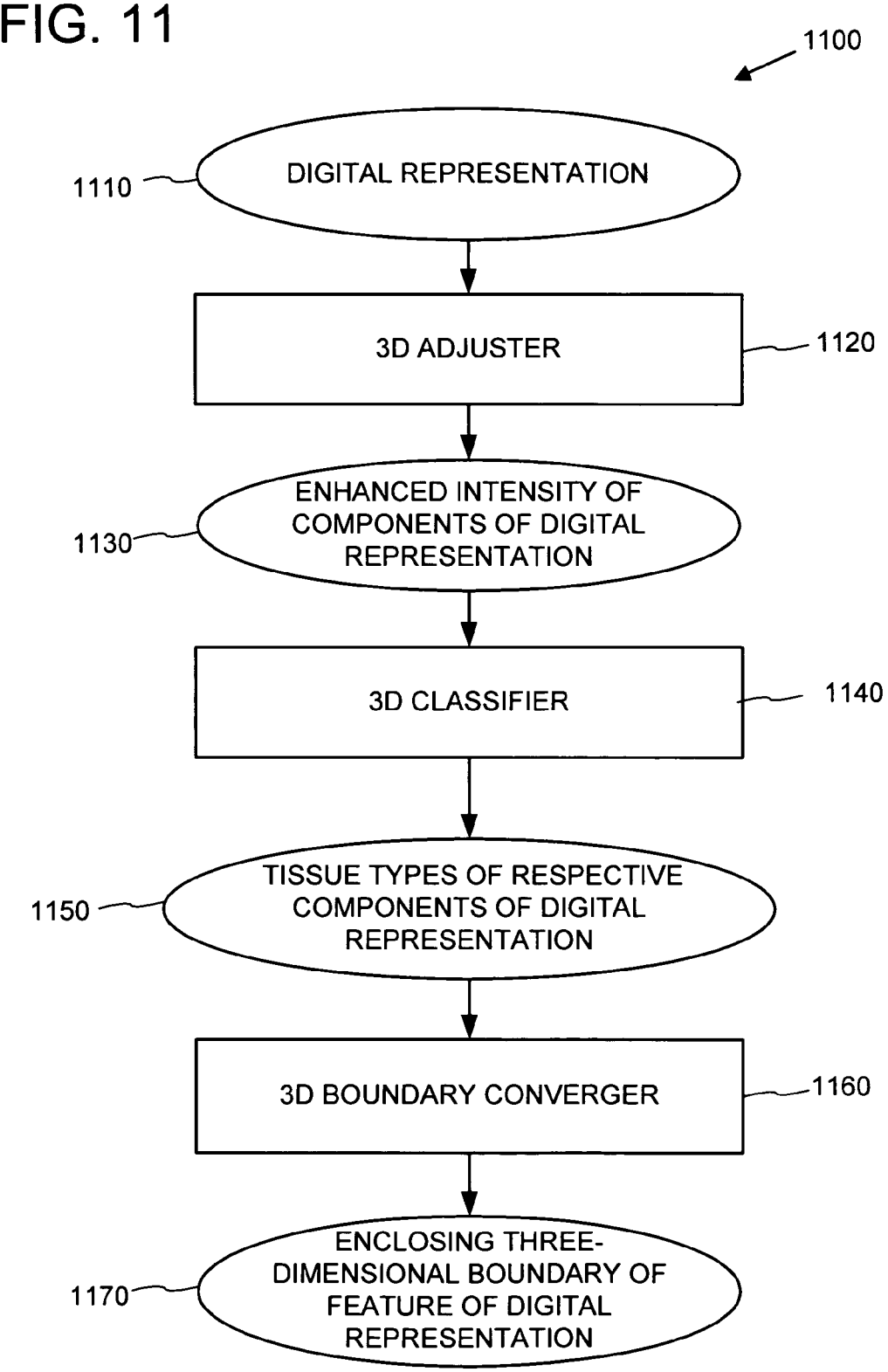
FIG. 11 is a block diagram of an exemplary system for determining an enclosing three-dimensional boundary in a digital representation of at least a portion of a virtual anatomical structure, via three-dimensional analysis of the digital representation.

Boundary of a Feature via Three-Dimensional Analysis FIG. 11 shows an exemplary system 1100 for determining an enclosing three-dimensional boundary of a feature. A three-dimensional component adjuster 1120 can receive a digital representation 1110 (for example, the digital representation 112 of FIG. 1) and enhance the intensities of respective components 1130 of the digital representation. A three-dimensional classifier 1140 (for example the biological structural element classifier 522 of FIG. 5) can receive the enhanced components and determine biological structural types of respective components of the digital representation 1150. A three-dimensional boundary converger 1160 can then receive the biological structure element types in the digital representation and determine an enclosing three-dimensional boundary of the feature 1170.

EXAMPLE 16

Figure 12:
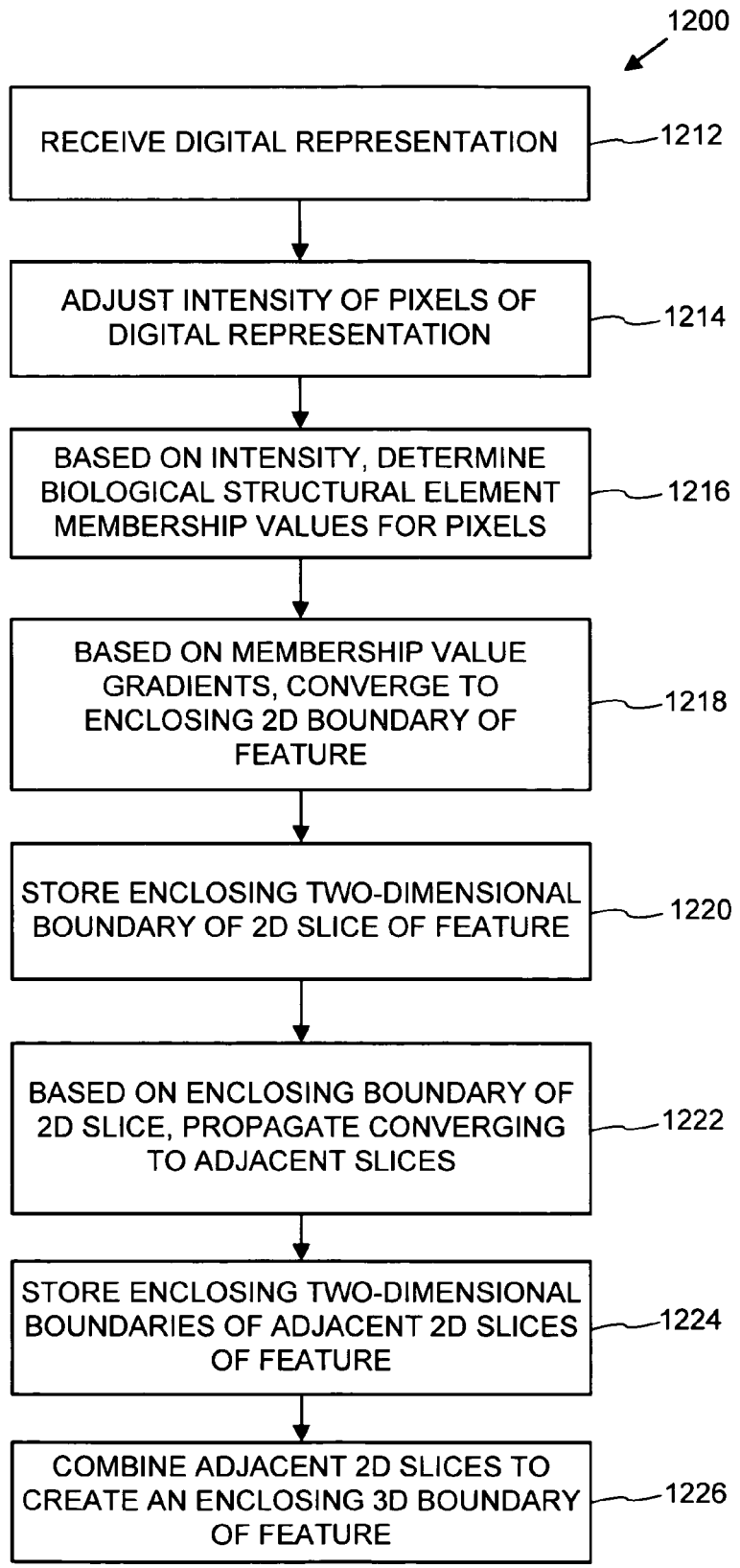
FIG. 12 is a flowchart showing an exemplary method for determining an enclosing three-dimensional boundary in a digital representation of at least a portion of a virtual anatomical structure, via a two-dimensional slice of the digital representation.

Exemplary Method for Determining Enclosing Three-Dimensional Boundary of a Feature via Two-Dimensional Analysis FIG. 12 shows an exemplary method for determining an enclosing three-dimensional boundary of a feature, via a two-dimensional slice of the digital representation. The method 1200 can be performed, for example, by the system 1000 of FIG. 10.

At 1212, a digital representation (for example, the digital representation 112 of FIG. 1) representing at least one feature is received. At 1214, intensity of pixels is adjusted based on at least proximity of a pixel to an iso-boundary between lumen and wall in the digital representation and curvature type of the iso-boundary.

At 1216, biological structural element membership values are determined for pixels based on at least the intensity of the pixels.

At 1218, the enclosing two-dimensional boundary of the feature is converged to via biological structural element membership type gradients. At 1220, the enclosing two-dimensional boundary of a two-dimensional slice of the feature is stored.

At 1222, the converging to the two-dimensional boundary of a feature via biological structural element membership type gradients is propagated to adjacent two-dimensional slices of the feature. At 1224, the enclosing two-dimensional boundaries of adjacent two-dimensional slices of the feature are stored.

At 1226, the adjacent enclosing two-dimensional boundaries of the feature are combined to create an enclosing three-dimensional boundary of the feature.

EXAMPLE 17

Figure 13:
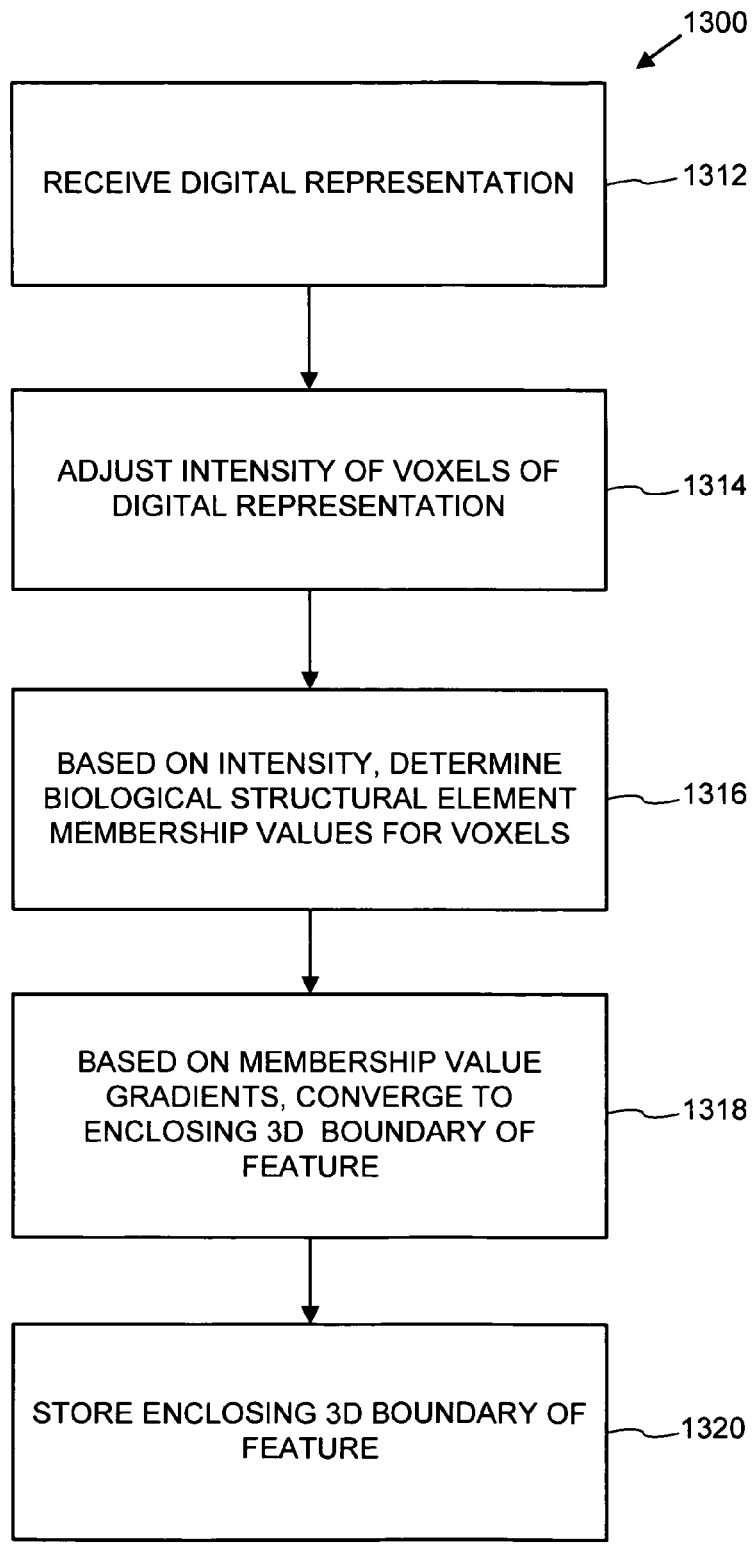
FIG. 13 is a flowchart showing an exemplary method for determining an enclosing three-dimensional boundary in a digital representation of at least a portion of a virtual anatomical structure, via three dimensional analysis.

Exemplary Method for Determining Enclosing Three-Dimensional Boundary of a Feature via Three-Dimensional Analysis FIG. 13 shows an exemplary method for determining an enclosing three-dimensional boundary of a feature, via three-dimensional analysis of the digital representation. The method 1300 can be performed, for example, by the system 1100 of FIG. 11.

At 1312, a digital representation (for example, the digital representation 112 of FIG. 1) representing at least one feature is received. At 1314, intensity of voxels is adjusted based on at least proximity of a voxel to an iso-boundary between lumen and wall in the digital representation and curvature type of the iso-boundary.

At 1316, biological structural element membership values are determined for voxels based on at least the intensity of the voxels.

At 1318, the enclosing three-dimensional boundary of the feature is converged to via biological structural element membership type gradients. At 1320, the enclosing three-dimensional boundary of the feature is stored.

EXAMPLE 18

Figure 14:
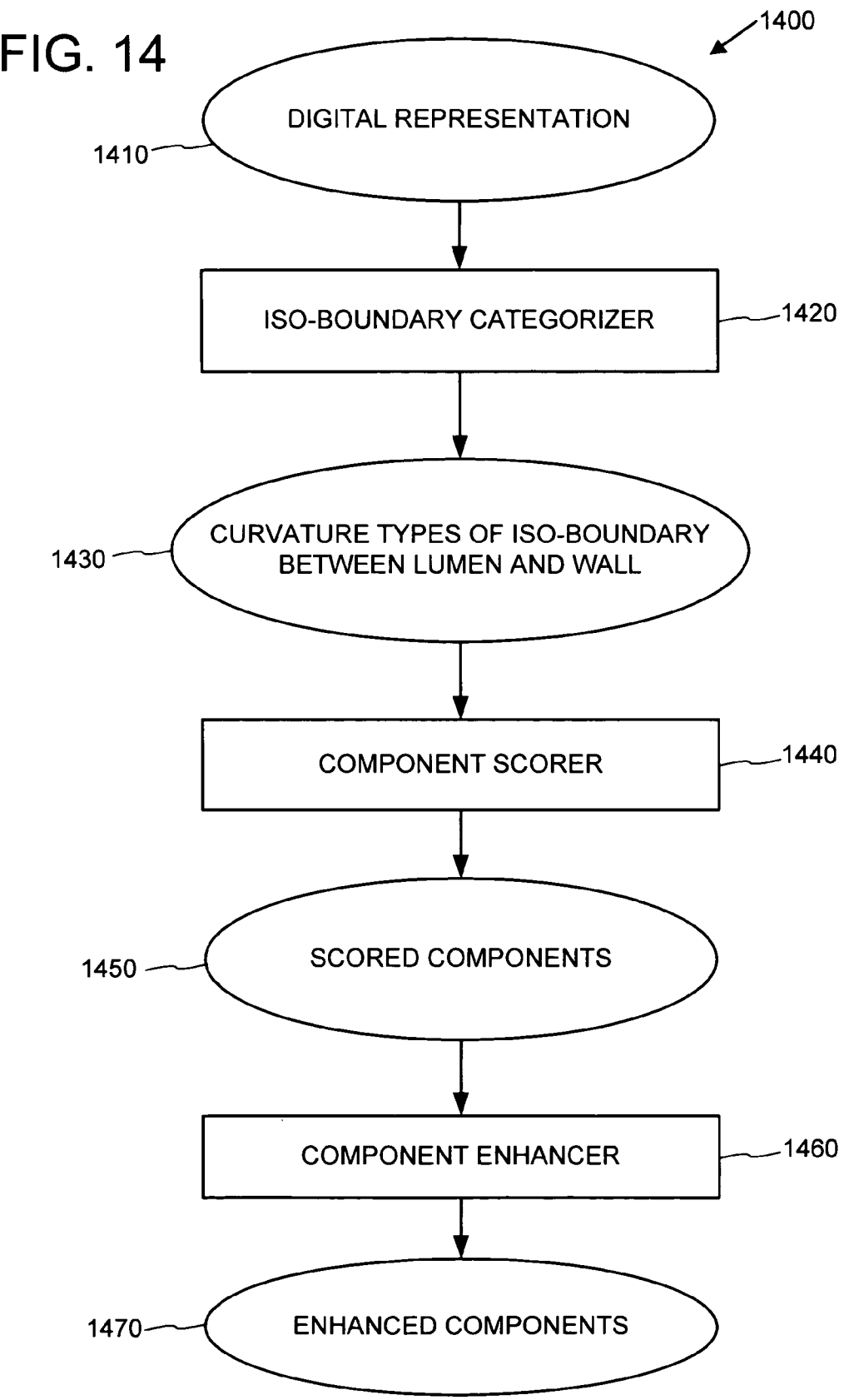
FIG. 14 is a block diagram of an exemplary system for adjusting the intensity of components in a digital representation of at least a portion of a virtual anatomical structure.

Exemplary System for Adjusting the Intensity of Components of a Digital Representation FIG. 14 shows an exemplary system 1400 for adjusting the intensity of components of a digital representation. An iso-boundary categorizer 1420 can receive a digital representation 1410 (for example, the digital representation 112 of FIG. 1) and determine indications of curvature types 1430 of iso-boundary between lumen and wall. A component scorer 1440 can then receive the indications of curvature types 1430 and determine scores for components 1450 in the digital representation. A component enhancer 1460 can then receive the scores for components 1450 and enhance components 1470 in the digital representation.

EXAMPLE 19

Figure 15:
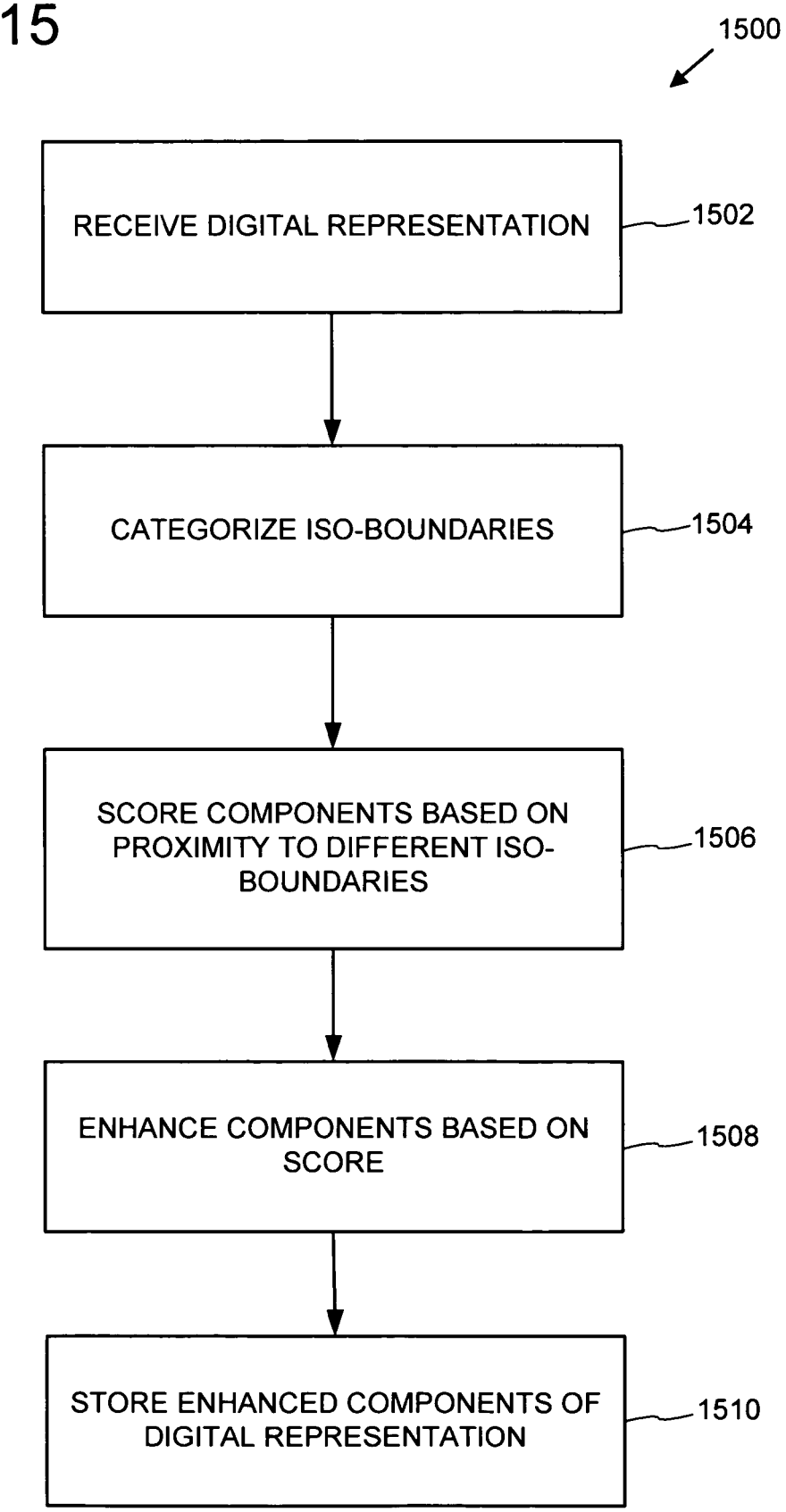
FIG. 15 is a flowchart showing an exemplary method for adjusting the intensity of components in a digital representation of at least a portion of a virtual anatomical structure.

Exemplary Method for Adjusting the Intensity of Components of a Digital Representation FIG. 15 shows an exemplary method for adjusting the intensity of components of a digital representation. The method 1500 can be performed, for example, by the system 1400 of FIG. 14.

At 1502, a digital representation (for example, the digital representation 112 of FIG. 1) representing at least one feature is received. At 1504, curvature of an iso-boundary between lumen and wall of the digital representation is categorized into a curvature type.

At 1506, components of the digital representation are scored based at least on proximity of a component to an iso-boundary between lumen and wall in the digital representation and curvature type of the iso-boundary.

At 1508, components of the digital representation are enhanced based at least on score of a component. At 1510, the enhanced components of the digital representation are stored.

EXAMPLE 20

Figure 16:
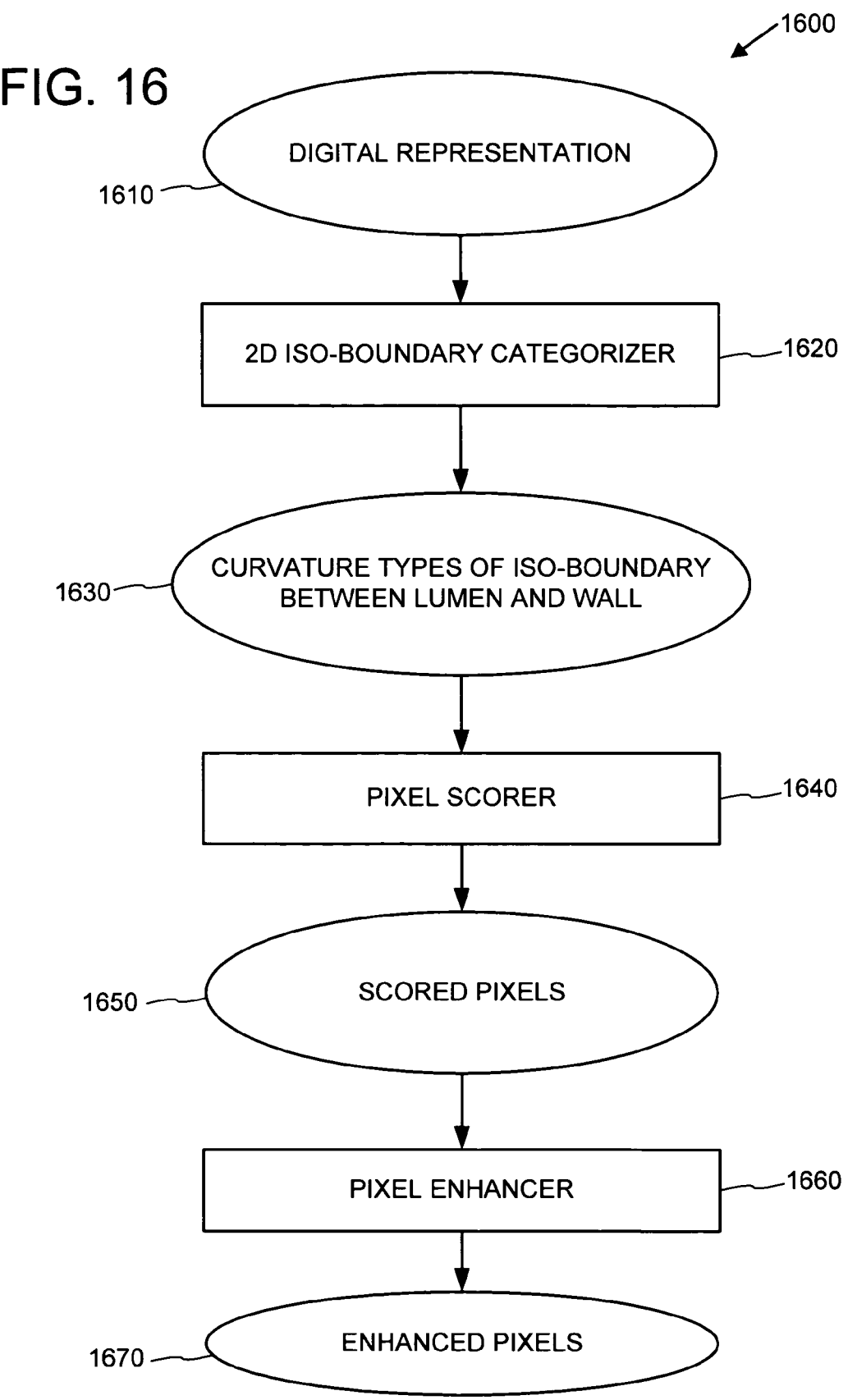
FIG. 16 is a block diagram of an exemplary system for adjusting the intensity of pixels in a two-dimensional digital representation of at least a portion of a virtual anatomical structure.

Exemplary System for Adjusting the Intensity of Pixels of a Two-Dimensional Digital Representation FIG. 16 shows an exemplary system 1600 for adjusting the intensity of pixels of a two-dimensional digital representation. A two-dimensional iso-boundary categorizer 1620 can receive a digital representation 1610 (for example, the digital representation 112 of FIG. 1) and determine indications of curvature types 1630 of iso-boundary between lumen and wall. A pixel scorer 1640 can then receive the indications of curvature types 1630 and determine scores for pixels 1650 in the digital representation. A pixel enhancer 1660 can then receive the scores for pixels 1650 and enhance pixels 1670 in the digital representation.

EXAMPLE 21

Figure 17:
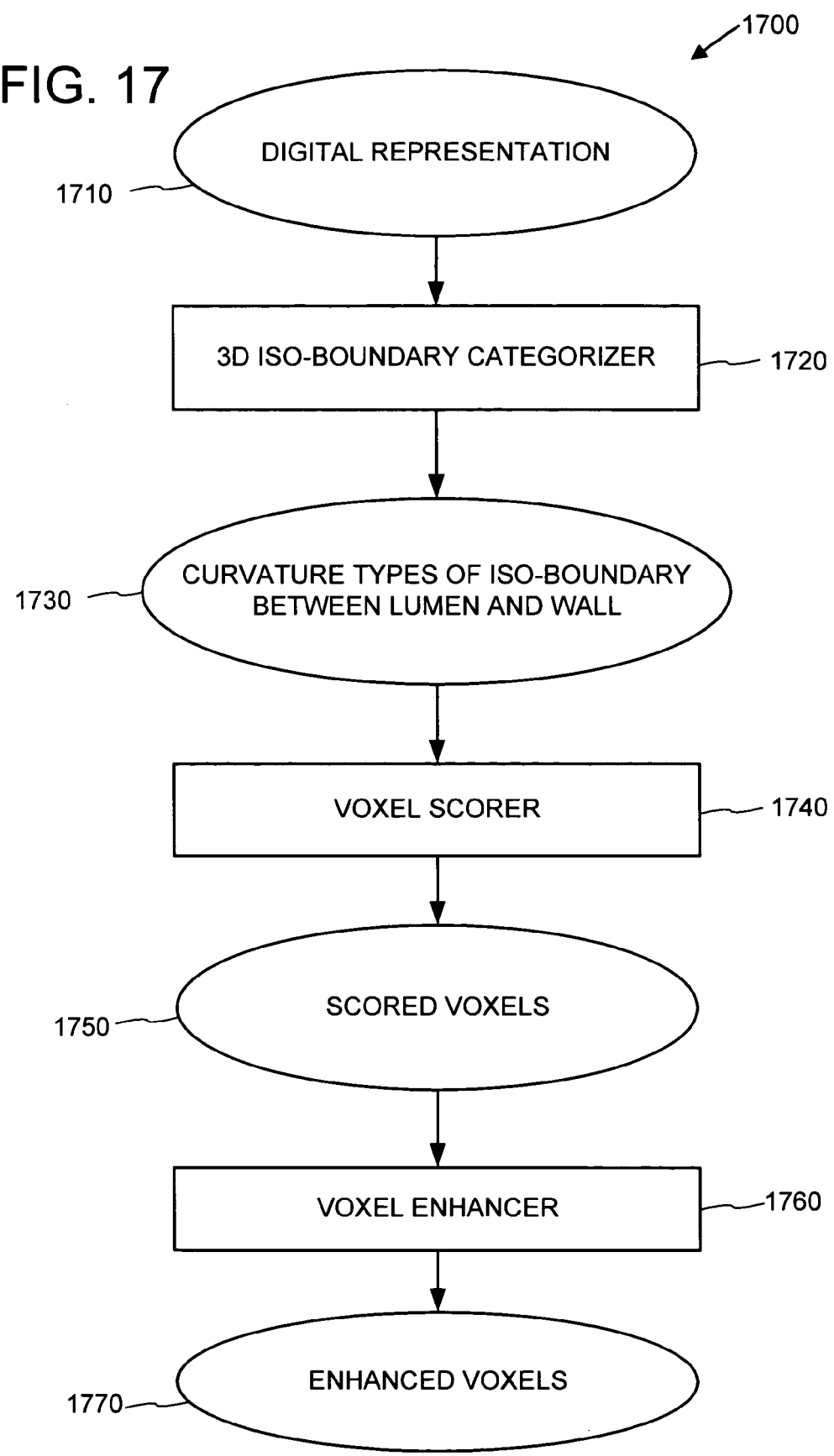
FIG. 17 is a block diagram of an exemplary system for adjusting the intensity of voxels in a three-dimensional digital representation of at least a portion of a virtual anatomical structure.

Exemplary System for Adjusting the Intensity of Voxels of a Three-Dimensional Digital Representation FIG. 17 shows an exemplary system 1700 for adjusting the intensity of pixels of a three-dimensional digital representation. A three-dimensional iso-boundary categorizer 1720 can receive a digital representation 1710 (for example, the digital representation 112 of FIG. 1) and determine indications of curvature types 1730 of iso-boundary between lumen and wall. A voxel scorer 1740 can then receive the indications of curvature types 1730 and determine scores for voxels 1750 in the digital representation. A voxel enhancer 1760 can then receive the scores for voxels 1750 and enhance voxels 1770 in the digital representation.

EXAMPLE 22

Figure 18:
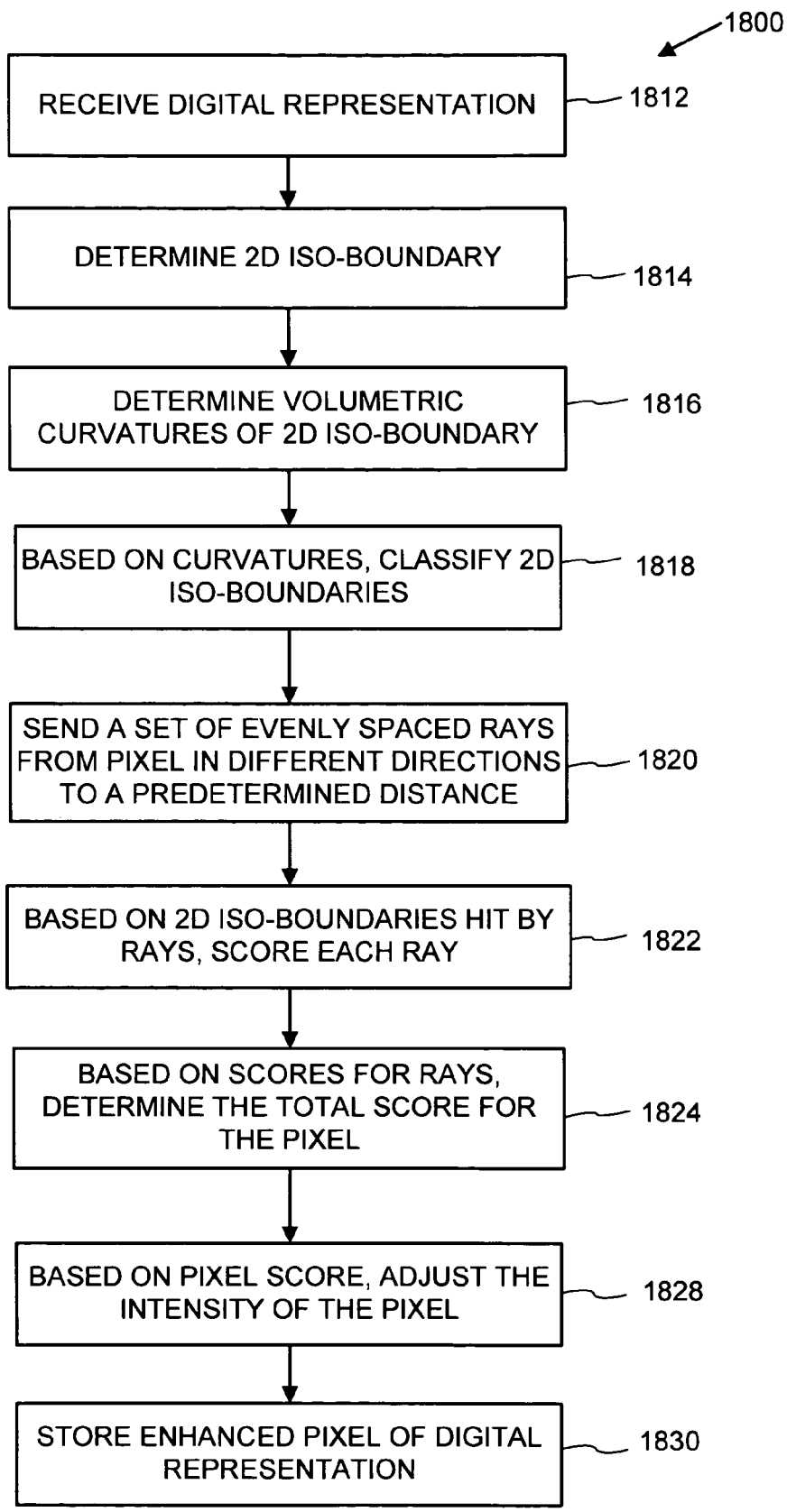
FIG. 18 is a flowchart showing an exemplary method for adjusting the intensity of pixels in a two-dimensional digital representation of at least a portion of a virtual anatomical structure.

Exemplary Method for Adjusting the Intensity of Pixels of a Two-Dimensional Digital Representation FIG. 18 shows an exemplary method 1800 for adjusting the intensity of pixels of a two-dimensional digital representation. The method 1800 can be performed, for example, by the system 1600 of FIG. 16.

At 1812 a digital representation (for example, the digital representation 112 of FIG. 1) representing at least one feature is received.

At 1814, iso-boundary between lumen and wall of the digital representation can be determined. Since lumen air has HU (Hounsfield units) number around −1000 and soft tissue has HU number larger than −500, the two-dimensional iso-boundary can be accurately located using an iso-value somewhere between the two values (for example, −700 or around −700).

At 1816, volumetric curvatures of the two-dimensional iso-boundary can be determined by using first and second derivatives of the image intensity. One equation that can be used is shown in (1), where K is the volumetric curvature, $f_x$, $f_y$ are first derivatives of the image intensity, and $f_{xx}$, $f_{xy}$, $f_{yy}$ are second derivatives of the image intensity.

$$K = \frac{f_{xx}f_y^2 - 2f_x f_y f_{xy} + f_{yy}f_x^2}{(f_x^2 + f_y^2)^{3/2}} \quad (1)$$

At 1818, volumetric curvatures of the two-dimensional iso-boundary can be classified into classes at least according to curvatures. A threshold value of curvature ($C_{th}$) can be used to classify different types of iso-boundaries. One threshold value that can be used is a $C_{th}$ of 0.15 pixel$^{-1}$. Three classes of iso-boundaries that can be used are convex, flat, and concave. Iso-boundaries with curvature greater than $C_{th}$ can be classified as concave iso-boundaries, those with curvatures smaller than $-C_{th}$ can be classified as convex iso-boundaries, and the rest can be classified as flat iso-boundaries.

At 1820, a set of evenly spaced rays can be sent from a pixel in different directions to a predetermined distance to determine a location of the pixel relative to the iso-boundaries. One method that can be used is sending rays (for example, 24 rays or some other number) from a pixel, with an equal spacing (for example, of 15 degrees), to a distance of the maximum diameter of a polyp (for example, 30 mm). A shooting ray stops when it hits the iso-boundary or reaches the shooting distance.

At 1822, a score for a ray can be determined at least by proximity to an iso-boundary between lumen and wall in the digital representation and curvature type of the iso-boundary. One scoring scheme that can be used according to a pixel's hitting situation is shown in Equation (2A), where E is the score of a shooting ray, $d_k(v)$ is a shooting direction from pixel v, and s is the shooting distance. Under this scoring scheme, the ray will be awarded a high score if it is next to convex iso-boundaries, and will be penalized if it is not. Convex boundaries can be associated with potential polyp regions.

$$E(d_k(v), s) = \begin{cases} 2, & \text{hit a convex boundary within distances} \\ 1, & \text{hit a flat boundary within distances} \\ 0, & \text{hit a concave boundary within distances} \\ -1, & \text{no hit within distances} \end{cases} \quad (2A)$$

At 1824, a score of a pixel can be determined based at least on the scores of the set of evenly spaced rays sent from the pixel in different directions. One scoring scheme that can be used is shown in Equation (2B), where the score of pixel v is the sum of the scores of the rays $E(d_k(v), s)$ sent in ray directions Nd.

$$\text{score}(v) = \sum_{k=1}^{Nd} E(d_k(v), s) \quad (2B)$$

At 1828, intensity of a pixel of the digital representation can be adjusted based at least on the score of the pixel determined by at least the proximity of the pixel to an iso-boundary between lumen and wall in the digital representation and curvature type of the iso-boundary. One adjustment scheme that can be used is shown in Equation (3), where the intensity of a pixel is increased if it is in a potential polyp region; otherwise the intensity is decreased. In this way, the intensities can be enhanced to distinguish candidates of interest from candidates not of interest.

$$\text{Adjustment}(v) = \begin{cases} 100HU, & \text{if score } (v) > Nd/2 \\ 50HU, & \text{if } Nd/2 \geq \text{score }(v) \geq Nd/4 \\ 0HU, & \text{if } Nd/4 > \text{score }(v) \geq 0 \\ -50HU, & \text{if score }(v) < 0 \end{cases} \quad (3)$$

At 1830, the enhanced pixel of the digital representation is stored.

EXAMPLE 23

Figure 19A:
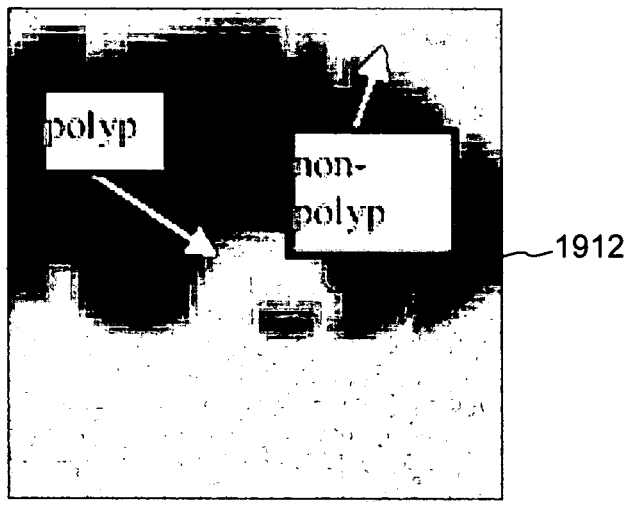
FIGS. 19A-C are screen shots of views of a portion of a virtual colon, including screen shots showing adjusting the intensity of pixels in a two-dimensional digital representation.
Figure 19B:
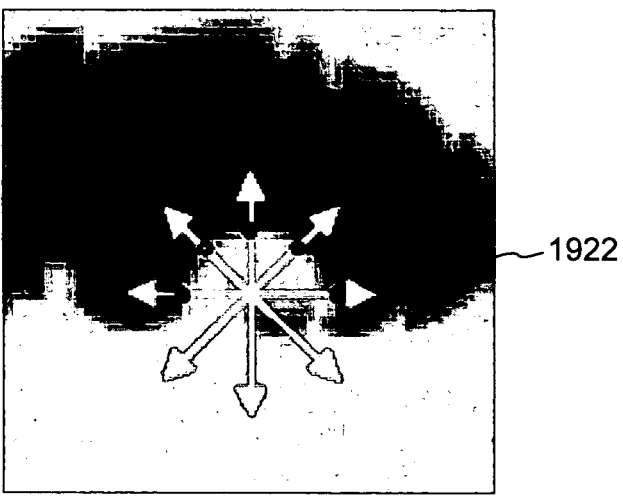
Figure 19C:
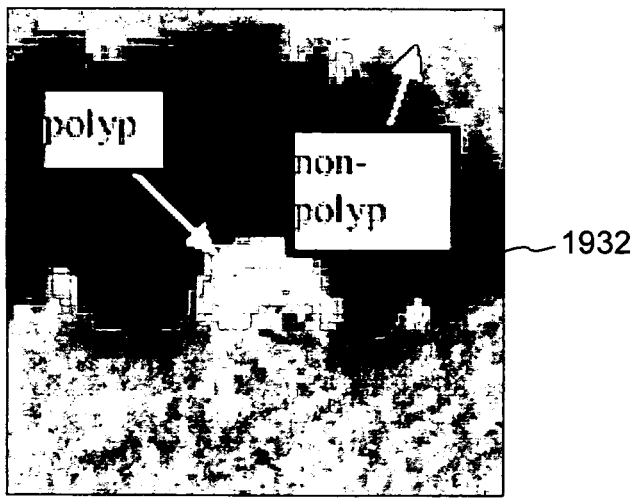

Exemplary Distinctive Depiction of a Method for Adjusting the Intensity of Pixels of a Two-Dimensional Digital Representation Exemplary screen shots of views of an exemplary depiction of a method of adjusting the intensity of pixels of a two-dimensional digital representation of an anatomical structure are shown in FIGS. 19A-C. The depicted screen shots in any of the examples herein can be presented by software as part of a software user interface.

The screen shot of the digital representation 1912 of FIG. 19A (for example, the digital representation 112 of FIG. 1) displays polyp and non-polyp tissue regions with similar intensity values. The screen shot 1922 of FIG. 19B displays sending a set of rays (for example a set of rays 1820 in FIG. 18) from a pixel of the digital representation to determine its score. The screen shot 1932 of FIG. 19C displays the digital representation after the intensity of the pixels have been adjusted according to their scores. The enhancement can assist in visually distinguishing polyps from non-polyps as well as influencing later automated processing.

EXAMPLE 24

Figure 20:
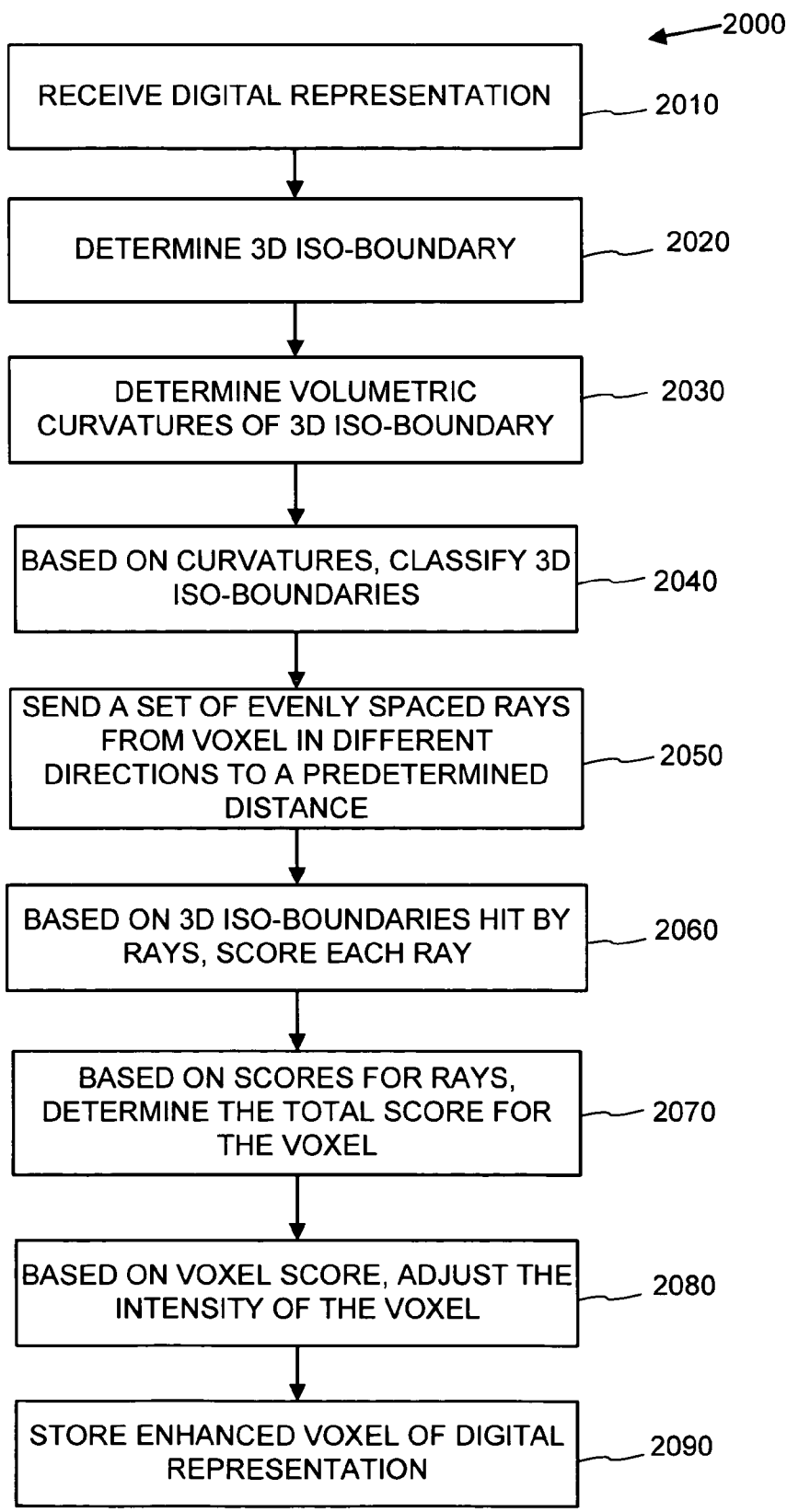
FIG. 20 is a flowchart showing an exemplary method for adjusting the intensity of voxels in a three-dimensional digital representation of at least a portion of a virtual anatomical structure.

Exemplary Method for Adjusting the Intensity of Voxels of a Three-Dimensional Digital Representation FIG. 20 shows an exemplary method 2000 for adjusting the intensity of voxels of a three-dimensional digital representation. The method 2000 can be performed, for example, by the system 1700 of FIG. 17.

At 2010 a digital representation (for example, the digital representation 112 of FIG. 1) representing at least one feature is received.

At 2020, an iso-boundary between lumen and wall of the digital representation can be determined. Since lumen air has HU (Hounsfield units) number around −1000 and soft tissue has HU number larger than −500, the three-dimensional iso-boundary can be accurately located using an iso-value in between the two values (for example, −700 or around −700).

At 2030, volumetric curvatures of the three-dimensional iso-boundary can be determined by convolving the three-dimensional digital representation with Gaussian function to be an infinitely differentiable three-dimensional function $f(x, y, z)$. One equation that can be used to determine the mean curvature of an iso-boundary point is shown in Equation (4), where $\kappa$ is the volumetric curvature, $f_x$, $f_y$, and $f_z$ are first order derivatives of the image intensity, and $f_{xx}$, $f_{yy}$, $f_{zz}$, $f_{xy}$, $f_{yz}$, $f_{xz}$ are second order derivatives of the image intensity.

$$\kappa = \frac{f_x^2(f_{yy}+f_{zz}) - 2f_y f_z f_{yz} + f_y^2(f_{xx}+f_{zz}) - 2f_x f_z f_{xz} + f_z^2(f_{xx}+f_{yy}) - 2f_x f_y f_{xy}}{2(f_x^2+f_y^2+f_z^2)^{3/2}} \quad (4)$$

At 2040, volumetric curvatures of the three-dimensional iso-boundary can be classified into classes at least according to curvatures. A threshold value of curvature ($C_{th}$) can be used to classify different types of iso-boundaries. One threshold value that can be used is a $C_{th}$ of 0.2 mm$^{-1}$. Three classes of iso-boundaries that can be used are convex, flat, and concave. Iso-boundaries with curvature greater than $C_{th}$ can be classified as concave iso-boundaries, those with curvatures smaller than $-C_{th}$ can be classified as convex iso-boundaries, and the rest can be classified as flat iso-boundaries. Other thresholds can be used as desired.

At 2050, a set of evenly spaced rays can be sent from a voxel in different directions to a predetermined distance to determine a location of the voxel relative to the iso-boundaries. A spiral-point technique can be used to generate uniformly distributed points on a sphere. Spherical coordinates $(\theta, \phi)$, $0 \leq \theta \leq \pi$, $0 \leq \phi \leq 2\pi$, can be used to compute the directions of out-shooting rays using the equations (5), where k is the ray index, $0 \leq k \leq N$, N is the total number of rays, $d_k$ is the shooting direction of ray k. A shooting ray stops when it hits the iso-boundary or reaches the shooting distance. One method that can be used is sending a set of rays (for example, 50 rays) from a voxel, to a distance of the maximum diameter of a polyp (for example, 30 mm).

$$h_k = -1 + \frac{2(k-1)}{(N-1)} \quad (5)$$

$$\theta_k = \arccos(h_k)$$

$$\varphi_k = \left(\varphi_{k-1} + \frac{3.6}{\sqrt{N(1-h_k^2)}}\right) \mod 2\pi$$

$$d_k = (\sin\theta_k \cos\varphi_k, \sin\theta_k \sin\varphi_k, \cos\theta_k)$$

At 2060, a score for a ray can be determined at least by proximity of an iso-boundary between lumen and wall in the digital representation and curvature type of the iso-boundary. One scoring scheme that can be used according to a voxel's hitting situation is shown in Equation (6), where E is the score of a shooting ray, $d_k$ is a shooting direction from voxel v, and m is the shooting distance. Under this scoring scheme, the ray will be awarded a high score if it is close to convex iso-boundaries, and will be penalized if it is not. Convex boundaries can be associated with potential polyp regions.

$$E(v, d_k, m) = \begin{cases} 1, & \text{hit a convex boundary within distance } m \\ 0.5, & \text{hit a flat boundary within distance } m \\ -1, & \text{hit a concave boundary within distance } m \\ -1, & \text{no hit within distance } m \end{cases} \quad (6)$$

At 2070, a score of a voxel can be determined based at least on the scores of the set of evenly spaced rays sent from the voxel in different directions. Once scoring scheme that can be used is shown in Equation (7), where the voxel score v is the sum of the scores of the rays $E(v, d_k, m)$ sent in ray directions N.

$$\text{score}(v) = \sum_{k=1}^{N} E(v, d_k, m) \quad (7)$$

At 2080, intensity of a voxel of the digital representation can be adjusted based at least on the score of the voxel determined by at least the proximity of the voxel to an iso-boundary between lumen and wall in the digital representation and curvature type of the iso-boundary. One adjustment scheme that can be used is shown in Equation (8), where r is the adjustment rate.

$$\text{Adjustment}(v) = \text{score}(v) \times r \quad (8)$$

One method that can be used is r=10HU. The intensity of a voxel is increased (for example by adjustment(v) shown Equation (8)) if it is in a potential polyp region; otherwise the intensity is decreased. Such an approach can enhance intensities to better distinguish features of interest and features not of interest.

At 2090, the enhanced voxel of the digital representation is stored.

EXAMPLE 25

Figure 21A:
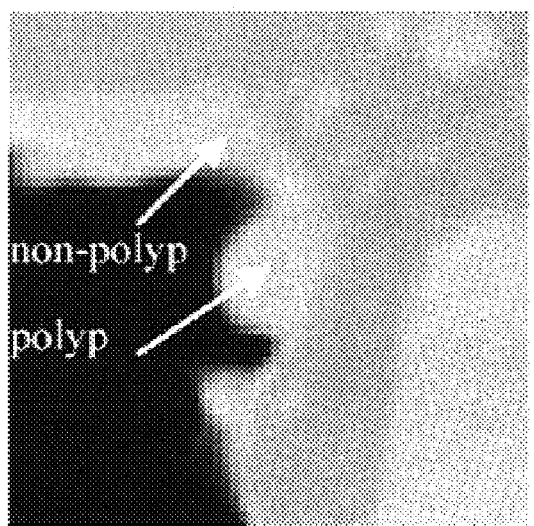
FIGS. 21A-D are screen shots of views of a portion of a virtual colon, including screen shots showing adjusting the intensity of pixels in a two-dimensional digital representation.
Figure 21B:
Figure 21C:
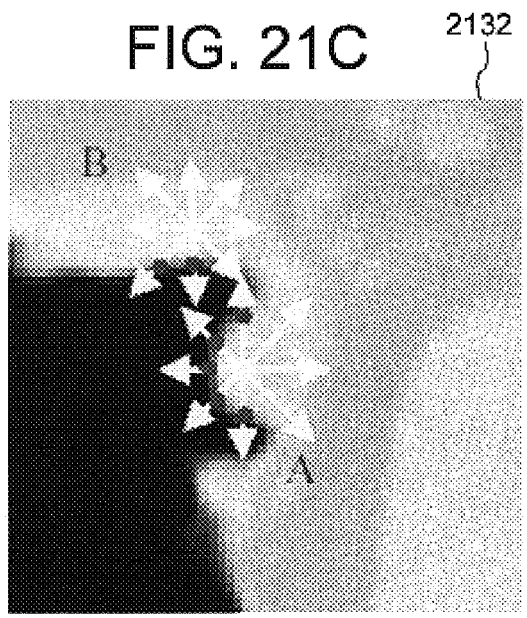
Figure 21D:
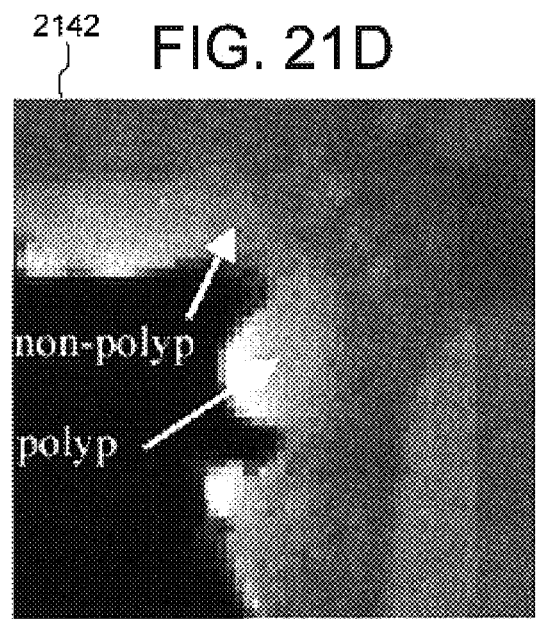

Exemplary Distinctive Depiction of a Method for Adjusting the Intensity of Voxels of a Three-Dimensional Digital Representation Screen shots of views of an exemplary depiction of a method of adjusting the intensity of voxels of a three-dimensional digital representation of an anatomical structure are shown in FIGS. 21A-D. The screen shot of one slice of a three-dimensional digital representation 2112 of FIG. 21A (for example, the digital representation 112 of FIG. 1) displays polyp and non-polyp tissue regions with similar intensity values. The screen shot 2122 of FIG. 21B displays a curvature map depicting iso-boundaries classified by curvature (for example classification 2040 of FIG. 20) in different shading or coloring to reflect respective classifications. The screen shot 2132 of FIG. 21C depicts shooting rays from two voxels of a digital representation to determine their scores. Voxel A in FIG. 21C (at the center of the rays) is in the potential polyp region and can be given a high score since half of its shooting rays hit convex boundaries. Voxel B in FIG. 21C (at the center of the rays) is in a potential non-polyp region and can be given a low or negative score since all of its out-shooting rays either hit a concave boundary or hit no boundaries. The screen shot 2142 of FIG. 21D displays the digital representation after the intensity of the voxels have been adjusted according to their scores. The enhancement can assist in visually distinguishing polyps from non-polyps as well as influencing later automated processing.

EXAMPLE 26

Figure 22:
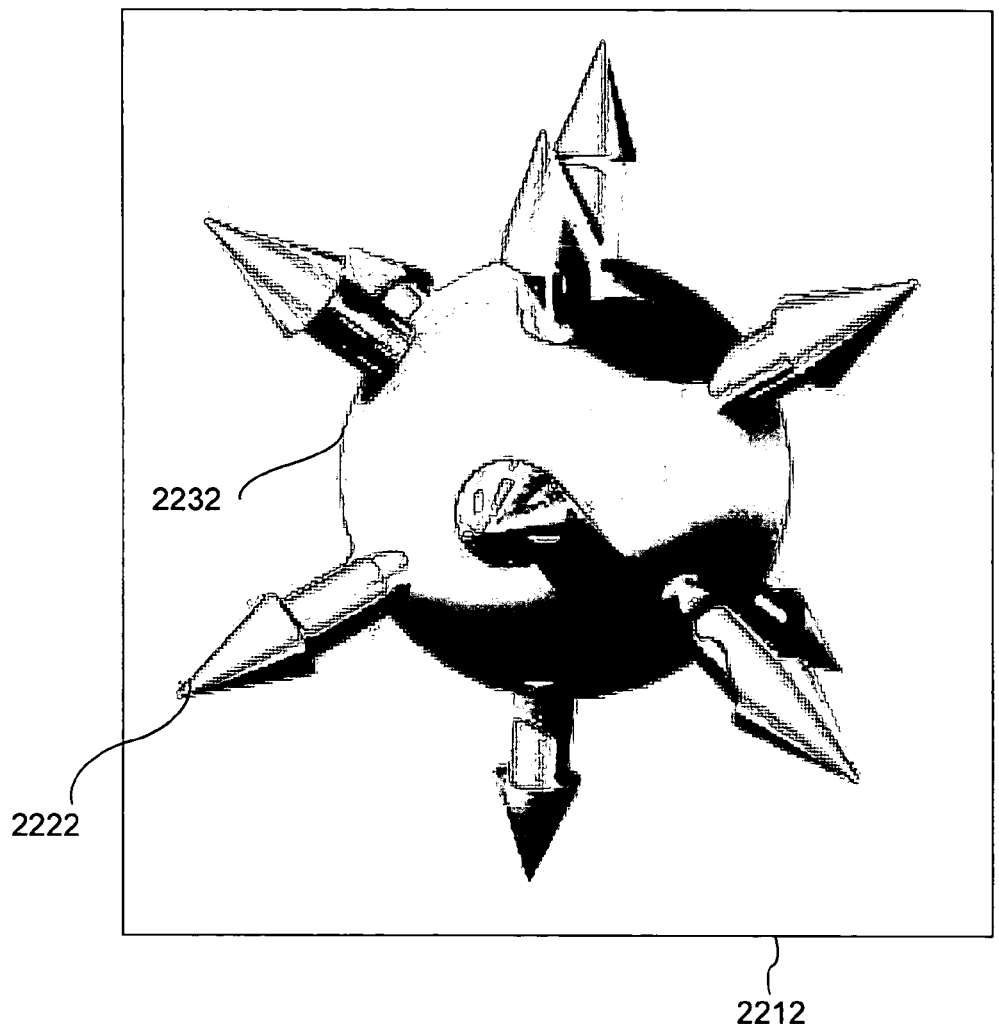
FIG. 22 illustrates the ray shooting technique for a voxel in the exemplary method for adjusting the intensity of voxels in a three-dimensional digital representation.

Exemplary Distinctive Depiction of a Method for Shooting Evenly Spaced Rays from a Voxel of a Three-Dimensional Digital Representation FIG. 22 illustrates a method 2212 for sending a set of evenly spaced rays 2222 in different directions from a voxel 2232 (for example, method 2050 of FIG. 20) of a digital representation. Any number of other configurations can be used. In practice, more rays can be used than shown, and the rays may have longer lengths.

EXAMPLE 27

Figure 23:
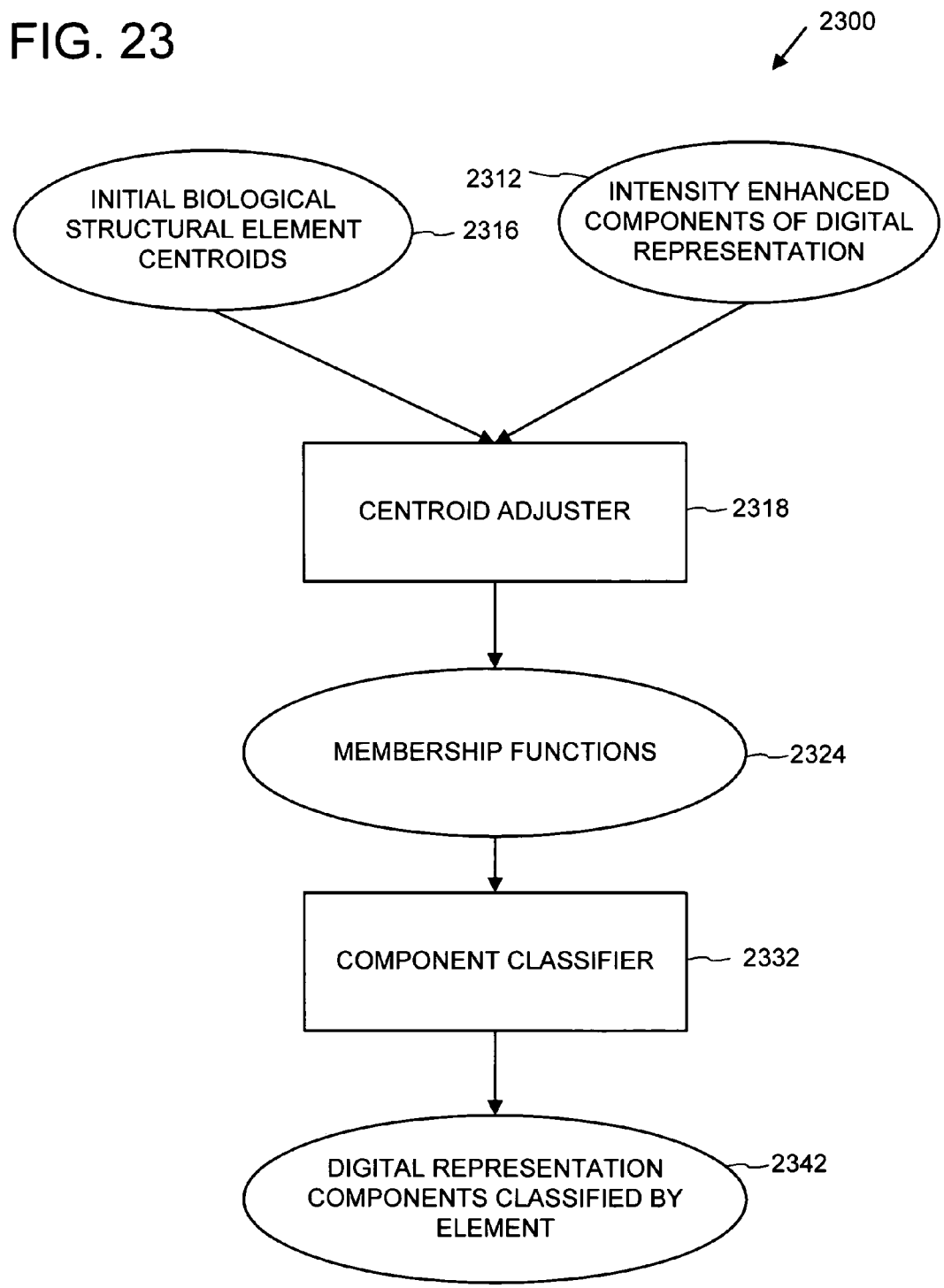
FIG. 23 is a block diagram of an exemplary system for classifying components in a digital representation of at least a portion of a virtual anatomical structure into biological structural element types.

Exemplary System for Classifying Components of a Digital Representation into Biological Structural Element Types FIG. 23 shows an exemplary system 2300 for classifying components of a digital representation representing at least one feature into different biological structural element types (for example, lumen, polyp, and non-polyp). A fuzzy c-means clustering approach can be used.

A centroid adjuster 2318 can receive intensity enhanced components of a digital representation 2312 (for example, the enhanced components 1470 of FIG. 14) and initial centroids 2316. The initial centroids can indicate an intensity for the various biological structural elements (for example, a centroid for lumen, a centroid for polyp tissue, and a centroid for non-polyp tissue). The initial centroids can be based at least in part on the digital representation 2312.

A centroid adjuster can then use a fuzzy c-means clustering technique to produce membership functions 2324 having adjusted centroids. The membership functions 2324 can indicate ranges for determining membership in the various biological structural element types.

A component classifier 2332 can use the membership functions 2324 to classify the components of the digital representation 2312 into different biological structural element types (for example, whether a voxel or pixel is of type lumen, polyp, or non-polyp). While a component can be conclusively classified as lumen, polyp, or non-polyp, such a hard classification may not be advantageous as shown in other examples. Instead a membership value (for example, indicating probability of membership) can be used.

EXAMPLE 28

Figure 24:
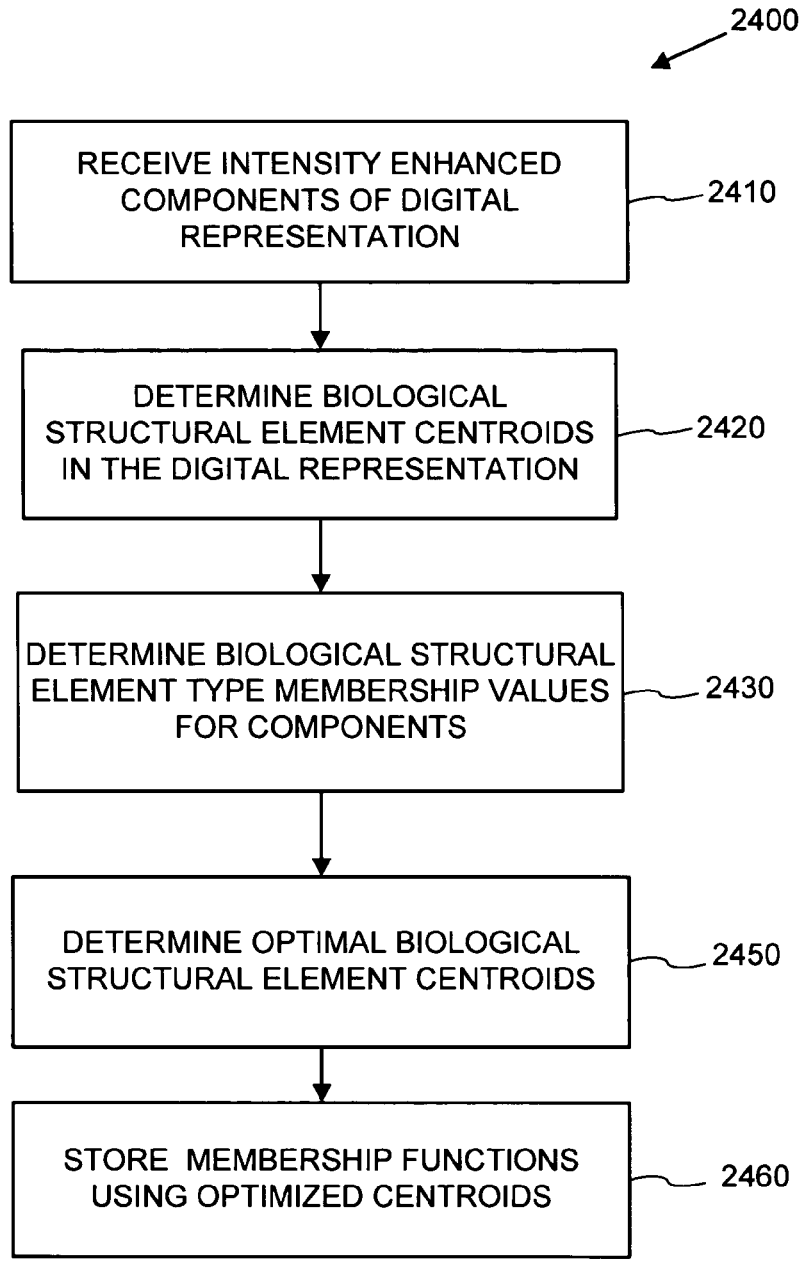
FIG. 24 is a flowchart showing an exemplary method for classifying components in a digital representation of at least a portion of a virtual anatomical structure into biological structural element types.

Exemplary Method for Classifying Components of a Digital Representation into Biological Structural Element Types FIG. 24 shows an exemplary method for classifying components of a digital representation into biological structural element types. The method 2400 can be performed, for example, by the system 2300 of FIG. 23.

At 2410, intensity enhanced components of a digital representation (for example, the enhanced components 1470 of FIG. 14) representing at least one feature can be received.

At 2420, biological structural element type centroids can be determined for the digital representation.

At 2430, biological structural element type membership values for components of the digital representation can be determined. For example, ranges can define a membership function for the components.

At 2450, optimal biological structural element centroids can be determined. In practice, the method may perform actions iteratively until convergence on the optimal centroids is reached.

At 2460, membership functions using the optimal biological structural element centroids can be stored.

EXAMPLE 29

Figure 25:
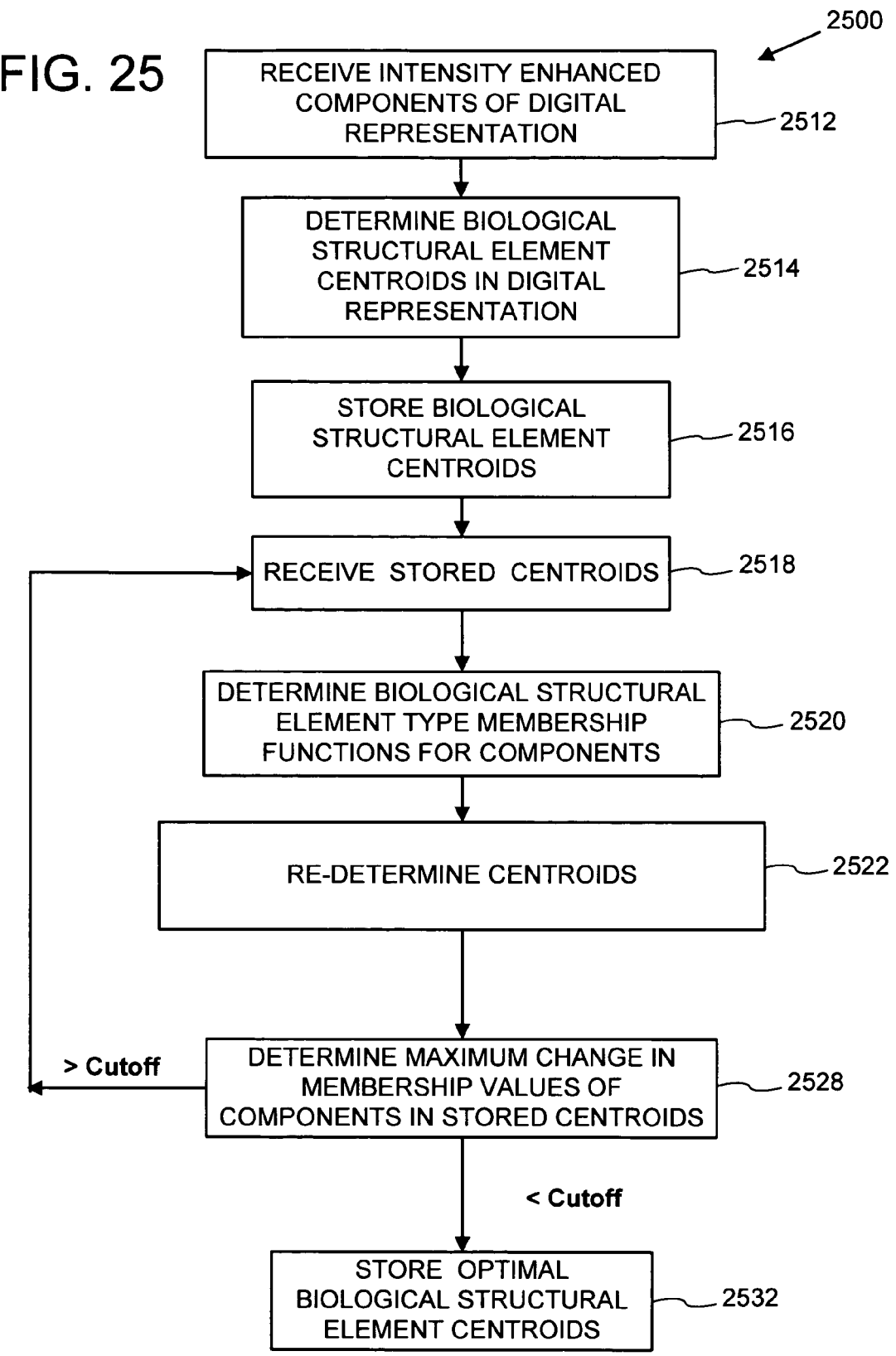
FIG. 25 is a flowchart showing an exemplary method for classifying components in a digital representation of at least a portion of a virtual anatomical structure into biological structural element types.

Exemplary Method for Method for Classifying Components of a Digital Representation into Biological Structural Element Types FIG. 25 shows an exemplary method for classifying components of a digital representation into biological structural element types. The method 2500 can be performed, for example, by the system 2300 of FIG. 23.

At 2512, intensity enhanced components of a digital representation (for example, the enhanced components 1470 of FIG. 14) representing at least one feature can be received.

At 2514, biological structural element type centroids can be determined for the digital representation. One or more biological structural element types can be defined in preparation for determining biological structural element type centroids. Three exemplary classes of structural element types can be defined: lumen space, polyp tissue, and non-polyp tissue. A biological structural element type centroid can be derived from prior knowledge about the CT attenuation in CT colonography. The centroid for lumen space can be a small value (for example, −900 HU or around −900HU). The centroid for polyp tissue can be the average intensity of the positively adjusted component region in the maximal diameter of a polyp neighborhood of the seed location of a feature. The centroid of non-polyp tissue can be the average intensity of the negatively adjusted or unadjusted component region in the maximal diameter of a polyp neighborhood of the seed location of a feature. At 2516, the biological structural element centroids determined by the intensity of components can be stored.

At 2518, stored biological structural element centroids of a digital representation representing at least one feature can be received.

At 2520, biological structural element type membership functions for components can be determined. Membership values for each biological structural element type can be determined for a component via the functions. In one method that can be used, membership values for lumen space, polyp tissue, and non-polyp tissue are determined for a component. The membership values can be restricted to the range of 0 to 1, and the sum of all membership values of all biological structural element types can be restricted to 1. The membership value of one biological structural element type can indicate the likelihood of the component belonging to that biological structural element type. One equation that can be used to determine membership values for components is shown in (9), where $u_k(x)$ is the membership value of component x for biological structural element type k, $c_k$ is the class centroid, and $y(x)$ is the observed image intensity of component x.

$$u_k = \frac{\|y(x) - c_k\|^{-2}}{\sum_{l=1}^{N} \|y(x) - c_l\|^{-2}} \quad (9)$$

At 2522, the biological structural element centroids can be re-determined. One equation that can be used is shown in (10), where $c_k$ is the class centroid, $u_k^2(x)$ is the square of the membership value of component x for biological structural element type k, and $y(x)$ is the observed image intensity of component x.

$$c_k = \frac{\sum_k u_k^2(x) y(x)}{\sum_x u_k^2(x)} \quad (10)$$

At 2528, maximum change in membership values of components between at least two stored centroids can be determined. A cutoff or threshold predefined value can be used to determine optimal centroids of a digital representation containing at least one feature.

If the change is greater than a specified cutoff, the method continues at 2518 in order to determine new centroids.

Otherwise, the method concludes at 2532. The most recent stored centroids are stored as the optimal biological structural element centroids of the digital representation. Membership functions using the centroids can be used to then classify the components into biological structural element types.

EXAMPLE 30

Exemplary Distinctive Depiction of Digital Representations Based on Membership Values Screen shots of views of an exemplary depiction of results of the exemplary methods for classifying components of a digital representation into biological structural element types are shown in FIGS. 26A-D. Membership values for components in biological structural element type classification centroids can be converted to brightness levels to aid in visually distinguishing higher membership values within an element type centroid.

The screen shot of a digital representation 2610 of FIG. 26A (for example, the digital representation 112 of FIG. 1) displays a pre-classified digital representation around a seed point. The screen shot of a digital representation 2620 of FIG. 26B displays a polyp type membership map of at least one optimized polyp type centroid composed of components that have been brightness adjusted based on their polyp membership value for visual depiction. The screen shot of a digital representation 2630 of FIG. 26C displays the non-polyp type membership map of at least one optimized non-polyp type centroid composed of components that have been brightness adjusted based on their non-polyp membership values for visual depiction. The screen shot of a digital representation 2640 of FIG. 26D displays the lumen space type membership map of at least one optimized lumen space type centroid composed of components that have been brightness adjusted based on their lumen membership values for visual depiction.

Such an approach can be depicted by portraying a membership value as brightness.

EXAMPLE 31

Exemplary Distinctive Depiction of Components Based on Membership Values

Screen shots of views of an exemplary depiction of a method for classifying components of a digital representation into biological structural element types are shown in FIGS. 27A-E. Membership values for components in biological structural element type classification centroids can be converted to brightness levels to aid in visually distinguishing higher membership values within an element type centroid. Color or shading channels of components can also be used to distinguish between element type centroids in a depiction of multiple element type centroids in a digital representation.

Figure 27A:
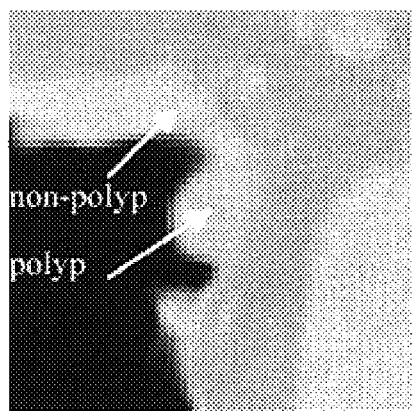
FIGS. 27A-E are screen shots of views of a portion of a virtual colon, including screen shots in which the results of an exemplary classifier are depicted using brightness.
Figure 27B:
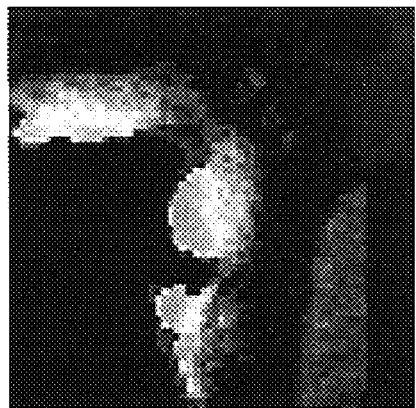
Figure 27C:
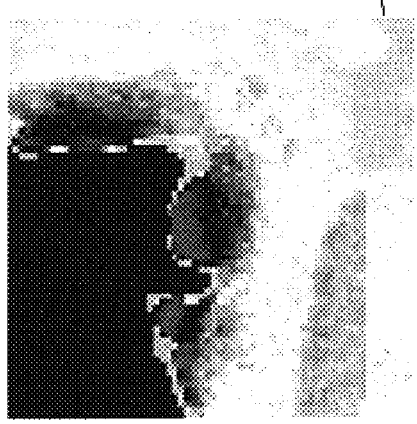
Figure 27D:
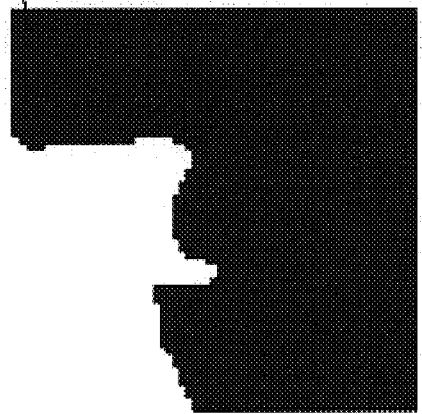

The screen shot of a digital representation 2710 of FIG. 27A (for example, the digital representation 112 of FIG. 1) displays a pre-classified digital representation around a seed point, with known polyp and non-polyp regions labeled. The screen shot of a digital representation 2720 of FIG. 27B displays a polyp type membership map of at least one optimized polyp type centroid composed of components that have been brightness adjusted for visual depiction based on their polyp membership values. The screen shot of a digital representation 2730 of FIG. 27C displays the non-polyp type membership map of at least one optimized non-polyp type centroid composed of components that have been brightness adjusted for visual depiction based on their non-polyp membership values. The screen shot of a digital representation 2740 of FIG. 27D displays the lumen space type membership map of at least one optimized lumen space type centroid composed components that have been brightness adjusted for visual depiction based on their lumen membership values.

Figure 27E:
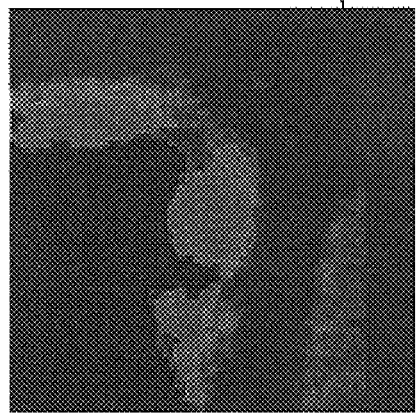

The screen shot of a digital representation 2750 of FIG. 27E displays combined polyp type, non-polyp type, and lumen space type membership maps of optimized centroids composed of components that have brightness and color or shading adjusted for visual depiction based on a combination of membership values.

EXAMPLE 32

Exemplary Distinctive Depiction of Components via Colors Based on Membership Values Screen shots of views of an exemplary depiction of a method for classifying components of a digital representation into biological structural element types are shown in FIGS. 28A-D. Membership values for components in biological structural element type classification centroids can be converted to brightness levels to aid in visually distinguishing higher membership values within an element type centroid. Color or shading channels of components can also be used to distinguish between element type centroids in a depiction of multiple element type centroids in a digital representation (for example, blue for lumen, red for non-polyp, and green for polyp), with the intensity of the corresponding color being the membership value (or some value mathematically based on the membership value). In this way, a visual depiction can simultaneously indicate probability of component membership for plural tissue types (for example, lumen air, polyp, and non-polyp) via plural color channels.

The screen shot of a digital representation containing at least one feature 2810 of FIG. 28A displays combined polyp type, non-polyp type, and lumen space type membership maps of optimized centroids composed of membership valued components that have brightness and color or shading adjusted for visual depiction. The screen shot of a digital representation containing at least one feature 2820 of FIG. 28B displays combined polyp type, non-polyp type, and lumen space type membership maps of optimized centroids composed of membership valued components that have brightness and color or shading adjusted for visual depiction. The screen shot of a digital representation containing at least one feature 2830 of FIG. 28C displays combined polyp type, non-polyp type, and lumen space type membership maps of optimized centroids composed of membership valued components that have brightness and color or shading adjusted for visual depiction. The screen shot of a digital representation containing at least one feature 2840 of FIG. 28D displays combined polyp type, non-polyp type, and lumen space type membership maps of optimized centroids composed of membership valued components that have brightness and color or shading adjusted for visual depiction. From the biological structural element type membership centroid maps one can approximately identify blurry and noisy boundaries of feature regions.

EXAMPLE 33

Figure 29:
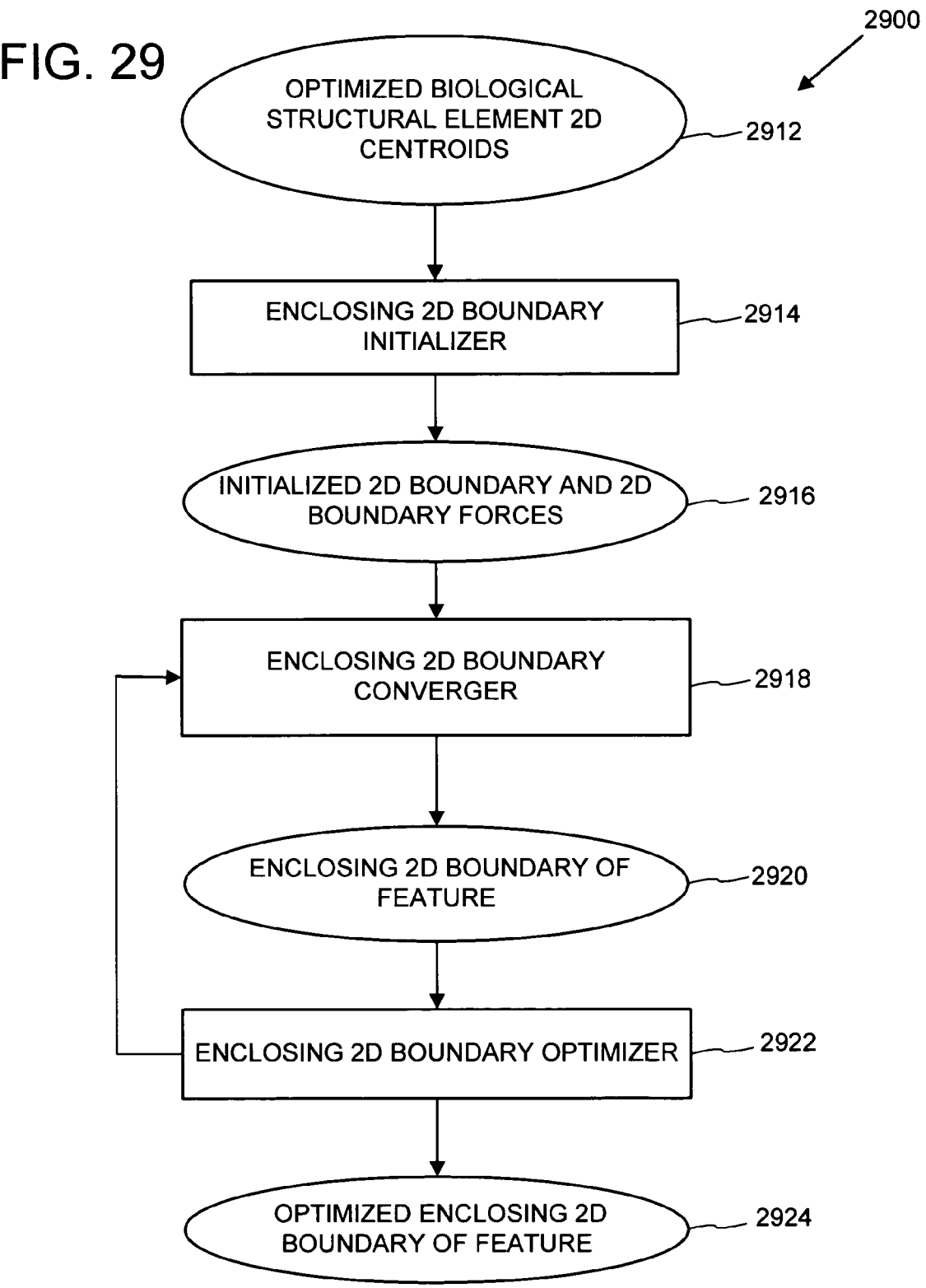
FIG. 29 is a block diagram of an exemplary system for converging to the enclosing boundary of a feature in a two-dimensional digital representation of at least a portion of a virtual anatomical structure.

Exemplary System for Converging to the Enclosing Boundary of a Feature in a Two-Dimensional Digital Representation As described above, a hard segmentation approach that assigns each component to the type with the highest membership value may not be advantageous. Instead, a deformable model approach can be used. FIG. 29 shows an exemplary system 2900 for converging to the two-dimensional boundary of a feature in a digital representation. An enclosing two-dimensional boundary initializer 2914 can receive membership functions including optimized biological structural element two-dimensional centroids 2912 (for example, the optimized biological structural element centroids 2324 of FIG. 23) and determine an initialized two-dimensional boundary and two-dimensional boundary forces 2916. An enclosing two-dimensional boundary converger 2918 can then receive the initialized two-dimensional boundary and two-dimensional boundary forces 2916 and determine an enclosing two-dimensional boundary of a feature 2920. An enclosing two-dimensional boundary optimizer 2922 can then receive the enclosing two-dimensional boundary of a feature 2920 and determine an optimized enclosing two-dimensional boundary of a feature 2924. The system can use a deformable model approach.

EXAMPLE 34

Figure 30:
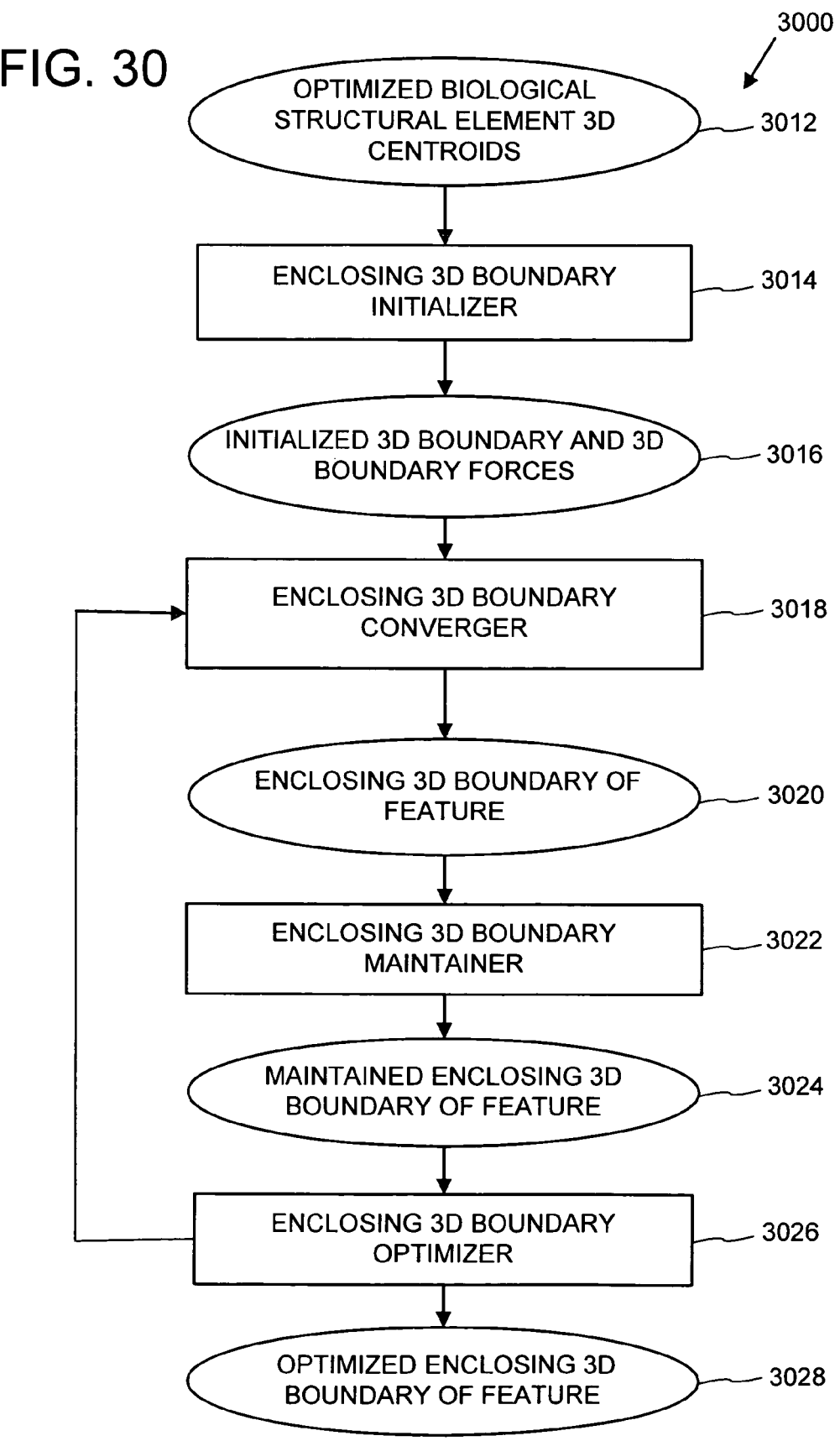
FIG. 30 is a block diagram of an exemplary system for converging to the enclosing boundary of a feature in a three-dimensional digital representation of at least a portion of a virtual anatomical structure.

Exemplary System for Converging to the Enclosing Boundary of a Feature in a Three-Dimensional Digital Representation FIG. 30 shows an exemplary system 3000 for converging to the three-dimensional boundary of a feature in a digital representation. An enclosing three-dimensional boundary initializer 3014 can receive optimized biological structural element three-dimensional centroids 3012 (for example, the optimized biological structural element centroids 2324 of FIG. 23) and determine an initialized three-dimensional boundary and three-dimensional boundary forces 3016. An enclosing three-dimensional boundary converger 3018 can then receive the initialized three-dimensional boundary and three-dimensional boundary forces 3016 and determine an enclosing three-dimensional boundary of a feature 3020. An enclosing three-dimensional boundary maintainer 3022 can then receive the enclosing three-dimensional boundary of a feature 3020 and determine a maintained enclosing three-dimensional boundary of a feature 3024. An enclosing three-dimensional boundary optimizer 3026 can then receive the maintained enclosing three-dimensional boundary of a feature 3024 and determine an optimized enclosing three-dimensional boundary of a feature 3028.

EXAMPLE 35

Figure 31:
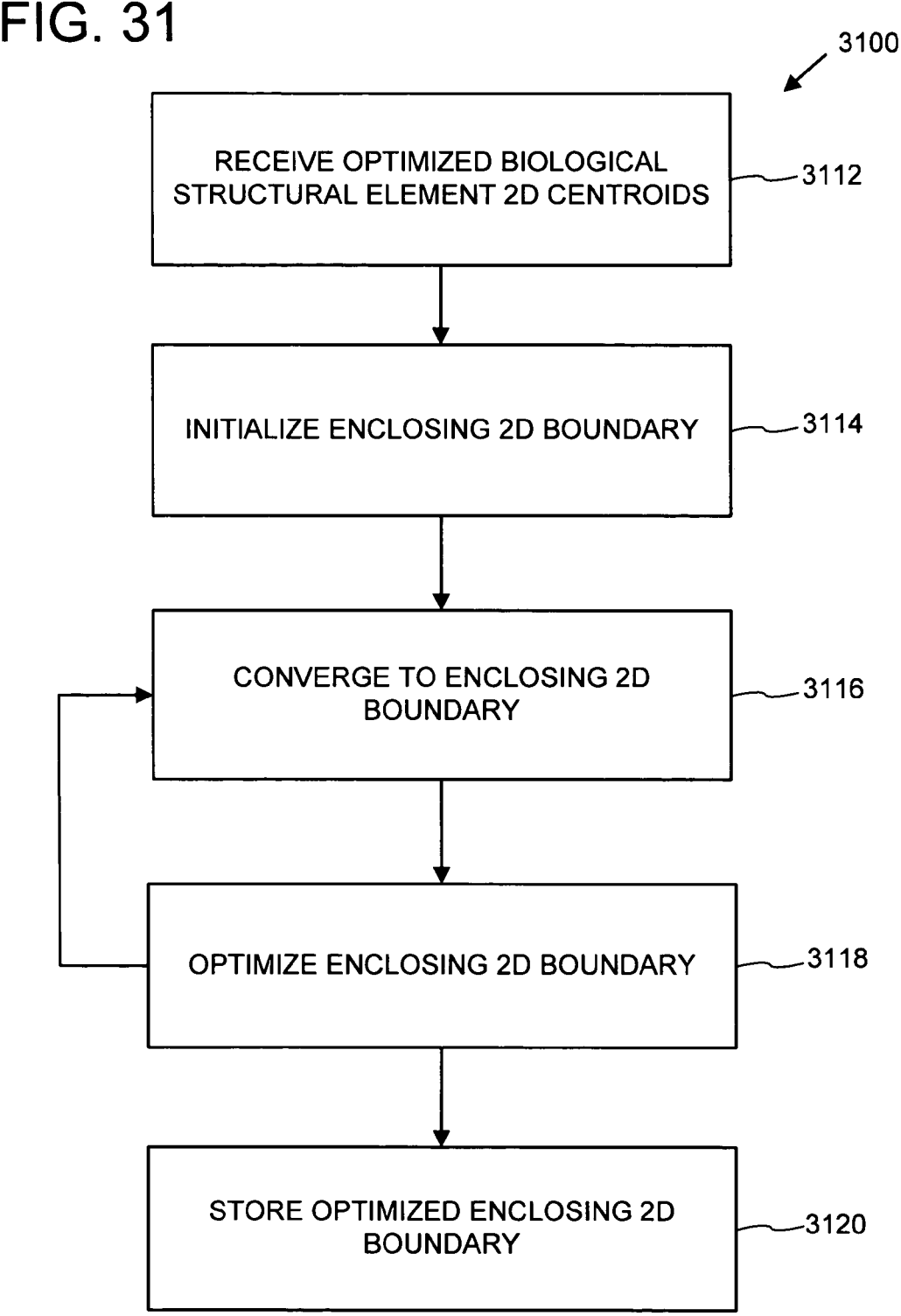
FIG. 31 is a flowchart of an exemplary method for converging to the enclosing boundary of a feature in a two-dimensional digital representation of at least a portion of a virtual anatomical structure.

Exemplary Method for Converging to the Enclosing Boundary of a Feature in a Two-Dimensional Digital Representation FIG. 31 shows an exemplary method for converging to the enclosing boundary of a feature in a two-dimensional digital representation. The method 3100 can be performed, for example, by the system 2900 of FIG. 29.

At 3112, optimized biological structural element two-dimensional centroids (for example, the optimized biological structural element centroids 2324 of FIG. 23) representing at least one type of biological structural element classified components are received.

At 3114, a two-dimensional enclosing boundary of at least one type of biological structural element centroid is initialized.

At 3116, a two-dimensional enclosing boundary is converged to based at least on a gradient between at least two biological structural element type two-dimensional centroids.

At 3118, a two-dimensional enclosing boundary is optimized based at least on the balance of boundary forces.

At 3120, the optimized two-dimensional enclosing boundary is stored.

EXAMPLE 36

Exemplary Method for Converging to the Enclosing Boundary of a Feature in a Three-Dimensional Digital Representation FIG. 32 shows an exemplary method for converging to the enclosing boundary of a feature in a three-dimensional digital representation. The method 3200 can be performed, for example, by the system 3000 of FIG. 30.

At 3212, optimized biological structural element three-dimensional centroids (for example, the optimized biological structural element centroids 2324 of FIG. 23) representing at least one type of biological structural element classified components are received.

At 3214, an enclosing three-dimensional boundary of at least one type of biological structural element centroid is initialized.

At 3216, an enclosing three-dimensional boundary is converged to based at least on a gradient between at least two biological structural element type three-dimensional centroids.

At 3218, an enclosing three-dimensional boundary is maintained (for example, at a constant surface resolution) based at least on the length of at least one surface edge.

At 3220, an enclosing three-dimensional boundary is optimized based at least on the balance of boundary forces.

At 3222, the optimized enclosing two-dimensional boundary is stored.

EXAMPLE 37

Exemplary Method for Converging to the Enclosing Boundary of a Feature in a Two-Dimensional Digital Representation FIG. 33 shows an exemplary method 3300 for converging to the enclosing boundary of a feature in a two-dimensional digital representation. The method 3300 can be performed, for example, by the system 2900 of FIG. 29.

At 3312, optimized biological structural element two-dimensional centroids (for example, the optimized biological structural element centroids 2324 of FIG. 23) representing at least one type of biological structural element classified components are received.

At 3314, an initial contour is set using the optimized biological structural element two-dimensional centroids composed of membership valued components 3312. One method that can be used is to set the initial contour as a half-pixel radius circle placed at the centroid of all pixels within a range of the seed point with polyp type tissue membership values greater than 0.5.

At 3320, boundary forces used to drive converging to the enclosing boundary are determined. The forces can be expressed as shown in (11), where $F_{internal}$ is the spline force of the contour, $F_{image}$ is the image force, $F_{external}$ is the external force, and $w_{in}$ is the weight of the internal force, $w_{im}$ is the weight of the image force, and $w_{ex}$ is the weight of the external force.

$$F = w_{in}F_{internal} + w_{im}F_{image} w_{ex}F_{external} \quad (11)$$

The boundary force can also be normalized.

At 3318 the internal forces can be determined by the contour itself and can be used to prevent the contour from collapsing or breaking.

$$F_{internal} = \frac{1}{2}\int_0^1 (\alpha(s)|x'(s)|^2 + \beta(s)|x''(s)|^2)ds \quad (12)$$

For example, (12) can be used, where x(s) is the curve representing the contour, x'(s) is the first order derivative of x(s), and x''(s) is the second order derivative of x(s). The spline force is composed of a first-order term controlled by α(s) and a second-order term controlled by β(s). The first-order term makes the contour act like an elastic membrane to prevent breaking, and the second-order term makes it act like a thin rigid plate to prevent collapsing. By adjusting the weights α(s) and β(s), one can control the relative importance of the membrane term and the thin plate term. α(s) and β(s) may be different at different values of s and at different iterations. α(s) and β(s) may also be constant for every s throughout the converging method. The internal force can be used to keep the contour smooth and continuous, and to prevent the contour from moving freely or bending too much.

At 3322, the image force can be determined by image gradients and can be used to attract the contour to the feature boundaries.

$$F_{image} = \underset{\Phi}{\text{Max}}(\vec{g}) \quad (13)$$

For example, (13) can be used, where $\vec{g}$ is the gradient between polyp type and non-polyp and/or lumen space type two-dimensional membership centroids, and $$\underset{\Phi}{\text{Max}}(\ )$$

is a maximum filter over a pixel*pixel template region. The maximum filter is similar to a median filter, but instead a maximum value is preserved. The maximum filter is applied to the biological type element centroid membership gradient map of a digital representation to increase the capture range and reduce the noise. Image forces are the major forces to attract the contour to the enclosing feature boundaries.

At 3324, the external forces can be determined by a balloon force and can be used to inflate the contour away from the center of the feature.

$$F_{balloon} = \frac{v_x - v_c}{\|v_x - v_c\|} \quad (14)$$

For example, (14) can be used, where $v_x$ is a vertex and $v_c$ is the centroid of the current contour. Since the initial contour is usually placed at or around the center of centroid where image forces are not strong enough to pull the converger model, balloon external forces are added to inflate the contour. The use of balloon forces can also speed up the converging process.

At 3328, the boundary forces 3320 can be weighted according. The weights of force components can be adaptively updated during the iterative process to enable at least one force to be dominant at different times in the converging process.

At 3330, the enclosing boundary converger model is run using a contour and boundary forces. The converging model converges to the boundary of a feature under the guidance of image and balloon forces. The internal forces keep the contour smooth and continuous.

At 3332, boundary forces can be updated by changing weighting parameters 3328 and/or redetermining deformable forces (for example by 3318, 3322, and 3324).

At 3334, the enclosing boundary can be converged to again based on updated boundary forces 3332. At 3336 enclosing boundary characteristics can be stored.

At 3338, the balance of the forces of the stored enclosing boundary 3338 can be determined. At 3340, the forces of the stored enclosing boundary 3338 can be determined to not be in balance and the enclosing boundary converger model 3330 can be run at least one more iteration. At 3342, the forces of the stored enclosing boundary 3338 can be determined to be in balance and the enclosing boundary is stored as the optimal enclosing two-dimensional boundary of the feature in the digital representation. A maximum number of converging model iterations can also be used to determine when to store an enclosing boundary as an optimal enclosing boundary.

EXAMPLE 38

Exemplary Screen Shots Showing Converging to the Enclosing Boundary of a Feature in a Two-Dimensional Digital Representation I Screen shots of views of an exemplary depiction of a method for converging to the enclosing boundary of a feature in a two-dimensional digital representation are shown in FIGS. 34A-D.

The screen shot of a digital representation containing at least one feature 3410 of FIG. 34A displays an image force map for a feature. The screen shot of a digital representation containing at least one feature 3420 of FIG. 34B displays an initial boundary after one run of the converging model (for example the running of the converging model 3330 of FIG. 33). The screen shot of a digital representation containing at least one feature 3430 of FIG. 34C displays an enclosing boundary after five runs of the converging model (for example the running of the converging model 3330 of FIG. 33). The screen shot of a digital representation containing at least one feature 3420 of FIG. 34B displays the stored optimal enclosing boundary of the feature (for example the optimized enclosing two-dimensional boundary 2942 of FIG. 29) after the forces have been determined to be balanced (for example the determining of balanced forces 3338 of FIG. 33).

EXAMPLE 39

Exemplary Screen Shots Showing Converging to the Enclosing Boundary of a Feature in a Two-Dimensional Digital Representation II Screen shots of views of an exemplary depiction of a method for converging to the enclosing boundary of a feature in a two-dimensional digital representation are shown in FIGS. 35A-D.

Figure 35A:
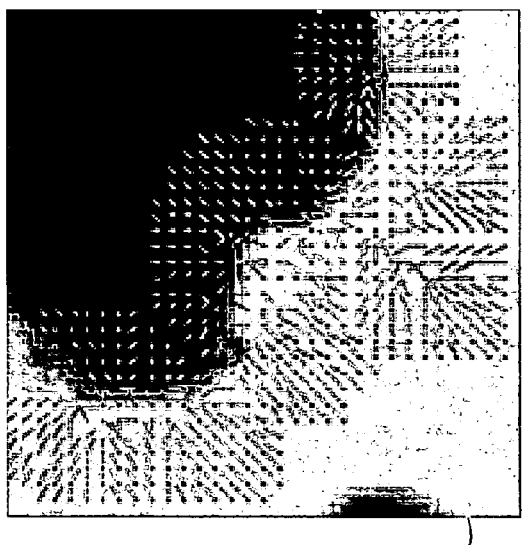
FIGS. 35A-D are screen shots of views of a portion of a virtual colon, including screen shots in which the results of an exemplary enclosing two-dimensional converger are depicted.
Figure 35B:
Figure 35C:
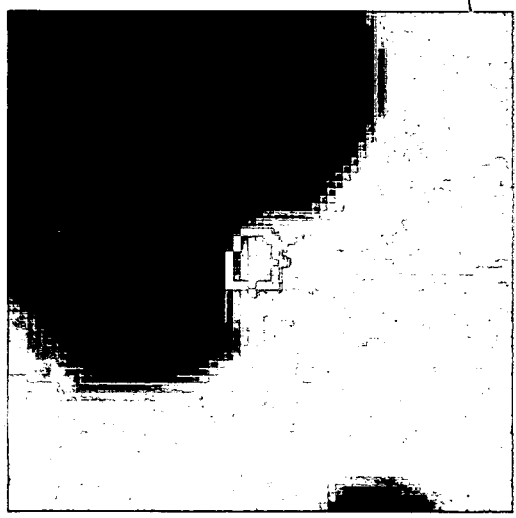
Figure 35D:

The screen shot of a digital representation containing at least one feature 3510 of FIG. 35A displays an image force map for at least one feature. The screen shot of a digital representation containing at least one feature 3520 of FIG. 35B displays an initial boundary after one run of the converging model (for example the running of the converging model 3330 of FIG. 33). The screen shot of a digital representation containing at least one feature 3530 of FIG. 35C displays an enclosing boundary after five runs of the converging model (for example the running of the converging model 3330 of FIG. 33). The screen shot of a digital representation containing at least one feature 3520 of FIG. 35B displays the stored optimal enclosing boundary of the feature (for example the optimized enclosing two-dimensional boundary 2942 of FIG. 29) after the forces have been determined to be balanced (for example the determining of balanced forces 3338 of FIG. 33).

EXAMPLE 40

Exemplary Screen Shots Showing Converging to the Enclosing Boundary of a Feature in a Two-Dimensional Digital Representation III Screen shots of views of an exemplary depiction of a method for converging to the enclosing boundary of a feature in a two-dimensional digital representation are shown in FIGS. 36A-D.

Figure 36A:
FIGS. 36A-D are screen shots of views of a portion of a virtual colon, including screen shots in which the results of an exemplary enclosing two-dimensional converger are depicted.
Figure 36B:
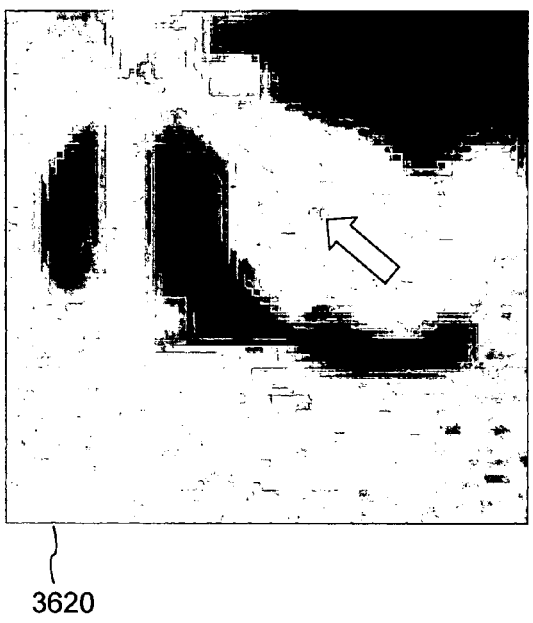
Figure 36C:
Figure 36D:
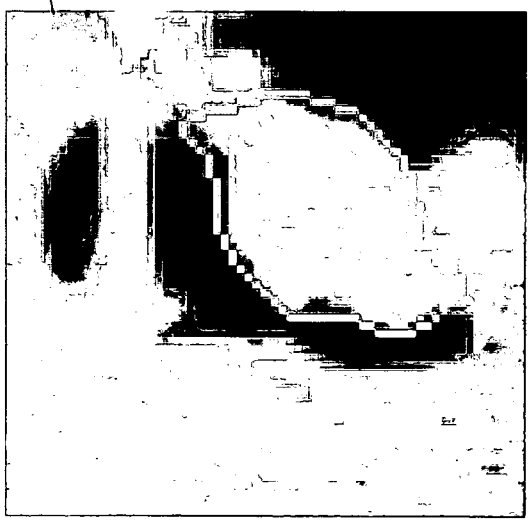

The screen shot of a digital representation containing at least one feature 3610 of FIG. 36A displays an image force map for at least one feature. The screen shot of a digital representation containing at least one feature 3620 of FIG. 36B displays an initial boundary after one run of the converging model (for example the running of the converging model 3330 of FIG. 33). The screen shot of a digital representation containing at least one feature 3630 of FIG. 36C displays an enclosing boundary after five runs of the converging model (for example the running of the converging model 3330 of FIG. 33). The screen shot of a digital representation containing at least one feature 3620 of FIG. 36B displays the stored optimal enclosing boundary of the feature (for example the optimized enclosing two-dimensional boundary 2942 of FIG. 29) after the forces have been determined to be balanced (for example the determining of balanced forces 3338 of FIG. 33).

EXAMPLE 41

Figure 37:
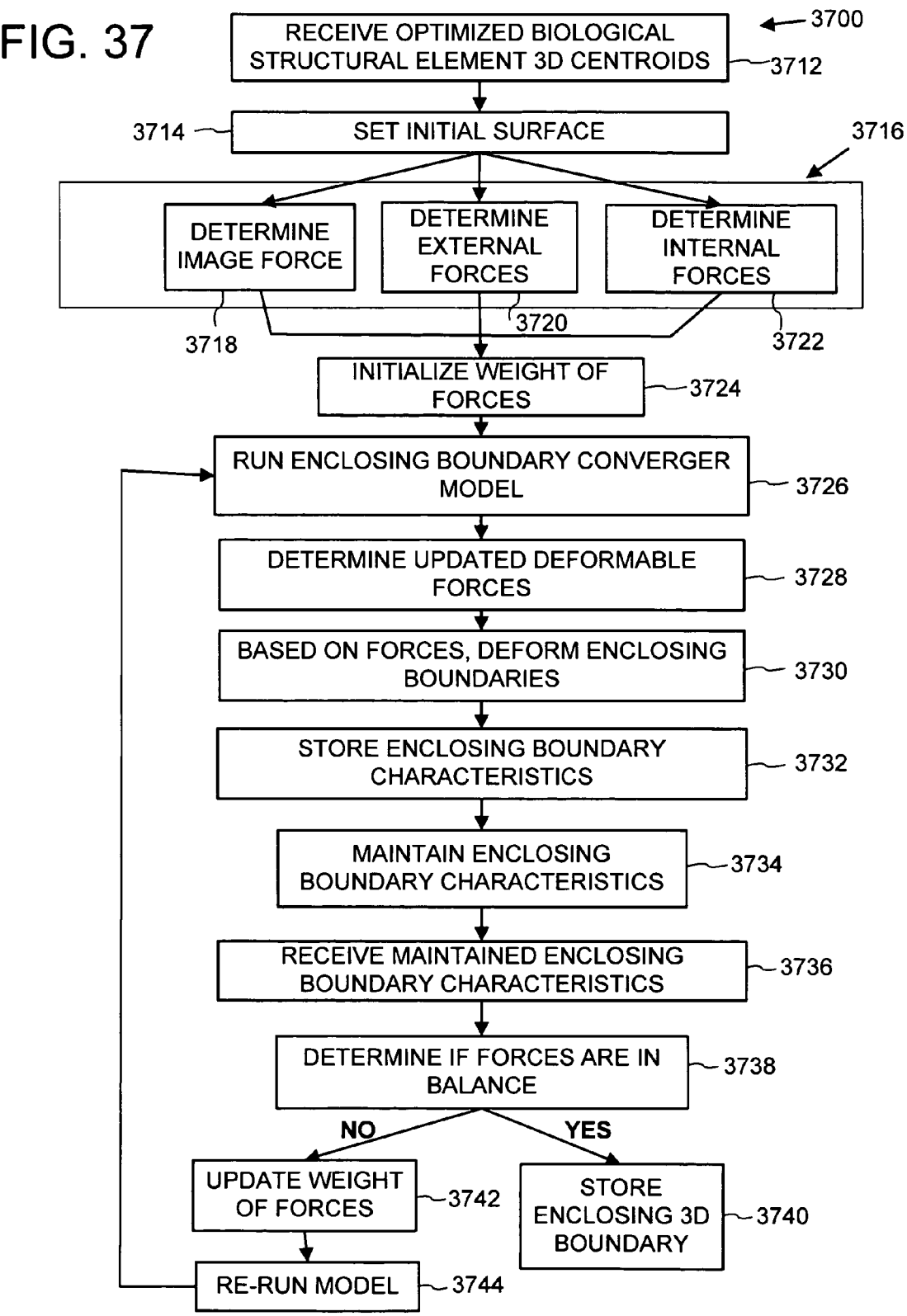
FIG. 37 is a flowchart of an exemplary method for converging to the enclosing boundary of a feature in a three-dimensional digital representation of at least a portion of a virtual anatomical structure.

Exemplary Method for Converging to the Enclosing Boundary of a Feature in a Three-Dimensional Digital Representation FIG. 37 shows an exemplary method 3700 for converging to the enclosing boundary of a feature in a three-dimensional digital representation. The method 3700 can be performed, for example, by the system 3000 of FIG. 30.

At 3712, membership functions including optimized biological structural element three-dimensional centroids (for example, the optimized biological structural element centroids 2324 of FIG. 23) representing at least one type of biological structural element classified components are received.

At 3714, an initial surface is set using the optimized biological structural element three-dimensional centroids composed of membership valued components 3712. One method that can be used is to set the initial surface as a cube of at least two voxel size in each dimension (2*2*2) centered at the seed location. The size and location of the initial surface can also be refined by the centroid and bounding box of the enhanced potential polyp type region composed of membership valued components.

At 3716, boundary forces used to drive converging to the enclosing boundary are determined. The forces can be expressed as a deformation boundary force F(v).

$$F(v) = w_{internal}F_{internal}(v) + w_{image}F_{image}(v) + w_{balloon}F_{balloon}(v) \qquad (15)$$

For example, (15) can be used, where $F_{internal}$ is the internal force, $F_{image}$ is the image force, $F_{external}$ is the external force, and $w_{in}$ is the weight of the internal force, $w_{im}$ is the weight of the image force, and $w_{ex}$ is the weight of the external force. The boundary force can also be normalized. Each component of the boundary force is a vector in three-dimensional space.

At 3718 the internal forces can be determined by the surface itself and can be used to prevent the contour from collapsing or breaking.

$$F_{internal}(v)=\alpha\nabla_v^2 s(v)-\beta\nabla_v^2(\nabla_v^2 s(v)) \qquad (16)$$

For example, (16) can be used, where s is the surface, v is the vertex on the surface, and $\nabla^2$ is the second order derivative operator. The derivatives can be determined by using Laplacian operator and finite differences on the triangular surface mesh that can make up the surface. The first-order term makes the contour act like an elastic membrane to prevent breaking, and the second-order term makes it act like a thin rigid plate to prevent collapsing. By adjusting the weights α and β one can control the relative importance of the membrane term and the thin plate term. α and β may be different at different values of s and at different iterations. α and β may also be constant for every s throughout the converging method. The internal force can be used to keep the surface smooth and continuous, and to prevent the surface from moving freely or bending too much.

At 3722, the image forces can be determined by image gradients and can be used to attract the contour to the feature boundaries.

$$F_{image}(v)=\nabla(G_\sigma(|\nabla G_\sigma(\mu(v)|^2)) \qquad (17)$$

For example, (17) can be used, where μ(v) is the biological structural element type membership map of polyp type three-dimensional centroids, ∇ is the gradient operator, and $G_\sigma$ is the Gaussian operator. The Gaussian operator is used to increase the capture range and smooth the image. Image forces are the major forces to attract the surface to the enclosing feature boundaries.

At 3720, the external forces can be determined by a balloon force that inflates the surface away from the center of the centroid.

$$F_{balloon}(v)=\frac{v-v_c}{\|v-v_c\|} \qquad (18)$$

For example, (18) can be used, where v is a vertex and $v_c$ is the centroid of the current surface. Since the initial surface is usually placed at or around the center of centroid where image forces are not strong enough to pull the converger model, balloon external forces are added to inflate the surface. The use of balloon forces can also speed up the converging process.

At 3724, the boundary forces 3716 can be weighted according. The weights of force components can be adaptively updated during the iterative process to enable at least one force to be dominant at different times in the converging process. At the initial phase or first iteration, balloon forces can be dominant to inflate the surface. As the surface moves closer to the boundary, the impact of balloon forces can be diminished gradually to prevent the surface from being overblown. Additionally, as the surface moves closer to the boundary, image forces and internal forces can be boosted to attract the surface to boundaries and keep the surface smooth. A weight adopting scheme can be used for this purpose.

$$w_{balloon}^{(t)}=w_{balloon}^{(t-1)}-0.1$$

$$w_{internal}^{(t)}=w_{internal}^{(t-1)}+0.1$$

$$w_{image}^{(t)}=w_{image}^{(t-1)}+0.1 \qquad (19)$$

One weight adopting scheme that can be used is (19), where t is the iteration number of the converger model. Weights can be enforced to be greater than 0.

At 3726, the enclosing boundary converger model is run using a surface and boundary forces. The converging model converges to the boundary of a feature under the guidance of image and balloon forces. The internal forces keep the contour smooth and continuous.

At 3728, boundary forces can be updated by changing weighting parameters 3724 and/or redetermining deformable forces (for example by 3718, 3720, and 3722).

At 3730, the enclosing boundary can be converged to again based on updated boundary forces 3728. At 3732 the enclosing boundary can be represented by triangular meshes characteristics that can be stored as a list of triangles and list of vertices. The location of vertex v is updated after each iteration of the converger model.

$$v^{(t)}=v^{(t-1)}+\tau F(v^{(t-1)}) \qquad (20)$$

One update scheme that can be used is (20), where τ is the boundary converger model deformation size. Each vertex can store its three-dimensional coordinate and pointer to triangles sharing this vertex. Each triangle can store pointers to its vertices and pointers to adjacent triangles sharing edges with it.

At 3734, the enclosing boundary characteristics can be maintained to retain surface resolution and balance the resolution and computation time demands.

At 3736, the maintained enclosing boundary characteristics can be received.

At 3738, the balance of the forces of the received maintained enclosing boundary 3736 can be determined. At 3742, the forces of the received maintained enclosing boundary 3736 can be determined to not be in balance and the enclosing boundary converger model 3726 can be run at least one more iteration after the weight of the forces are updated at 3742 using a weight adopting scheme. At 3740, the forces of the received maintained enclosing boundary 3736 can be determined to be in balance and the maintained enclosing boundary is stored as the optimal enclosing three-dimensional boundary of the feature in the digital representation.

EXAMPLE 42

Figure 38:
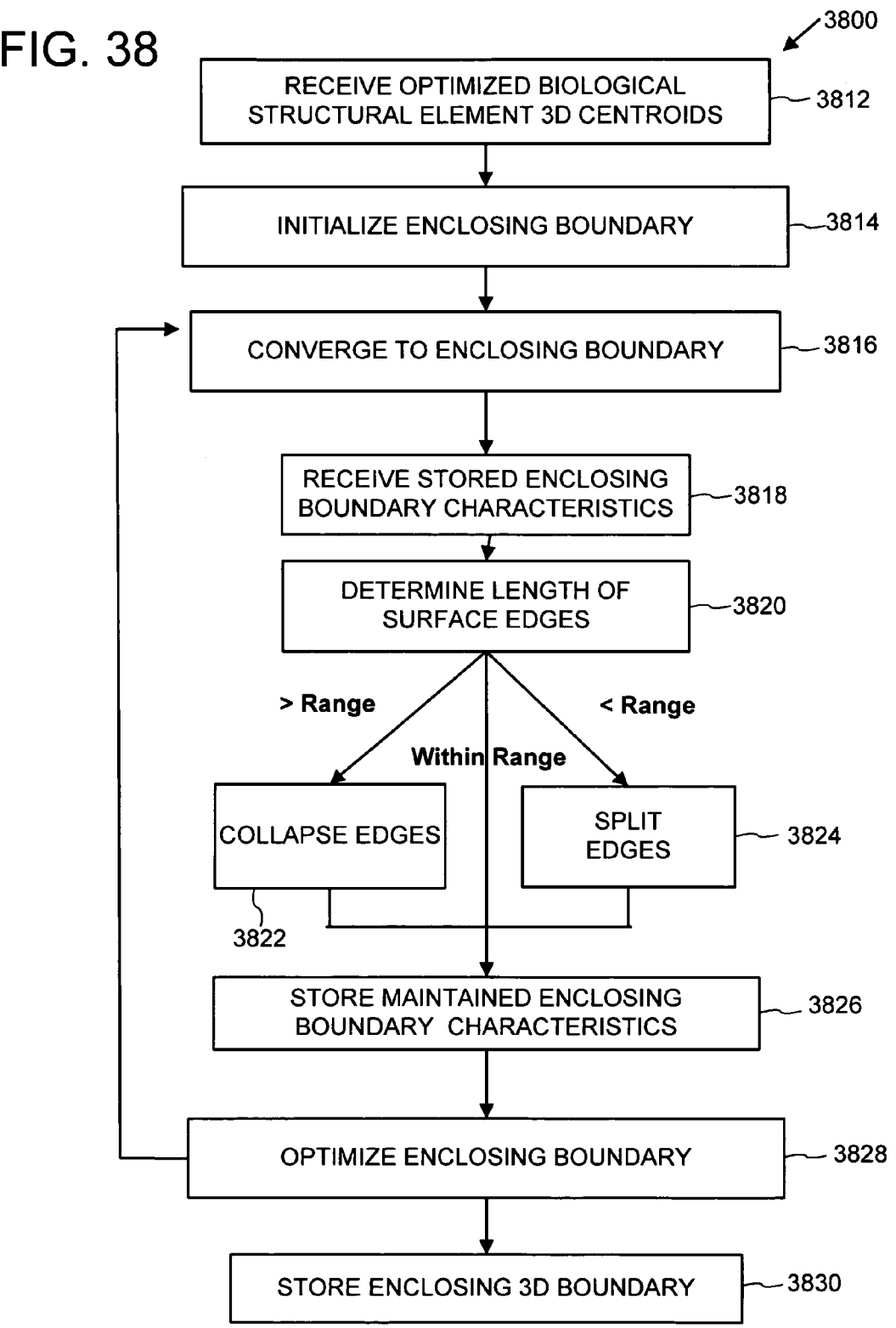
FIG. 38 is a flowchart of an exemplary method for converging to the enclosing boundary of a feature in a three-dimensional digital representation of at least a portion of a virtual anatomical structure.

Exemplary Method for Converging to the Enclosing Boundary of a Feature in a Three-Dimensional Digital Representation FIG. 38 shows an exemplary method 3800 for converging to the enclosing boundary of a feature in a three-dimensional digital representation. The method 3800 can be performed, for example, by the system 3000 of FIG. 30.

At 3812, optimized biological structural element three-dimensional centroids (for example, the optimized biological structural element centroids 2324 of FIG. 23) representing at least one type of biological structural element classified components are received.

At 3814, an enclosing three-dimensional boundary of at least one type of biological structural element centroid is initialized.

At 3816, an enclosing three-dimensional boundary is converged to based at least on a gradient between at least two biological structural element type three-dimensional centroids.

At 3818, an enclosing three-dimensional boundary surface represented by triangular meshes characteristics that are stored as a list of triangles and list of vertices is received.

At 3820, the lengths of the enclosing three-dimensional boundary surface edges is determined. The surface edges can be measured by the distance between adjacent vertices. It can be desirable to maintain a substantially constant surface resolution in the converging model process. If the surface resolution is too high (vertices are too close), too many vertices would need to be updated at each iteration and the converging process would be very slow. If the surface resolution is too low (vertices are too sparse), there might not be enough vertices on the surface to accurately describe the surface shape. It can also be desirable to have evenly distributed vertices on the surface; the resolution should be consistent on the surface. Uneven vertex distribution can cause uneven internal forces and balloon forces, which may result in incorrect enclosing boundary determination. Edge-based operations to dynamically maintain surface resolution can be used. For example, the number of vertices and the distribution of vertices can be monitored. If two vertices are too close (short edge) they can be collapsed into one vertex. If two vertices are too far apart (long edge), a vertex can be inserted in the middle.

At 3822, two vertices are collapsed based on the edge length between the vertices determined to be greater than a predetermined length, and the neighborhood is re-triangulated.

At 3824, a vertex is inserted between two vertices based on the edge length between the vertices determined to be less than a predetermined length, and the neighborhood is re-triangulated.

At 3826, edges determined to be within a predetermined length, and split and collapsed edges are stored as maintained enclosing boundary characteristics.

At 3828, a maintained enclosing three-dimensional boundary is optimized based at least on the balance of boundary forces.

At 3830, the optimized enclosing three-dimensional boundary is stored.

EXAMPLE 43

Exemplary Screen Shots Showing Converging to the Enclosing Boundary of a Feature in a Three-Dimensional Digital Representation Screen shots of views of an exemplary depiction of a method for converging to the enclosing boundary of a feature in a three-dimensional digital representation are shown in FIGS. 39A-D.

Figure 39A:
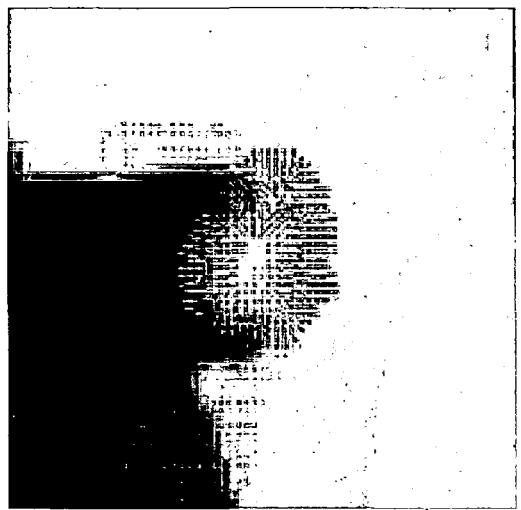
FIGS. 39A-D are screen shots of views of a portion of a virtual colon, including screen shots in which results of an exemplary enclosing three-dimensional converger are depicted.
Figure 39B:
Figure 39C:
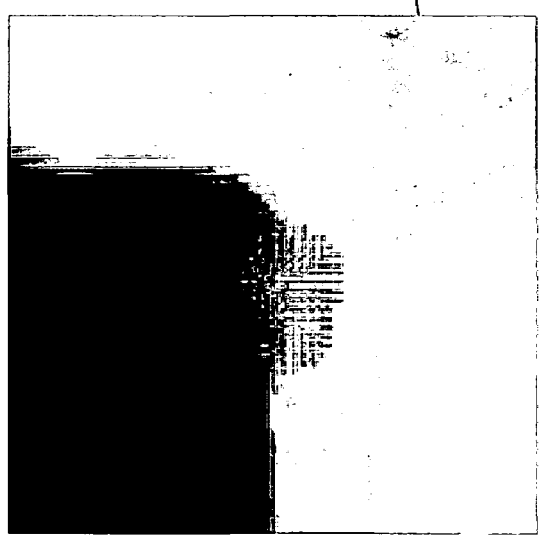
Figure 39D:
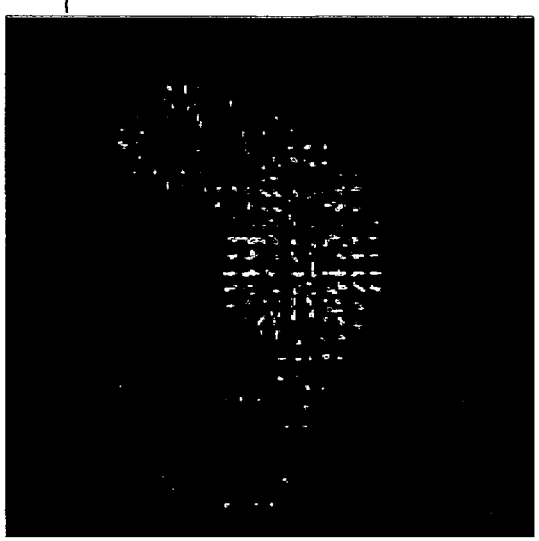

The screen shot of a digital representation containing at least one feature 3910 of FIG. 39A displays an image force map of a two-dimensional cross-section for at least one feature. The screen shot of a digital representation containing at least one feature 3920 of FIG. 39B displays an image force map of a two-dimensional cross-section for at least one feature. The screen shot of a digital representation containing at least one feature 3930 of FIG. 39C displays an image force map of a two-dimensional cross-section for at least one feature. The screen shot of a digital representation containing at least one feature 3940 of FIG. 39D displays an image force map in three-dimensional view (of the two-dimensional cross-section image force maps 3910, 3920, and 3930) for at least one feature.

EXAMPLE 44

Exemplary Mesh Maintenance

Figure 40A:
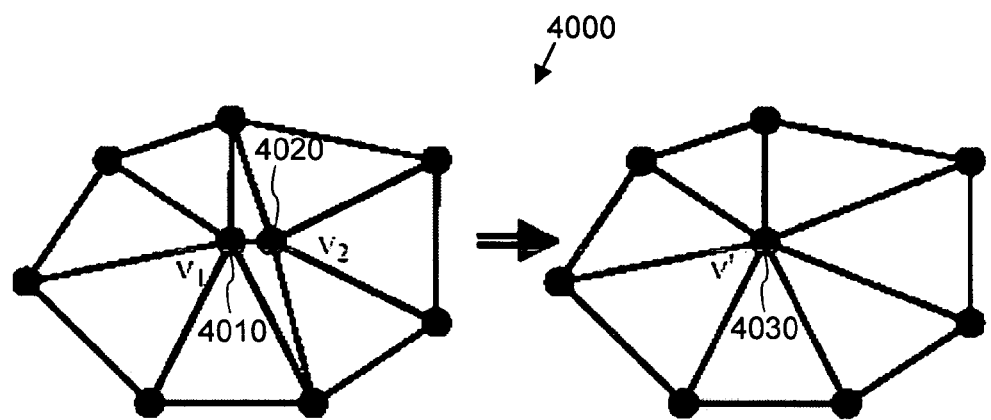
FIG. 40 illustrates boundary maintainer operations in the exemplary method for converging to the enclosing boundary of a feature in a three-dimensional digital representation of at least a portion of a virtual anatomical structure.

Diagrams showing meshes illustrating maintaining the enclosing boundary of a feature of a three-dimensional digital representation of an anatomical structure are shown in FIGS. 40A and B.

FIG. 40A illustrates a mesh pair 4000 in which two vertices are collapsed (for example, collapsing edges 3822 of FIG. 38) based on the edge length between the vertices determined to be less than a predetermined length. The edge between vertex 4010 and vertex 4020 is collapsed into vertex 4030 and its neighborhood is re-triangulated.

Figure 40B:
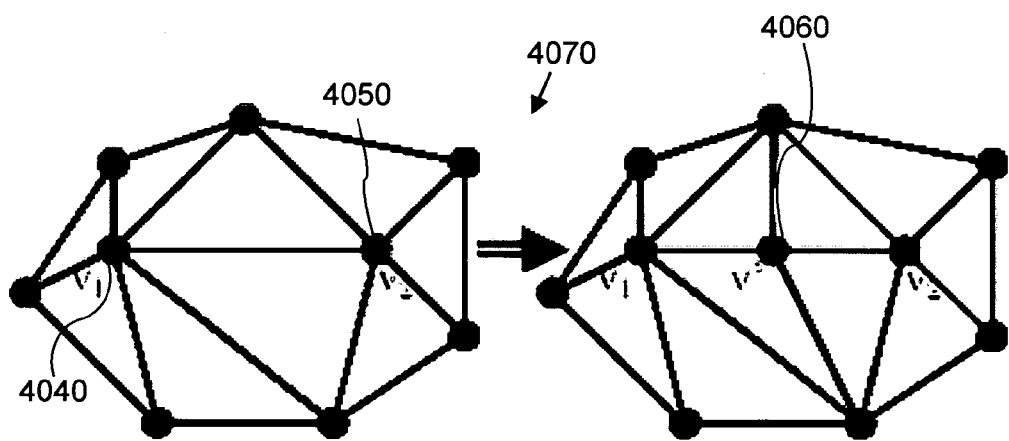

FIG. 40B illustrates a mesh pair 4070 in which two vertices are split (for example, splitting edges 3824 of FIG. 38) based on the edge length between the vertices determined to be greater than a predetermined length. The edge between vertex 4040 and 4050 is split in the middle by vertex 4060 and its neighborhood is re-triangulated.

EXAMPLE 45

Figure 41A:
FIGS. 41A-C are screen shots of views of a portion of a virtual colon, including screen shots in which the results of an exemplary enclosing three-dimensional converger are depicted.
Figure 41B:
Figure 41C:

Exemplary Screen Shots Showing Converging to the Enclosing Boundary of a Feature of a Three Dimensional Digital Representation Screen shots of views of an exemplary depiction of a method of converging to the enclosing boundary of a feature of a three-dimensional digital representation of an anatomical structure are shown in FIGS. 41A-C.

The screen shot of a digital representation containing at least one feature 4110 of FIG. 41A displays one two-dimensional cross section of the initial state of the converging model (for example 3714 of FIG. 37). The screen shot of a digital representation containing at least one feature 4120 of FIG. 41B displays one two-dimensional cross section of an enclosing boundary at an intermediate stage after multiple runs of the converging model (for example the running of the converging model 3726 of FIG. 37). The screen shot of a digital representation containing at least one feature 4130 of FIG. 41C displays one two-dimensional cross section of the stored optimal enclosing boundary of the feature (for example the optimized enclosing three-dimensional boundary 3028 of FIG. 30) after the forces have been determined to be balanced (for example the determining of balanced forces 3738 of FIG. 37).

EXAMPLE 46

Figure 42A:
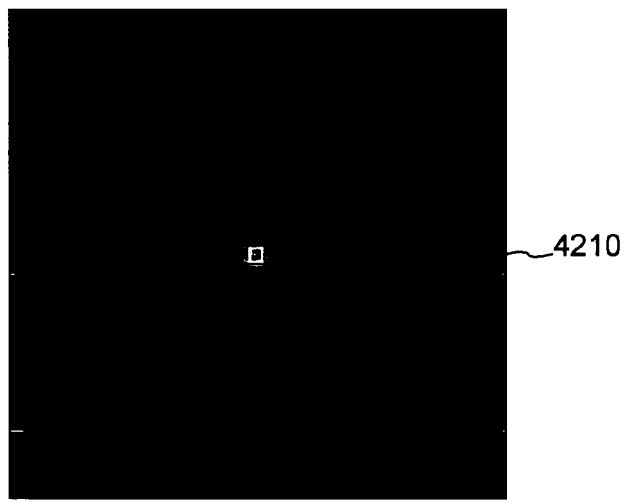
FIGS. 42A-C are screen shots of views of a portion of a virtual colon, including screen shots in which the results of an exemplary enclosing three-dimensional converger are depicted.
Figure 42B:
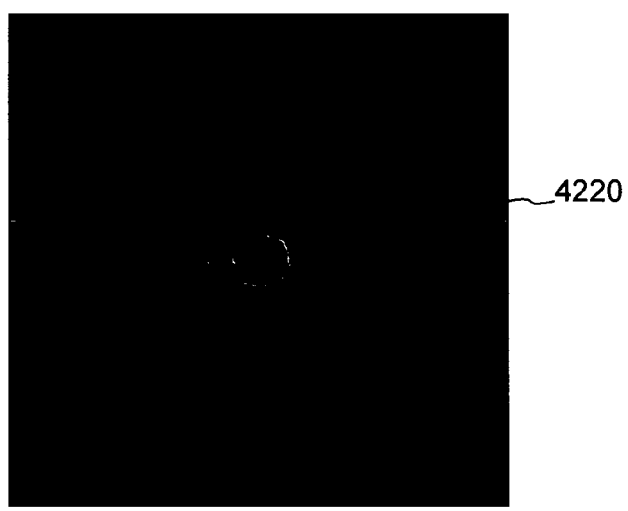
Figure 42C:
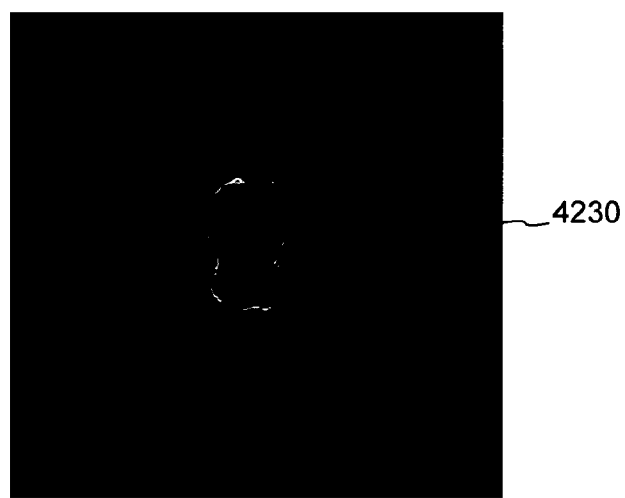

Exemplary Screen Shots Showing Converging to the Enclosing Boundary of a Feature of a Three Dimensional Digital Representation Screen shots of views of an exemplary depiction of a method of converging to the enclosing boundary of a feature of a three dimensional digital representation of an anatomical structure are shown in FIGS. 42A-C.

The screen shot 4210 of FIG. 42A of a feature of a digital representation (for example the feature of digital representation 4110 of FIG. 41A) displays the initial state of the three-dimensional converging model (for example 3714 of FIG. 37). The screen shot 4220 of FIG. 42B of a feature of a digital representation (for example the feature of digital representation 4120 of FIG. 41B) displays an enclosing three-dimensional boundary at an intermediate stage after multiple runs of the converging model (for example the running of the converging model 3726 of FIG. 37). The screen shot 4230 of FIG. 42C of a feature of a digital representation (for example the feature of digital representation 4130 of FIG. 41C) displays the stored optimal enclosing three-dimensional boundary of the feature (for example the optimized enclosing three-dimensional boundary 3028 of FIG. 30) after the forces have been determined to be balanced (for example the determining of balanced forces 3738 of FIG. 37).

EXAMPLE 47

Figure 43A:
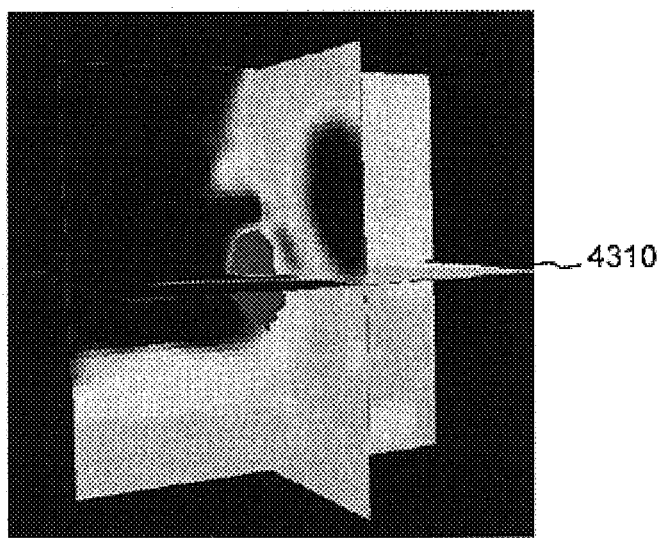
FIGS. 43A-C are screen shots of views of a portion of a virtual colon, including screen shots in which the results of an exemplary enclosing three-dimensional converger are depicted.
Figure 43B:
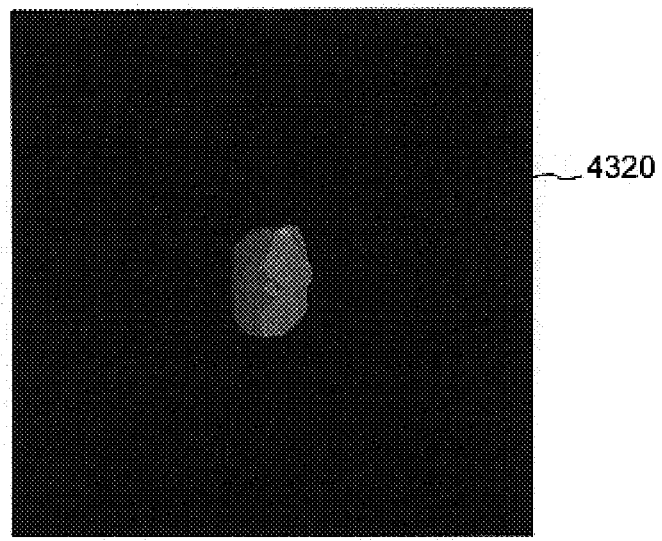
Figure 43C:
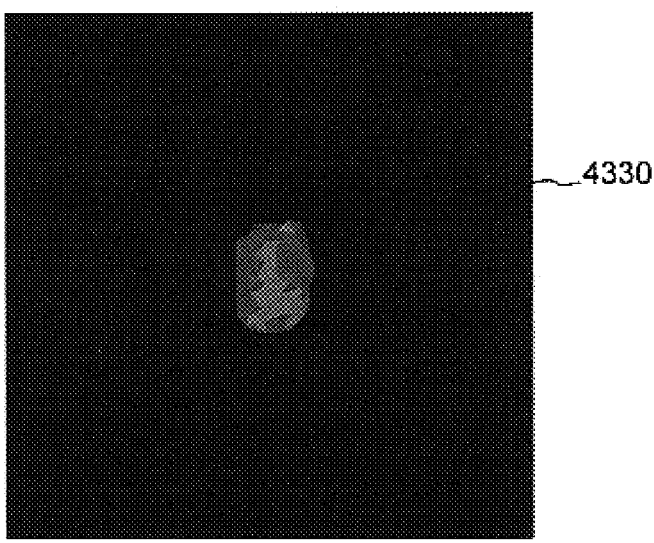

Exemplary Screen Shots Showing Converging to the Enclosing Boundary of a Feature of a Three Dimensional Digital Representation Screen shots of views of an exemplary depiction of a method of converging to the enclosing boundary of a feature of a three-dimensional digital representation of an anatomical structure are shown in FIGS. 43A-C.

Results of the enclosing three-dimensional boundary converging method can be visualized and color painted in different way to demonstrate feature properties. FIGS. 43A-C show three different visualization of the enclosing three-dimensional boundary converging method result.

The screen shot 4310 of FIG. 43A of a feature of a digital representation is the fusion of the surface and three orthogonal views of the image (for example, three two-dimensional planes), which can help the user to examine the three-dimensional relationships between the polyp and its surrounding region. In this way, the orthogonal views can provide surrounding visual context for the boundary of the feature. Orthogonal views can be orthogonal to the coordinate system, orthogonal to the normal to the colonic surface, or at an arbitrary angle to the enclosing three-dimensional boundary of the feature.

The screen shot 4320 of FIG. 43B is a boundary map of the feature. Polyps have two types of boundaries: outer boundary (the boundary abutting lumen) and inner boundary (the boundary abutting the colon wall). The ability to distinguish inner boundaries and outer boundaries is important for computing features such as polyp wall thickness. The boundary map 4320 can help visualize the connection between the polyp and the colon wall. Colors, shading, and/or brightness can be used to distinguish between boundaries. The screen shot 4330 of FIG. 43C is a curvature map of the feature. The surface can be painted or differentially brightened or shaded according to local curvatures on the surface, including convex, concave and flat. The curvature map can help visualize the terrain of the feature. Area ratios of inner and outer boundaries and area ratios of convex and concave regions can also be derived from these visualization maps.

EXAMPLE 48

Figure 44:
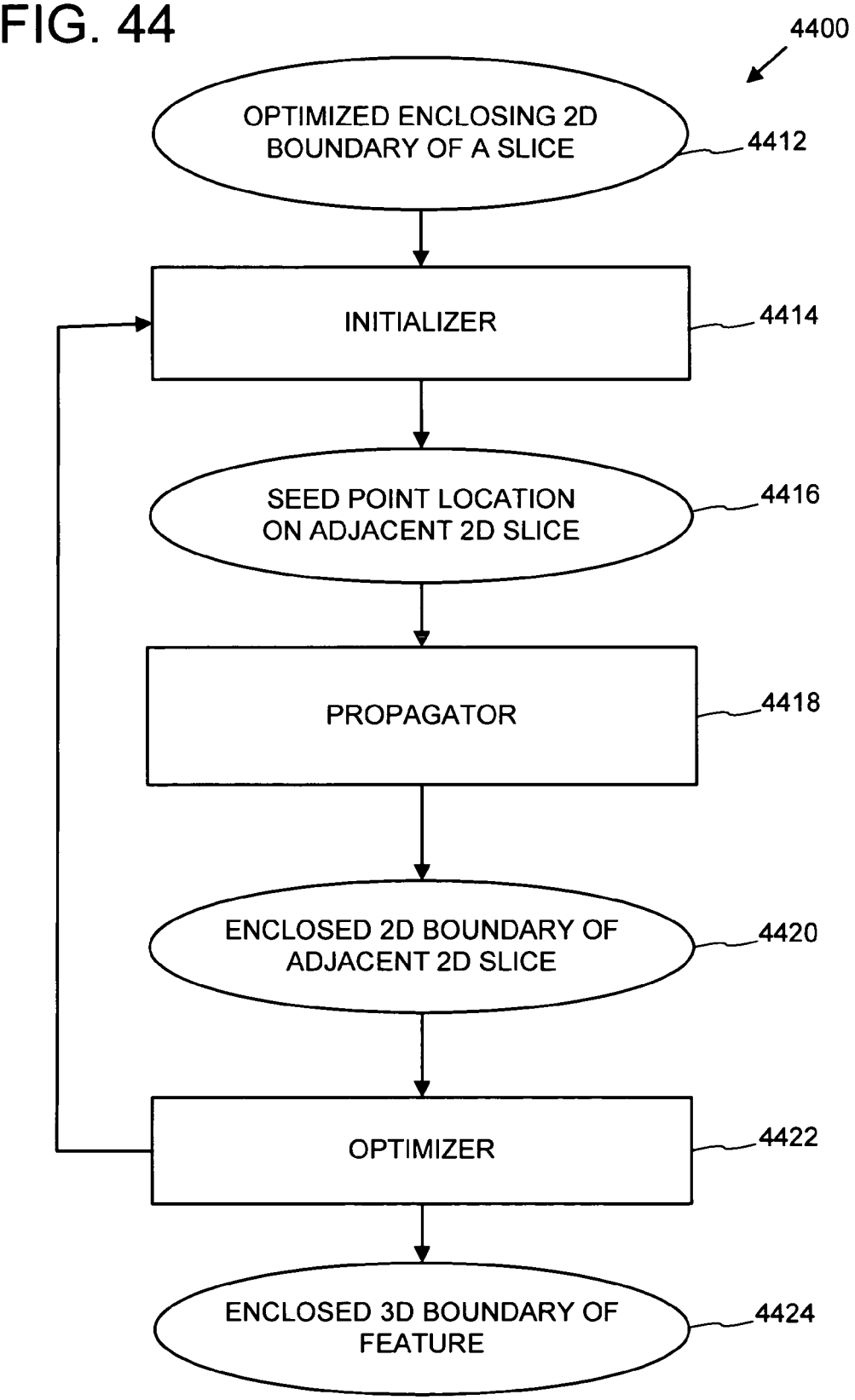
FIG. 44 is a block diagram of an exemplary system for propagating converging to an enclosing two-dimensional boundary to adjacent two dimensional slices of a digital representation of at least a portion of a virtual anatomical structure to determine an enclosing three-dimensional boundary of a feature.

Exemplary System for Propagating an Enclosing Two-Dimensional Boundary to Adjacent Two-Dimensional Slices of a Digital Representation to Determine an Enclosing Three-Dimensional Boundary of a Feature FIG. 44 shows an exemplary system 4400 for propagating an enclosing two-dimensional boundary to adjacent two-dimensional slices of a digital representation to determine an enclosing three-dimensional boundary of a feature.

An initializer 4414 can receive an optimized enclosing two-dimensional boundary of a slice of a digital representation 4412 (for example, the optimized enclosed two-dimensional boundary 2924 of FIG. 29) and determine a seed point location 4416 on an adjacent two-dimensional slice of a digital representation. A propagator 4418 can then receive the seed point location 4416 on an adjacent two-dimensional slice and determine an enclosed two-dimensional boundary of the adjacent slice. An optimizer 4422 can then receive the enclosed two-dimensional boundary of at least one adjacent slice and determine an enclosed three-dimensional boundary of a feature.

EXAMPLE 49

Figure 45:
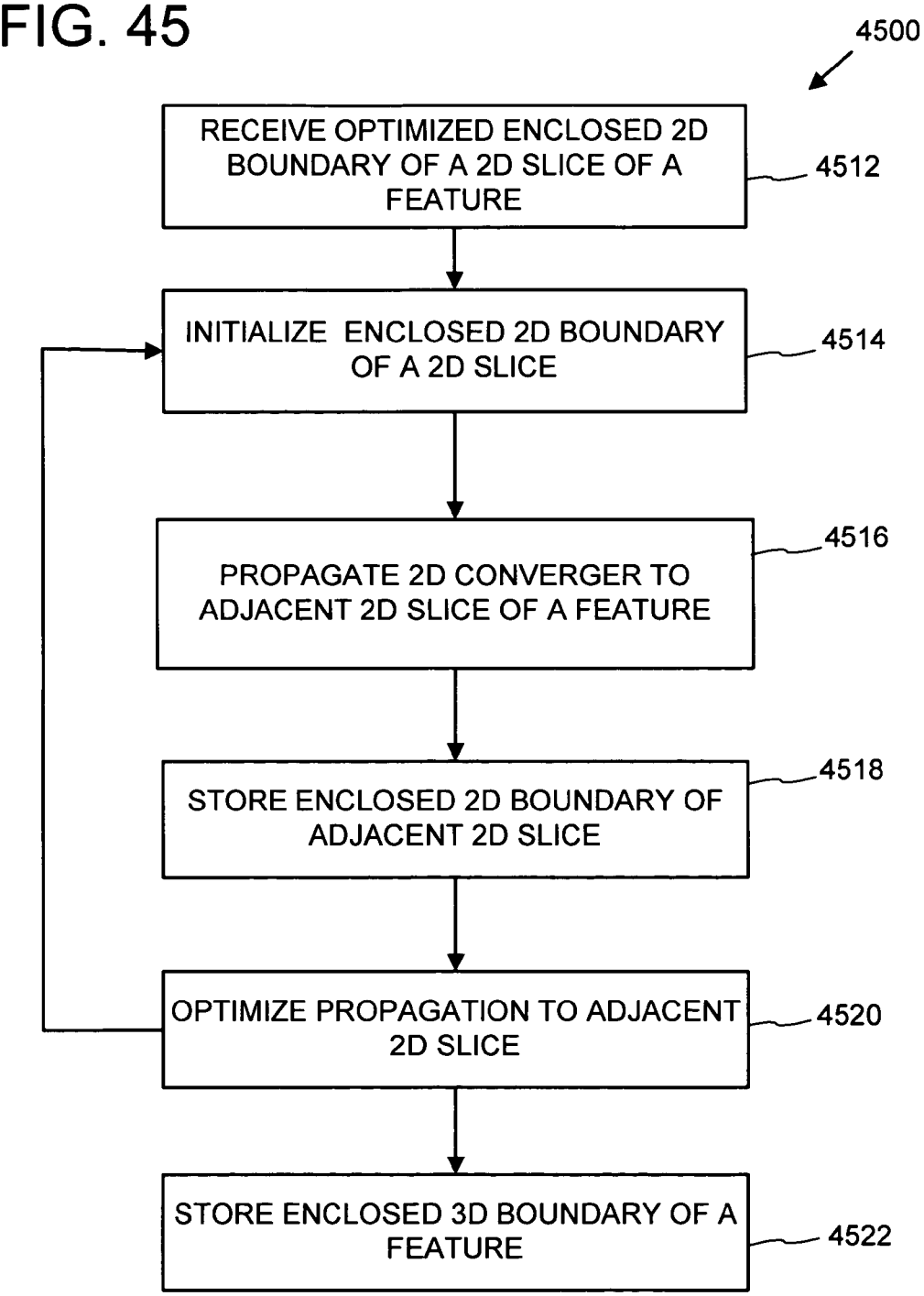
FIG. 45 is a flowchart showing an exemplary method for propagating converging to an enclosing two-dimensional boundary to adjacent two dimensional slices of a digital representation of at least a portion of a virtual anatomical structure to determine an enclosing three-dimensional boundary of a feature.

Exemplary Method for Propagating an Enclosing Two-Dimensional Boundary to Adjacent Two-Dimensional Slices of a Digital Representation to Determine an Enclosing Three-Dimensional Boundary of a Feature FIG. 45 shows an exemplary method for converging to the enclosing boundary of a feature in a three-dimensional digital representation. The method 4500 can be performed, for example, by the system 4400 of FIG. 44.

At 4512, an optimized enclosed two-dimensional boundary of a two-dimensional slice of a feature is received.

At 4514, a received two-dimensional boundary of a two-dimensional slice of a feature is initialized to determine a seed point location for an adjacent two-dimensional slice.

At 4516, converging to an enclosing two-dimensional boundary of a feature is propagated to an adjacent two-dimensional slice.

At 4518, an enclosed two-dimensional boundary of an adjacent two-dimensional slice is stored.

At 4520, propagation of converging to two-dimensional boundaries of adjacent two-dimensional slices of a feature is optimized to determine an enclosing three-dimensional boundary of a feature from at least one enclosing two-dimensional boundary of a two-dimensional slice.

At 4522, an enclosed three-dimensional boundary of a feature is stored.

EXAMPLE 50

Figure 46:
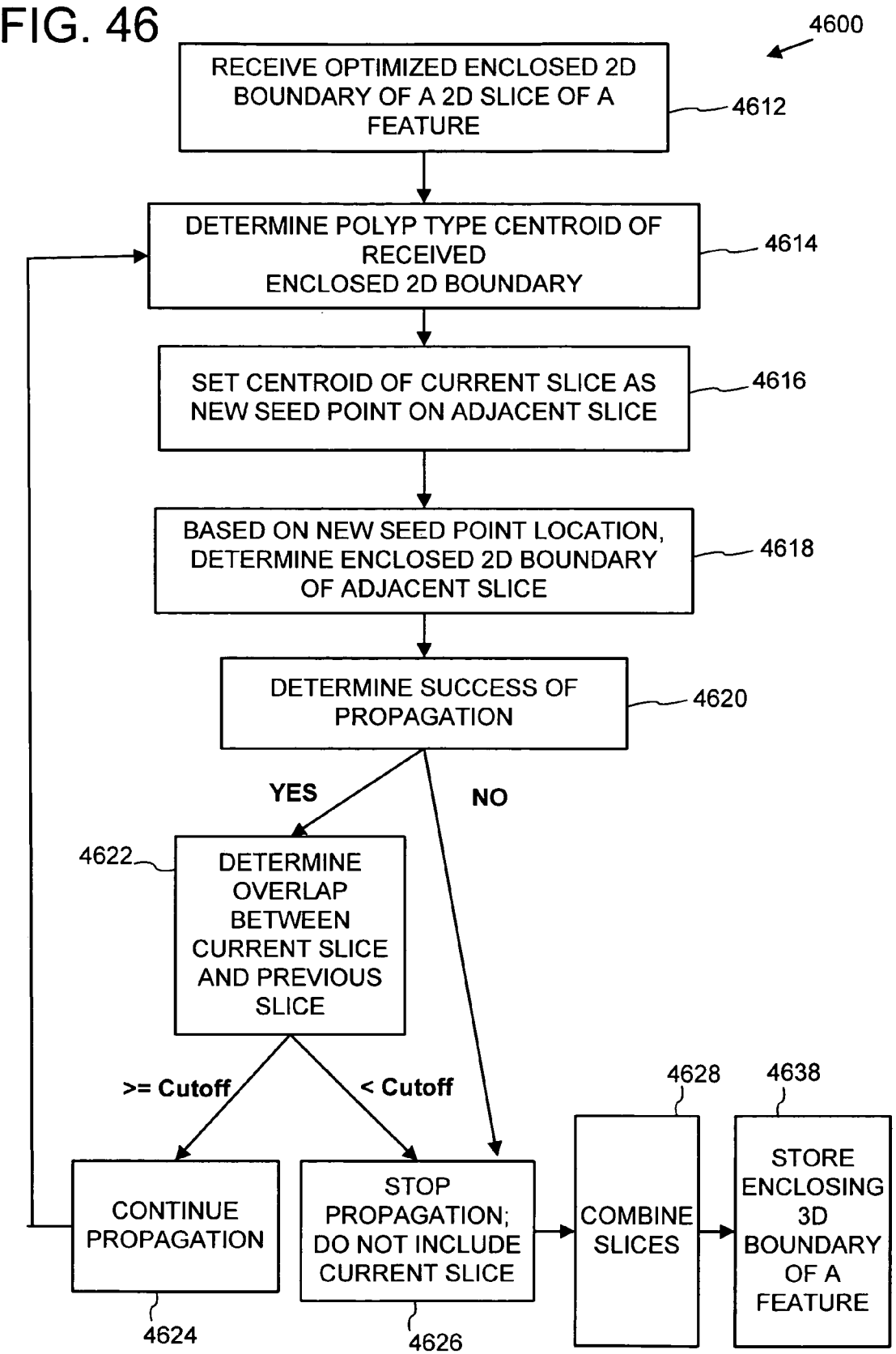
FIG. 46 is a flowchart showing an exemplary method for propagating converging to an enclosing two-dimensional boundary to adjacent two dimensional slices of a digital representation of at least a portion of a virtual anatomical structure to determine an enclosing three-dimensional boundary of a feature.

Exemplary Method for Propagating an Enclosing Two-Dimensional Boundary to Adjacent Two-Dimensional Slices of a Digital Representation to Determine an Enclosing Three-Dimensional Boundary of a Feature FIG. 46 shows an exemplary method for converging to the enclosing boundary of a feature in a three-dimensional digital representation. The method 4600 can be performed, for example, by the system 4400 of FIG. 44.

At 4612, an optimized enclosed two-dimensional boundary of a two-dimensional slice of a feature is received.

At 4614, a received two-dimensional boundary of a two-dimensional slice of a feature is analyzed to determine the polyp type centroid of the feature.

At 4616, the polyp type centroid of the feature 4614 is set as the seed point location for an adjacent two-dimensional slice.

At 4618, an enclosed two-dimensional boundary of an adjacent two-dimensional slice is determined using a exemplary two-dimensional boundary converger (for example the boundary converger system 2900 of FIG. 29).

At 4620, success of propagation is determined by whether or not the adjacent two-dimensional slices is successfully boundary converged.

At 4622, overlap between at least two adjacent slices is determined with a predefined threshold cutoff for determining whether to continue or stop propagation.

At 4624, propagation is continued to the next adjacent slice as the boundary overlap between two adjacent slices is greater than or equal to a threshold value.

At 4626, propagation is stopped as either no boundary was determined in the slice or the boundary overlap between two adjacent slices is less than a threshold value.

At 4628, at least two adjacent boundary converged slices are combined to form an enclosing three-dimensional boundary of a feature.

At 4638, the enclosing three-dimensional boundary of a feature is stored.

EXAMPLE 51

Exemplary Screen Shots Showing Propagation

Screen shots of views of an exemplary depiction of a method for propagating an enclosing two-dimensional boundary to adjacent two-dimensional slices of a digital representation to determine an enclosing three-dimensional boundary of a feature are shown in FIGS. 47A-E.

Figure 47A:
FIGS. 47A-E are screen shots of views of a portion of a virtual colon, including screen shots in which the results of an exemplary propagator are depicted.
Figure 47B:
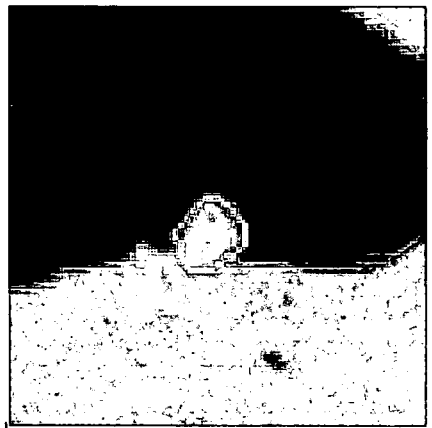
Figure 47C:
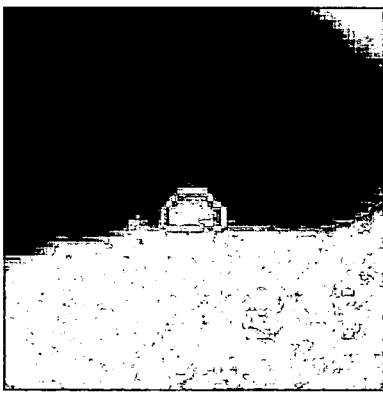
Figure 47D:
Figure 47E:

Five adjacent segmented transverse slices are depicted, with 4720 of FIG. 47B depicting the seed point (center slice). 4710 FIG. 47A is the slice previous to the center slice, 4730 of FIG. 47C is the slice following the center slice 4720 of FIG. 47B, 4740 of FIG. 47D is the slice following 4730 of FIG. 47C, and 4750 of FIG. 47E is the slice following 4740 of FIG. 47D.

EXAMPLE 52

Exemplary Screen Shot Showing Propagated Boundary

Figure 48:
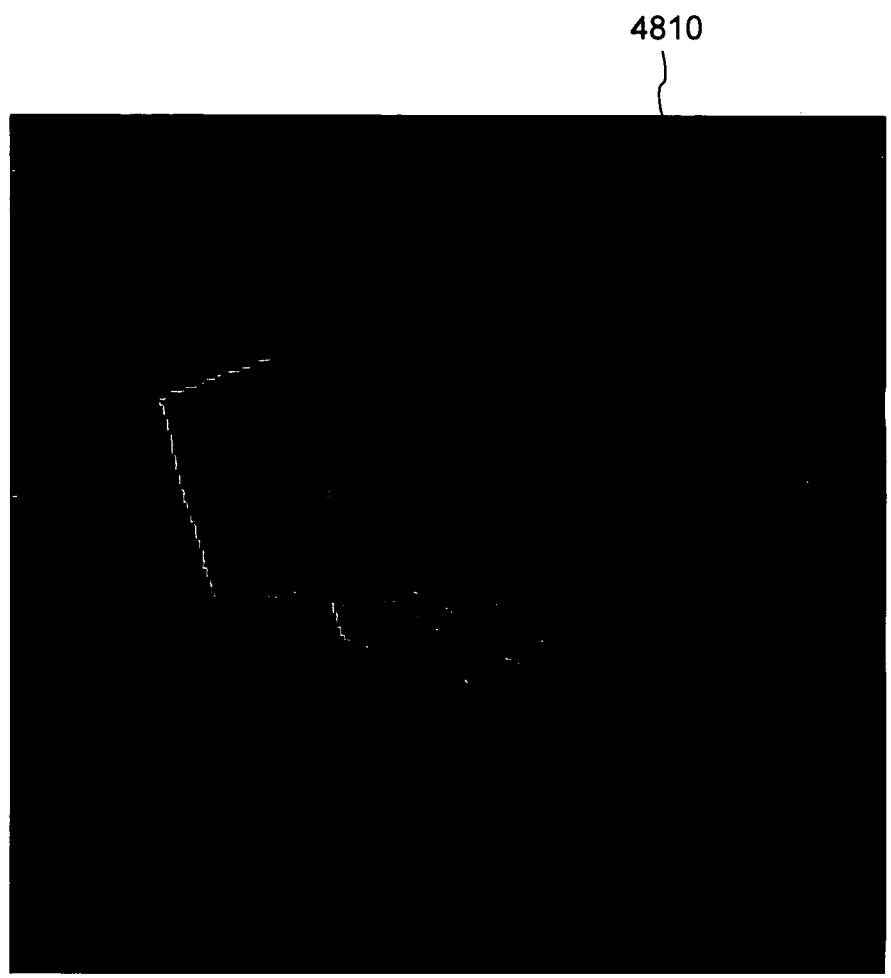
FIG. 48 is a screen shot of propagated converged enclosing two-dimensional boundaries of two-dimensional slices of a portion of a virtual colon stacked together to form an enclosing three-dimensional boundary of a digital representation of a polyp.
Figure 52A:
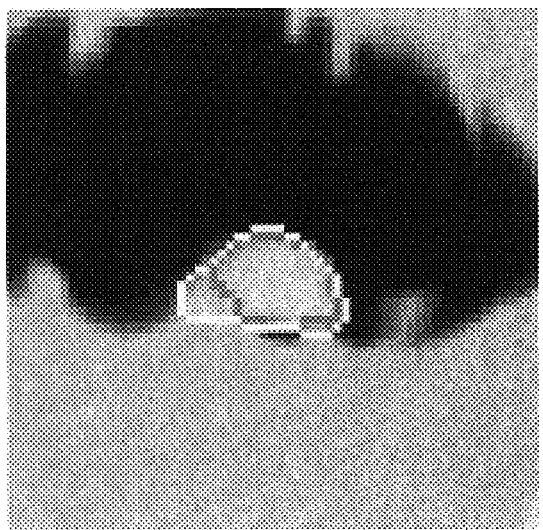
FIGS. 52A-D are screen shots of views of virtual colons, including screen shots in which manual segmentation is displayed together with the experimental results of boundary determination using an exemplary two-dimensional method. Shading or colors are used to distinguish between the contours.
Figure 52B:
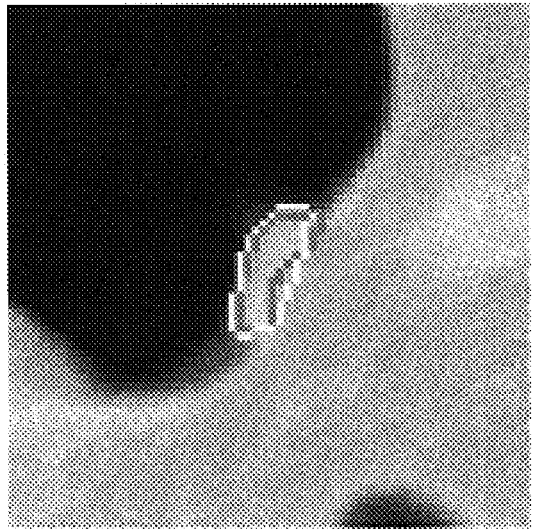
Figure 52C:
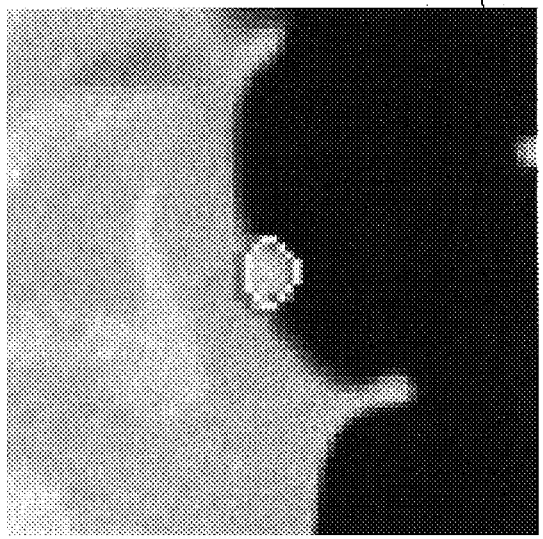
Figure 52D:
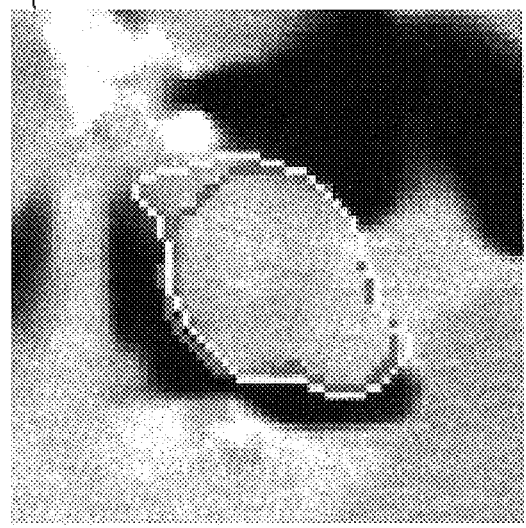

Screen shot 4810 of FIG. 48 is a screen shot of propagated converged enclosing two-dimensional boundaries of two-dimensional slices of a portion of a virtual colon stacked together to form an enclosing three-dimensional boundary of a digital representation of a polyp.

EXAMPLE 53

Exemplary Digital Representations of Typical Polyp Shapes in CT Colonography

Screen shots of views of digital representations (for example, the digital representation 112 of FIG. 1) of exemplary typical polyp shapes are shown in FIGS. 49A-D. 4910 of FIG. 49A is a display of an exemplary perfect medium round polyp. 4920 of FIG. 49B is a display of a tiny polyp. 4930 of FIG. 49C is a display of a flat polyp. 4940 of FIG. 49D is a display of a polyp on a fold.

EXAMPLE 54

Exemplary Digital Representations of Polyp Regions in CT Colonography

Screen shots of views of digital representations (for example, the digital representation 112 of FIG. 1) of exemplary typical polyp shapes are shown in FIGS. 50A-D. 5010 of FIG. 50A is a display of a polyp connected to a fold. 5020 of FIG. 50B is a display of a big mass. 5030 of FIG. 50C displays the large polyp and the blurry boundary that can sometimes be found between polyp and non-polyp tissue. 5040 of FIG. 50D displays a particularly complex scene of polyp and non-polyp tissue.

EXAMPLE 55

Exemplary System for Determining Polyp Candidates from a Digital Representation of a Colon FIG. 51 shows an exemplary system 5100 for evaluating a CT scan to find polyps. The system 5120 incorporates an enclosing three-dimensional boundary determiner 5120, which can include an adjuster 5122, a tissue classifier 5124, and a boundary converger 5126 that can employ the technologies described herein.

As shown in the example, a digital representation of at least a portion of a colon 5110 is used as input to a surface based filter 5112, which identifies polyp candidates 5116. Each of the candidates can be fed as a digital representation to the enclosing three-dimensional boundary determiner 5120, which feeds its output to a filter 5130 (for example, filtering based on characteristics calculated via the boundary), which results in filtered polyp candidates 5132.

EXAMPLE 56

Exemplary Experimental Results in a Two-Dimensional Scenario

The CT colonography data used in an experiment were obtained from 20 patients (each patient had a supine study and a prone study). CT scans were done on a GE Hispeed scanner. The scanning parameters were 120 KVp, 50 mAs (mean), field of view to fit (38-46 cm), 5 mm collimation, HQ mode, and 3 mm reconstruction interval. The data size was 512*512*N, where N is the number of transverse slices, which is around 300. Based on colonoscopic examination and CT colonography of the same patient, 65 polyps were identified. First, the colon surface was extracted from the CT colonography. Then, a filter was applied to every vertex on the surface based on its geometric and volumetric attributes. The output of the filter is a set of seed points. Among the seed points, some are true positive detections, some are false positive detections. The filter on the data set generated 105 true positive detections (with multiple detections of the same polyp). For each true positive detection, the computer segmentation method described (that is, finding the enclosing three-dimensional boundary) was applied to obtain the polyp boundaries. The segmentation method was robust enough to segment all true positive detections. The results in FIGS. 34, 35, 36, 47, and 52 show that the segmentation visually matches the polyp boundary. In order to quantitatively validate the accuracy of our segmentation method, all true positive detections were manually painted, and the painting was stored in a database. The polyp painting was carefully performed by a trained student and verified by an experienced radiologist. The manual painting was used as the ground-truth segmentation in the study.

FIG. 52 shows several manual paintings 5210, 5220, 5230, and 5240 together with computer segmentation. The blue (dark) contours are the manual painting and the yellow (bright) contours are the computer segmentations. The accuracy of the computer segmentation results is validated by computing the overlap between the manual painting and the computer segmentation. The overlap is computed as shown in (21), where $C_s$ is the computer segmentation, and $C_p$ is the manual painting $$\|\cdot\|$$

represent the number of voxels in a segmentation. Among all 105 true positive detections, the average overlap was 76.3%, the standard deviation was 21.7%, the minimum overlap was 34.4%, and the maximum overlap was 95.5%. From the observation in FIG. 52, 80% overlap is relatively good considering the small size of the colonic polyps.

$$\text{overlap} = \frac{2\|c_s \cap c_p\|}{\|c_s\| + \|c_p\|} \times 100\% \qquad (21)$$

EXAMPLE 57

Exemplary Experimental Results for a Three-Dimensional Scenario

The CT colonography data in the experiment were obtained from 20 patients (each patient had a supine study and a prone study) [3]. CT scans were done on a GE HiSpeed scanner. The scanning parameters were 120 kVp, 50 mAs (mean), field of view to fit was 38-46 cm, 5 mm collimation, HQ mode, and 3 mm reconstruction interval. The data size was 512*512*N, where N is the number of transverse slices, which is around 300. Based on colonoscopic examination and CT colonography of the same patient, 25 polyps larger than 1 cm were identified. The segmentation process was run on true positive detections to obtain the polyp boundaries.

The results in FIGS. 42 and 43 showed that the segmentation visually aligns with the polyp boundaries. In order to quantitatively validate the accuracy of the segmentation, all true positive detections were manually segmented, and the manual segmentation stored in a database. The manual segmentation was carefully performed by a trained student and verified by an experienced radiologist. The manual segmentation was used as the gold standard segmentation in the investigation.

The accuracy of the computer segmentation results is validated by computing the volume overlap percentage between the manual segmentation and the computer segmentation. The volume overlap percentage is computed as shown in (22), where $C_s$ is the computer segmentation, and $C_p$ is the manual segmentation, $\cap$ is the set intersect operation, $$\|\cdot\|$$

is the number of voxels in a segmentation. Validation results of the volume overlap percentage between computer segmentation and manual segmentation among 25 polyp detections were determined. The average volume overlap percentage was 80.6%, the standard deviation was 7.8%, the minimum percentage was 64.4%, and the maximum percentage was 90.5%.

$$\text{overlap} = \frac{2\|c_s \cap c_p\|}{\|c_s\| + \|c_p\|} \times 100\% \qquad (22)$$

FIGS. 53A and 53B show results for a three-dimensional scenario. FIGS. 53C and 53D show corresponding two-dimensional analysis.

EXAMPLE 58

Exemplary Acquisition of Digital Representations

A variety of techniques can be used to acquire digital representations for use with the technologies described herein. In practice, a digital representation of an anatomical structure can be acquired; plural digital representations of portions of the anatomical structure can then be extracted therefrom.

Acquisition of a representation of an anatomical structure is typically done by performing a scan of the soft tissues of the patient. For example, a CT scan can be performed according to any number of standard protocols. CT scans can be used to generate thin-section CT data (for example, helical scan CT data). The representation can be analyzed immediately after the scan, or the representation can be stored for later retrieval and analysis. Exemplary techniques for acquiring scans are described in Vining et al., "Virtual Colonoscopy," *Radiology* 193(P):446 (1994), Vining et al., "Virtual Bronchoscopy," *Radiology* 193(P):261 (1994), and Vining et al., "Virtual bronchoscopy. Relationships of virtual reality endobronchial simulations to actual bronchoscopic findings" *Chest* 109(2): 549-553 (February 1996), all of which are hereby incorporated herein by reference.

Any number of hardware implementations can be used to acquire a representation of an anatomical structure. For example, the GE HiSpeed Advantage scanner of GE Medical Systems, Milwaukee, Wis. can be used.

Summers I describes various such techniques. Summers I also describes various techniques by which a representation of an anatomical structure such as the colon can be segmented to identify a list of polyp candidates (for example, anomalies of interest). For the list of digital representations of at least a portion of the colon (for example, the list of polyp candidates), characteristics of the digital representations can be determined via the techniques described in Summers I. The characteristics of the digital representations can then be analyzed via any of the technologies described herein.

Segmentation and characteristic determination can also be performed via the techniques described in U.S. Provisional Patent Application No. 60/343,975 filed Dec. 27, 2001, also filed as PCT Patent Application No. PCT/US02/40641 on Dec. 18, 2002, entitled "AUTOMATED CENTERLINE DETECTION ALGORITHM FOR COLON-LIKE 3D SURFACES," by Iordenescu et al., filed Dec. 18, 2002, published as WO03058553 A, which is hereby incorporated by reference herein.

Techniques for classifying a portion as a polyp candidate include analyzing neck characteristics, wall thickness, template matching, and the like. Any other approach capable of detecting anomalies in a representation of an anatomical structure can be used as an alternative.

Although images for segmentation can be acquired via Computed Tomography Imaging ("CT scan") technology, Magnetic Resonance Imaging ("MRI") or other technology can be used.

Additional exemplary segmentation techniques are described in U.S. Pat. No. 6,556,696 to Summers et al., filed Feb. 5, 2002, entitled, "METHOD FOR SEGMENTING MEDICAL IMAGES AND DETECTING SURFACE ANOMALIES IN ANATOMICAL STRUCTURES," which is hereby incorporated herein by reference.

EXAMPLE 59

Exemplary Computer System for Conducting Analysis

Figure 54:
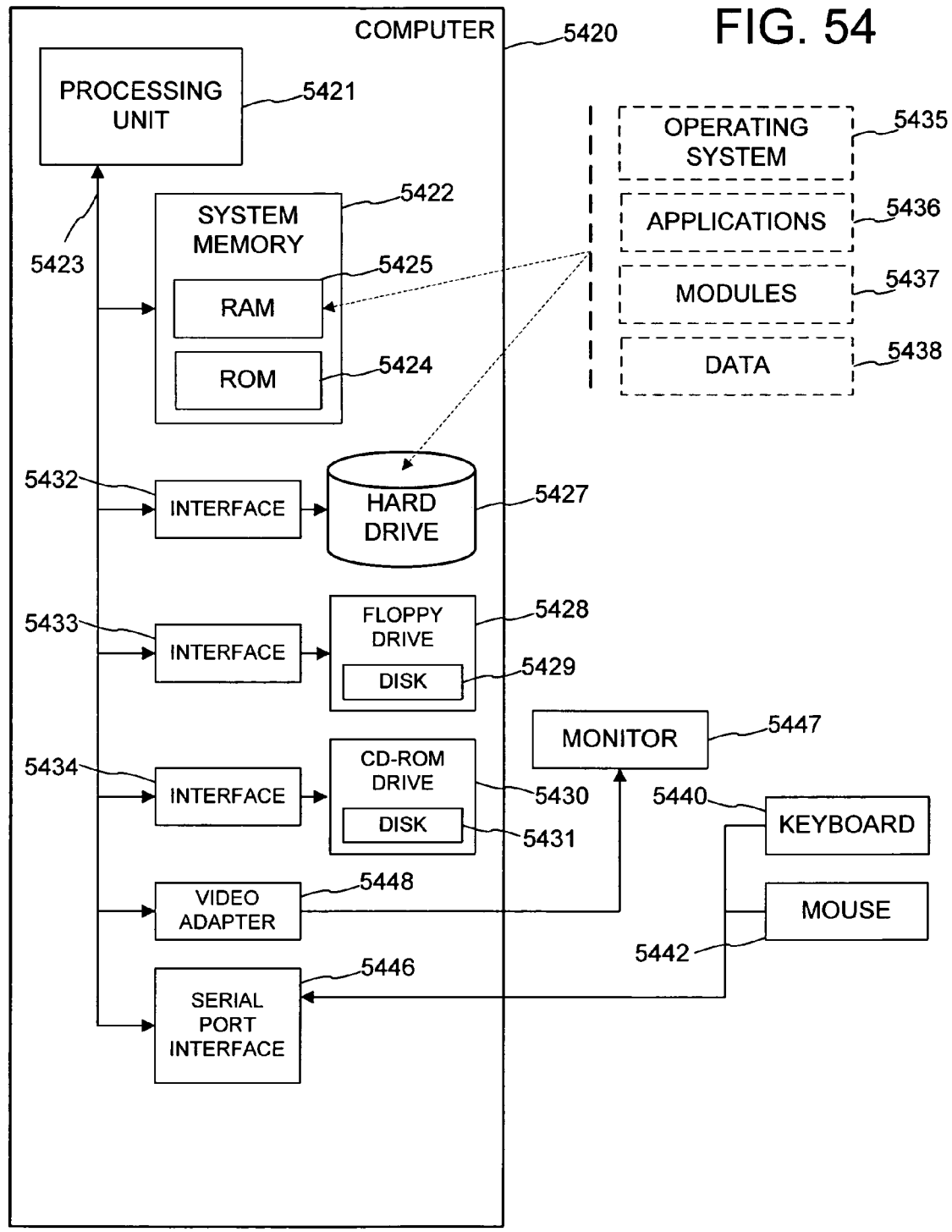
FIG. 54 is a block diagram of an exemplary computer system for implementing the described technologies.

FIG. 54 and the following discussion provide a brief, general description of a suitable computing environment for the software (for example, computer programs) described above. The methods described above can be implemented in computer-executable instructions (for example, organized in program modules). The program modules can include the routines, programs, objects, components, and data structures that perform the tasks and implement the data types for implementing the techniques described above.

While FIG. 54 shows a typical configuration of a desktop computer, the technologies may be implemented in other computer system configurations, including multiprocessor systems, microprocessor-based or programmable consumer electronics, minicomputers, mainframe computers, and the like. The technologies may also be used in distributed computing environments where tasks are performed in parallel by processing devices to enhance performance. For example, tasks related to measuring characteristics of candidate anomalies can be performed simultaneously on multiple computers, multiple processors in a single computer, or both. In a distributed computing environment, program modules may be located in both local and remote memory storage devices.

The computer system shown in FIG. 54 is suitable for implementing the technologies described herein and includes a computer 5420, with a processing unit 5421, a system memory 5422, and a system bus 5423 that interconnects various system components, including the system memory to the processing unit 5421. The system bus may comprise any of several types of bus structures including a memory bus or memory controller, a peripheral bus, and a local bus using a bus architecture. The system memory includes read only memory (ROM) 5424 and random access memory (RAM) 5425. A nonvolatile system (for example, BIOS) can be stored in ROM 5424 and contains the basic routines for transferring information between elements within the personal computer 5420, such as during start-up. The personal computer 5420 can further include a hard disk drive 5427, a magnetic disk drive 5428, for example, to read from or write to a removable disk 5429, and an optical disk drive 5430, for example, for reading a CD-ROM disk 5431 or to read from or write to other optical media. The hard disk drive 5427, magnetic disk drive 5428, and optical disk drive 5430 are connected to the system bus 5423 by a hard disk drive interface 5432, a magnetic disk drive interface 5433, and an optical drive interface 5434, respectively. The drives and their associated computer-readable media provide nonvolatile storage of data, data structures, computer-executable instructions (including program code such as dynamic link libraries and executable files), and the like for the personal computer 5420. Although the description of computer-readable media above refers to a hard disk, a removable magnetic disk, and a CD, it can also include other types of media that are readable by a computer, such as magnetic cassettes, flash memory cards, DVDs, and the like.

A number of program modules may be stored in the drives and RAM 5425, including an operating system 5435, one or more application programs 5436, other program modules 5437, and program data 5438. A user may enter commands and information into the personal computer 5420 through a keyboard 5440 and pointing device, such as a mouse 5442. Other input devices (not shown) may include a microphone, joystick, game pad, satellite dish, scanner, or the like. These and other input devices are often connected to the processing unit 5421 through a serial port interface 5446 that is coupled to the system bus, but may be connected by other interfaces, such as a parallel port, game port, or a universal serial bus (USB). A monitor 5447 or other type of display device is also connected to the system bus 5423 via an interface, such as a display controller or video adapter 5448. In addition to the monitor, personal computers typically include other peripheral output devices (not shown), such as speakers and printers.

The above computer system is provided merely as an example. The technologies can be implemented in a wide variety of other configurations. Further, a wide variety of approaches for collecting and analyzing data related to processing candidate anomalies is possible. For example, the data can be collected, characteristics determined and measured, anomalies classified and reclassified, and the results presented on different computer systems as appropriate. In addition, various software aspects can be implemented in hardware, and vice versa.

EXAMPLE 60

Exemplary Methods

Any of the methods described herein can be performed by software executed by software in an automated system (for example, a computer system). Fully-automatic (for example, without human intervention) or semi-automatic operation (for example, computer processing assisted by human intervention) can be supported. User intervention may be desired in some cases, such as to adjust parameters or consider results.

Such software can be stored on one or more computer-readable media comprising computer-executable instructions for performing the described actions.

REFERENCES

The following references are hereby incorporated by reference herein:

First Set:
  1. Nappi, J. and H. Yoshida, *Automated Detection of Polyps with CT Colonography: Evaluation of Volumetric Features for Reduction of False-Positive Findings*. Academic Radiology, 2002 9(4): p. 386-397.
  2. Yoshida, H., et al., *Computerized detection of colonic polyps at CT colonography on the basis of volumetric features: pilot study*. Radiology, 2002, 222(2): p. 327-36.
  3. Jerebko, A., M. Franaszek, and R. Summers. *Radon transform based polyp segmentation method for CT colonography computer aided diagnosis*. RSNA. 2002.
  4. Summers, R. M., et al., *Automated polyp detection at CT colonography: feasibility assessment in a human population*. Radiology, 2001, 219(1): p. 51-59.
  5. Summers, R. M. *Current concepts and future directions in computer-aided diagnosis for CT colonography*. in CARS 2002, 2002.
  6. Xu, C., D. L. Pham, and J. Prince. *Finding the brain cortex using fuzzy segmentation, isosurface, and deformable surface models*. in the XVth Int. Conf. on Info. Proc. in Med. Img. (*IPMI*). 1997.
  7. Kass, M., A. Witkin, and D. Terzopoulos, *Snakes: Active Contour Models*. International Journal of Computer Vision, 1988: p. 321-331.

8. Cohen, L. D., *On Active Contour Models and Ballons*. Computer Vision, Graphics, and Image Processing: Image Understanding, 1991. 53(Mar. 2, 1991): p. 211-218.

Second Set:
1. Pickhardt, P. J., et al., *Computed Tomographic Virtual Colonoscopy to Screen for Colorectal Neoplasia in Asymptomatic Adults*. the New England Journal of Medicine, 2003. 349(23): p. 2191-2200.

2. Summers, R. M., *Challenges for Computer-Aided Diagnosis for CT Colonography*. Abdominal Radiology, 2002. 27: p. 268-274.

3. Summers, R. M., et al., *Colonic Polyps: Complementary Role of Computer-Aided Detection in CT Colonography*. Radiology, 2002. 225: p. 391-399.

5. Yao, J., et al. *Automatic Segmentation of Colonic Polyps in CT Colonography Based on Knowledge-Guided Deformable Models*. in *SPIE Medical Imaging*. 2003. San Diego.

7. Thirion, J.-P. and A. Gourdon, *Computing the Differential Characteristics of Isointensity Surfaces*. Computer Vision and Image Understanding, 1995. 61(2): p. 190-202.

8. Saff, E. B. and A. B. J. Kuijlaars, *Distributing Many Points on a Sphere*. The Mathematical Intelligencer, 1997. 19(1): p. 5-11.

9. Pham, D. L. and J. Prince, *An adaptive fuzzy c-means algorithm for image segmentation in the presence of intensity inhomogeneities*. Pattern Recognition Letters, 1998.20: p. 57-68.

10. Xu, C., D. L. Pham, and J. L. Prince, *Medical Image Segmentation Using Deformable Models*, in *Handbook of Medical Imaging, Volume 2. Medical Image Processing and Analysis*, M. Sonka and J. M. Fitzpatrick, Editors. 2000, SPIE. p. 129-174.

Alternatives

Having illustrated and described the principles of the invention in exemplary embodiments, it should be apparent to those skilled in the art that the described examples are illustrative embodiments and can be modified in arrangement and detail without departing from such principles. Techniques from any of the examples can be incorporated into one or more of any of the other examples.

In view of the many possible embodiments to which the principles of the invention may be applied, it should be understood that the illustrative embodiments are intended to teach these principles and are not intended to be a limitation on the scope of the invention. We therefore claim as our invention all that comes within the scope and spirit of the following claims and their equivalents.

We claim:

1. One or more computer-readable media comprising computer-readable instructions for performing:
receiving a digital representation of at least a portion of an anatomical structure, wherein the digital representation comprises a representation of at least one feature;
determining an iso-boundary of the digital representation via an iso-value, wherein the iso-value comprises intensity, attenuation, adjusted measurement of intensity, or a combination thereof;
classifying digital representation components of the digital representation as being of respective tissue types based at least on proximity of the components to the iso-boundary of the digital representation and a curvature type of the iso-boundary, wherein the iso-boundary is positioned between representations of lumen and wall in the digital representation; and
based on the respective tissue types of the digital representation components, determining an enclosing three-dimensional boundary of the at least one feature within the digital representation.

2. The one or more computer-readable media of claim 1 wherein the classifying comprises adjusting an intensity of at least one component based on proximity of the component to the iso-boundary and the curvature type of the iso-boundary.

3. The one or more computer-readable media of claim 2 further comprising computer-executable instructions for performing:
presenting the feature in a software user interface in a depiction, wherein the depiction indicates the at least one component has an enhanced intensity.

4. The one or more computer-readable media of claim 1 wherein:
the image digital representation components comprise voxels; and
the classifying classifies the voxels as being of respective tissue types.

5. The one or more computer-readable media of claim 1 wherein the classifying comprises determining a tissue type membership value indicative of a probability of tissue type membership for a component of the digital representation.

6. The one or more computer-readable media of claim 1 further comprising computer-executable instructions for performing:
determining at least one characteristic of the feature based on the enclosing three-dimensional boundary; and
presenting a measurement of the characteristic to describe the feature.

7. The one or more computer-readable media of claim 1 further comprising computer-executable instructions for performing:
determining at least one characteristic of the feature based on the enclosing three-dimensional boundary; and
categorizing the feature as not of interest based at least on the at least one characteristic of the feature.

8. The one or more computer-readable media of claim 7 wherein the at least one characteristic of the feature comprises a volume enclosed by the boundary.

9. The one or more computer-readable media of claim 7 wherein the at least one characteristic of the feature comprises a density of volume enclosed by the boundary.

10. The one or more computer-readable media of claim 7 wherein the at least one characteristic of the feature comprises a mean CT attenuation enclosed by the boundary.

11. The one or more computer-readable media of claim 7 wherein the at least one characteristic of the feature comprises a curvature measurement of the boundary.

12. The one or more computer-readable media of claim 11 further comprising computer-executable instructions for performing:
presenting a visual depiction of the digital representation depicting the curvature measurement.

13. The one or more computer-readable media of claim 7 wherein the at least one characteristic of the feature comprises an aspect ratio of the feature.

14. The one or more computer-readable media of claim 7 wherein the at least one characteristic of the feature comprises a feature wall thickness.

15. The one or more computer-readable media of claim 7 wherein the at least one characteristic of the feature comprises a boundary type.

16. The one or more computer-readable media of claim 15 wherein the boundary type comprises:
  an inner boundary; or
  an outer boundary; or
  combinations thereof.

17. The one or more computer-readable media of claim 16 further comprising computer-executable instructions for performing:
  presenting a visual depiction of the digital representation depicting the boundary type of the enclosing three-dimensional boundary of the feature.

18. The one or more computer-readable media of claim 1 further comprising computer-executable instructions for performing:
  determining a standard deviation of at least one characteristic of the feature based on the enclosing three-dimensional boundary; and
  categorizing the feature as not of interest based at least on the standard deviation of the at least one characteristic of the feature.

19. The one or more computer-readable media of claim 1 wherein:
  the receiving comprises receiving a region of the digital representation identified by software as containing a candidate feature of interest;
  the classifying and determining process the region; and
  the computer-executable instructions further comprise instructions for performing:
    indicating whether the region's candidate feature of interest is of interest.

20. The one or more computer-readable media of claim 1 wherein the classifying classifies digital representation components of the digital representation as being of tissue types lumen space, polyp, and non-polyp.

21. The one or more computer-readable media of claim 1 further comprising computer-executable instructions for performing:
  presenting a visual depiction of the digital representation depicting the respective tissue types of the digital component.

22. The one or more computer-readable media of claim 1 further comprising computer-executable instructions for performing:
  presenting a visual depiction of the digital representation depicting the enclosing three-dimensional boundary of the feature.

23. The one or more computer-readable media of claim 22 further comprising computer-executable instructions for performing:
  presenting at least one orthogonal view of the digital representation comprising at least a depiction of the enclosing three-dimensional boundary of the feature.

24. The one or more computer-readable media of claim 23 wherein the at least one orthogonal view depicts at least one two-dimensional plane of the digital representation.

25. The one or more computer-readable media of claim 23 wherein the orthogonal view provides surrounding visual context for the digital representation of the enclosing three-dimensional boundary of the feature.

26. The one or more computer-readable media of claim 23 wherein the at least one orthogonal view comprises:
  a view orthogonal to a coordinate system;
  a view orthogonal to the normal to the colonic surface; or
  a view at an arbitrary angle to the enclosing three-dimensional boundary of the feature; or
  combinations thereof.

27. A method of detecting polyps in a virtual colon, the method comprising:
  receiving an image of a portion of the virtual colon having a software-detected candidate polyp;
  locating an iso-boundary between lumen and wall in the image;
  classifying portions of the iso-boundary according to curvature type;
  adjusting intensities of components of the image based on respective proximities to portions of the iso-boundary and curvature types of the portions of the iso-boundary;
  categorizing the components as a tissue type of one of lumen, polyp, and non-polyp, resulting in tissue-categorized components;
  via a deformable model using one or more forces, converging to an enclosing three-dimensional boundary of the candidate polyp.

28. The method of claim 27 wherein the forces comprise:
  an internal force;
  an external force; or
  an image force; or
  combinations thereof.

29. The method claim 27 further comprising:
  presenting a visual depiction of the digital representation depicting at least one of the forces used in the deformable model.

30. The method of claim 27 further comprising:
  determining at least one characteristic of the candidate polyp based on the enclosing three-dimensional boundary; and
  categorizing the candidate polyp as not a polyp based at least on the at least one characteristic of the candidate polyp.

31. The method of claim 30 wherein the at least one characteristic of the candidate polyp is volume.

32. One or more computer-readable media comprising computer-executable instructions for performing a method comprising:
  receiving an image of a portion of the virtual colon having a software-detected candidate polyp;
  locating an iso-boundary between lumen and wall in the image;
  classifying portions of the iso-boundary according to curvature type;
  adjusting intensities of components of the image based on respective proximities to portions of the iso-boundary and curvature types of the portions of the iso-boundary;
  categorizing the components as a tissue type of one of lumen, polyp, and non-polyp, resulting in tissue-categorized components; and
  via a deformable model using one or more forces, converging to an enclosing three-dimensional boundary of the candidate polyp.

33. One or more computer-readable media comprising computer-executable instructions for performing:
  receiving a digital representation of at least a portion of an anatomical structure;
  based on curvature of an iso-boundary between representations of lumen and anatomical structure wall in the digital representation, categorizing at least a portion of the iso-boundary as a curvature type; and
  based at least on proximity of a digital representation component to the iso-boundary and the curvature type of the iso-boundary, adjusting intensity of the digital representation component, resulting in an adjusted intensity of the digital representation component;

wherein the adjusting comprises:
determining a score for the component based on proximity to the iso-boundary and a category of the iso-boundary; and
adjusting intensity of the component based on the score.

34. The one or more computer-readable media of claim 33 wherein the adjusting enhances components likely to be polyp tissue based on close proximity to a convex iso-boundary.

35. The one or more computer-readable media of claim 33 further comprising computer-executable instructions for performing:
via the adjusted intensity, determining an enclosing three-dimensional boundary of a feature in the digital representation.

36. The one or more computer-readable media of claim 33 further comprising computer-executable instructions for performing:
via the enclosing three-dimensional boundary of the feature, classifying the feature as of interest.

37. The one or more computer-readable media of claim 36 wherein the classifying comprises determining a volume of the feature.

38. The one or more computer-readable media of claim 33 further comprising computer-executable instructions for performing:
presenting a visual depiction of the digital representation depicting the adjusted intensity of the digital component.

39. The one or more computer-readable media of claim 33 wherein the adjusting enhances components likely to be polyp tissue.

40. The one or more computer-readable media of claim 1 wherein:
determining an enclosing three-dimensional boundary comprises converging to an enclosing three-dimensional boundary of the feature via a gradient of the tissue types.

41. The one or more computer-readable media of claim 40 further comprising computer-executable instructions for performing:
during the converging, dynamically maintaining the enclosing three-dimensional boundary based at least on one of:
resolution; and
topology.

42. The one or more computer-readable media of claim 40 wherein converging comprises:
converging to a two-dimensional boundary of the feature; and
propagating the two-dimensional boundary to the enclosing three-dimensional boundary of the feature.

43. The one or more computer-readable media of claim 42 further comprising computer-executable instructions for performing:
presenting a visual depiction of the digital representation depicting at least one transverse two-dimensional slice of the propagated three-dimensional boundary of the feature.

44. One or more computer-readable media comprising computer-executable instructions for generating a software user interface comprising:
a depiction of a feature of a virtual anatomical structure, wherein the depiction comprises components having software-adjusted intensities for image components proximate to an iso-boundary between lumen and air in the depiction, based at least on proximity of the image components to the iso-boundary and a curvature type of the iso-boundary.

45. The one or more computer-readable media of claim 44 wherein the depiction simultaneously depicts probability of component membership for tissue types of lumen space; polyp; and non-polyp via plural color channels.

46. A system for detecting a polyp in an anatomical structure, the system comprising:
means for receiving a digital representation of at least a portion of the anatomical structure, wherein the digital representation comprises a representation of at least one feature;
means for determining an iso-boundary of the digital representation via an iso-value means, wherein the iso-value means comprises intensity, adjusted measurement of intensity, attenuation, or a combination thereof;
means for classifying digital representation components of the digital representation as being of respective tissue types based at least on proximity of the components to the iso-boundary of the digital representation and a curvature type of the iso-boundary, wherein the iso-boundary is positioned between representations of lumen and wall in the digital representation;
means for determining an enclosing three-dimensional boundary of the at least one feature within the digital representation based on the respective tissue types of the digital representation components;
means for calculating one or more characteristics based at least on the three-dimensional boundary; and
means for classifying the feature as a polyp based at least on the one or more characteristics.

* * * * *

UNITED STATES PATENT AND TRADEMARK OFFICE
CERTIFICATE OF CORRECTION

PATENT NO. : 7,454,045 B2
APPLICATION NO. : 10/779210
DATED : November 18, 2008
INVENTOR(S) : Yao et al.

It is certified that error appears in the above-identified patent and that said Letters Patent is hereby corrected as shown below:

Column 13, line 6 should be part of the heading beginning at Column 13, line 3, and should read --Exemplary System for Determining Enclosing Three-Dimensional Boundary of a Feature via Three-Dimensional Analysis--

Column 17, line 66, "$(\theta, \phi)$, $0 \leq \theta \leq \pi$, $0 \leq \phi \leq 2\pi$," should read --$(\theta, \varphi)$, $0 \leq \theta \leq \pi$, $0 \leq \varphi \leq 2\pi$,--

Column 21, line 40, "$\Sigma_k$" should read --$\Sigma_x$--

Signed and Sealed this

Seventeenth Day of August, 2010

David J. Kappos
*Director of the United States Patent and Trademark Office*